US009289680B2

(12) United States Patent
Yamazaki et al.

(10) Patent No.: US 9,289,680 B2
(45) Date of Patent: *Mar. 22, 2016

(54) GAME CONTROLLER, STORAGE MEDIUM STORING GAME PROGRAM, AND GAME APPARATUS

(71) Applicant: Nintendo Co., Ltd., Kyoto (JP)

(72) Inventors: Hitoshi Yamazaki, Kyoto (JP); Takao Sawano, Kyoto (JP); Tadashi Sugiyama, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 176 days.

This patent is subject to a terminal disclaimer.

(21) Appl. No.: 14/043,215

(22) Filed: Oct. 1, 2013

(65) Prior Publication Data

US 2014/0031124 A1    Jan. 30, 2014

Related U.S. Application Data

(60) Continuation of application No. 13/313,841, filed on Dec. 7, 2011, now Pat. No. 8,574,080, which is a division of application No. 12/073,327, filed on Mar. 4, 2008, now Pat. No. 8,100,770.

(30) Foreign Application Priority Data

Apr. 20, 2007 (JP) ................. 2007-111177

(51) Int. Cl.
*A63F 13/06* (2006.01)
*A63F 13/20* (2014.01)

(52) U.S. Cl.
CPC ......... *A63F 13/06* (2013.01); *A63F 2300/1006* (2013.01); *A63F 2300/1025* (2013.01); *A63F 2300/1056* (2013.01); *A63F 2300/1068* (2013.01); *A63F 2300/6045* (2013.01)

(58) Field of Classification Search
USPC .......................................... 463/39
See application file for complete search history.

(56) References Cited

U.S. PATENT DOCUMENTS 588,172 A    8/1897 Peters
688,076 A   12/1901 Ensign
(Continued)

FOREIGN PATENT DOCUMENTS

DE    40 04 554    8/1991
DE    195 02 918   8/1996
(Continued)

OTHER PUBLICATIONS

Nintendo Co., Ltd. and Nintendo of America'S Opposition to IA Labs CA, LLC'S Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), including the Appendix of Exhibits and Exhibits A-R, 405 pages.

(Continued)

*Primary Examiner* — Pierre E Elisca
(74) *Attorney, Agent, or Firm* — Nixon & Vanderhye, P.C.

(57) ABSTRACT

A game controller includes at least four load sensors for detecting a load applied on a support board on which player's legs are ridden, and the game controller transmits a load value detected as manipulation data by the four load sensors to a game machine. The game machine determines a necessary quantity of load values, and the game machine computes the necessary quantity of load values based on the detected load value from the game controller. Then, game processing is performed based on the necessary quantity of computed load values.

28 Claims, 47 Drawing Sheets

(56) References Cited

U.S. PATENT DOCUMENTS

| | | |
|---|---|---|
| D188,376 S | 7/1960 | Hotkins et al. |
| 3,184,962 A | 5/1965 | Gay |
| 3,217,536 A | 11/1965 | Motsinger et al. |
| 3,424,005 A | 1/1969 | Brown |
| 3,428,312 A | 2/1969 | Machen |
| 3,712,294 A | 1/1973 | Muller |
| 3,752,144 A | 8/1973 | Weigle, Jr. |
| 3,780,817 A | 12/1973 | Videon |
| 3,826,145 A | 7/1974 | McFarland |
| 3,869,007 A | 3/1975 | Haggstrom et al. |
| 4,058,178 A | 11/1977 | Shinohara et al. |
| 4,104,119 A | 8/1978 | Schilling |
| 4,136,682 A | 1/1979 | Pedotti |
| 4,246,783 A | 1/1981 | Steven et al. |
| 4,296,931 A | 10/1981 | Yokoi |
| 4,337,050 A | 6/1982 | Engalitcheff, Jr. |
| 4,404,854 A | 9/1983 | Krempl et al. |
| 4,488,017 A | 12/1984 | Lee |
| 4,494,754 A | 1/1985 | Wagner, Jr. |
| 4,558,757 A | 12/1985 | Mori et al. |
| 4,569,519 A | 2/1986 | Mattox et al. |
| 4,574,899 A | 3/1986 | Griffin |
| 4,577,868 A | 3/1986 | Kiyonaga |
| 4,598,717 A | 7/1986 | Pedotti |
| 4,607,841 A | 8/1986 | Gala |
| 4,630,817 A | 12/1986 | Buckleu |
| 4,660,828 A | 4/1987 | Weiss |
| 4,680,577 A | 7/1987 | Straayer et al. |
| 4,688,444 A | 8/1987 | Nordstrom |
| 4,691,694 A | 9/1987 | Boyd et al. |
| 4,711,447 A | 12/1987 | Mansfield |
| 4,726,435 A | 2/1988 | Kitagawa et al. |
| 4,739,848 A | 4/1988 | Tulloch |
| 4,742,832 A | 5/1988 | Kauffmann et al. |
| 4,742,932 A | 5/1988 | Pedragosa |
| 4,800,973 A | 1/1989 | Angel |
| 4,838,173 A | 6/1989 | Schroeder et al. |
| 4,855,704 A | 8/1989 | Betz |
| 4,880,069 A | 11/1989 | Bradley |
| 4,882,677 A | 11/1989 | Curran |
| 4,893,514 A | 1/1990 | Gronert et al. |
| 4,907,797 A | 3/1990 | Gezari et al. |
| 4,927,138 A | 5/1990 | Ferrari |
| 4,970,486 A | 11/1990 | Gray et al. |
| 4,982,613 A | 1/1991 | Becker |
| D318,073 S | 7/1991 | Jang |
| 5,044,956 A | 9/1991 | Behensky et al. |
| 5,049,079 A | 9/1991 | Furtado et al. |
| 5,052,406 A | 10/1991 | Nashner |
| 5,054,771 A | 10/1991 | Mansfield |
| 5,065,631 A | 11/1991 | Ashpitel et al. |
| 5,089,960 A | 2/1992 | Sweeney, Jr. |
| 5,103,207 A | 4/1992 | Kerr et al. |
| 5,104,119 A | 4/1992 | Lynch |
| 5,116,296 A | 5/1992 | Watkins et al. |
| 5,118,112 A | 6/1992 | Bregman et al. |
| 5,151,071 A | 9/1992 | Jain et al. |
| 5,195,746 A | 3/1993 | Boyd et al. |
| 5,197,003 A | 3/1993 | Moncrief et al. |
| 5,199,875 A | 4/1993 | Trumbull |
| 5,203,563 A | 4/1993 | Loper, III |
| 5,207,426 A | 5/1993 | Inoue et al. |
| 5,259,252 A | 11/1993 | Kruse et al. |
| 5,269,318 A | 12/1993 | Nashner |
| 5,299,810 A | 4/1994 | Pierce et al. |
| 5,303,715 A | 4/1994 | Nashner et al. |
| 5,360,383 A | 11/1994 | Boren |
| 5,362,298 A | 11/1994 | Brown et al. |
| 5,368,546 A | 11/1994 | Stark et al. |
| 5,405,152 A | 4/1995 | Katanics et al. |
| 5,431,569 A | 7/1995 | Simpkins et al. |
| 5,462,503 A | 10/1995 | Benjamin et al. |
| 5,466,200 A | 11/1995 | Ulrich et al. |
| 5,469,740 A | 11/1995 | French et al. |
| 5,474,087 A | 12/1995 | Nashner |
| 5,476,103 A | 12/1995 | Nasher et al. |
| 5,507,708 A | 4/1996 | Ma |
| 5,541,621 A | 7/1996 | Nmngani |
| 5,541,622 A | 7/1996 | Engle et al. |
| 5,547,439 A | 8/1996 | Rawls et al. |
| 5,551,445 A | 9/1996 | Nashner |
| 5,551,693 A | 9/1996 | Goto et al. |
| 5,577,981 A | 11/1996 | Jarvik |
| D376,826 S | 12/1996 | Ashida |
| 5,584,700 A | 12/1996 | Feldman et al. |
| 5,584,779 A | 12/1996 | Knecht et al. |
| 5,591,104 A | 1/1997 | Andrus et al. |
| 5,613,690 A | 3/1997 | McShane et al. |
| 5,623,944 A | 4/1997 | Nashner |
| 5,627,327 A | 5/1997 | Zanakis |
| D384,115 S | 9/1997 | Wilkinson et al. |
| 5,669,773 A | 9/1997 | Gluck |
| 5,689,285 A | 11/1997 | Asher |
| 5,690,582 A | 11/1997 | Ulrich et al. |
| 5,697,791 A | 12/1997 | Nasher et al. |
| 5,713,794 A | 2/1998 | Shimojima et al. |
| 5,721,566 A | 2/1998 | Rosenberg et al. |
| 5,746,684 A | 5/1998 | Jordan |
| 5,785,630 A | 7/1998 | Bobick et al. |
| D397,164 S | 8/1998 | Goto |
| 5,788,618 A | 8/1998 | Joutras |
| 5,792,031 A | 8/1998 | Alton |
| 5,800,314 A | 9/1998 | Sakakibara et al. |
| 5,805,138 A | 9/1998 | Brawne et al. |
| 5,813,958 A | 9/1998 | Tomita |
| 5,814,740 A | 9/1998 | Cook et al. |
| 5,820,462 A | 10/1998 | Yokoi et al. |
| 5,825,308 A | 10/1998 | Rosenberg |
| 5,837,952 A | 11/1998 | Oshiro et al. |
| D402,317 S | 12/1998 | Goto |
| 5,846,086 A | 12/1998 | Bizzi et al. |
| 5,853,326 A | 12/1998 | Goto et al. |
| 5,854,622 A | 12/1998 | Brannon |
| 5,860,861 A | 1/1999 | Lipps et al. |
| 5,864,333 A | 1/1999 | O'Heir |
| 5,872,438 A | 2/1999 | Roston |
| 5,886,302 A | 3/1999 | Germanton et al. |
| 5,888,172 A | 3/1999 | Andrus et al. |
| 5,889,507 A | 3/1999 | Engle et al. |
| D407,758 S | 4/1999 | Isetani et al. |
| 5,890,995 A | 4/1999 | Bobick et al. |
| 5,897,457 A | 4/1999 | Mackovjak |
| 5,897,469 A | 4/1999 | Yalch |
| 5,901,612 A | 5/1999 | Letovsky |
| 5,902,214 A | 5/1999 | Makikawa et al. |
| 5,904,639 A | 5/1999 | Smyser et al. |
| D411,258 S | 6/1999 | Isetani et al. |
| 5,912,659 A | 6/1999 | Rutledge et al. |
| 5,919,092 A | 7/1999 | Yokoi et al. |
| 5,921,780 A | 7/1999 | Myers |
| 5,921,899 A | 7/1999 | Rose |
| 5,929,782 A | 7/1999 | Stark et al. |
| 5,947,824 A | 9/1999 | Minami et al. |
| 5,976,063 A | 11/1999 | Joutras et al. |
| 5,980,256 A | 11/1999 | Carmein |
| 5,980,429 A | 11/1999 | Nashner |
| 5,984,785 A | 11/1999 | Takeda et al. |
| 5,987,982 A | 11/1999 | Wenman et al. |
| 5,989,157 A | 11/1999 | Walton |
| 5,993,356 A | 11/1999 | Houston et al. |
| 5,997,439 A | 12/1999 | Ohsuga et al. |
| 6,001,015 A | 12/1999 | Nishiumi et al. |
| 6,007,428 A | 12/1999 | Nishiumi et al. |
| 6,010,465 A | 1/2000 | Nashner |
| D421,070 S | 2/2000 | Jang et al. |
| 6,037,927 A | 3/2000 | Rosenberg |
| 6,038,488 A | 3/2000 | Barnes et al. |
| 6,044,772 A | 4/2000 | Gaudette et al. |
| 6,063,046 A | 5/2000 | Allum |
| 6,086,518 A | 7/2000 | MacCready, Jr. |
| 6,102,803 A | 8/2000 | Takeda et al. |
| 6,102,832 A | 8/2000 | Tani |
| D431,051 S | 9/2000 | Goto |
| 6,113,237 A | 9/2000 | Ober et al. |

(56) References Cited

U.S. PATENT DOCUMENTS

| | | |
|---|---|---|
| 6,147,674 A | 11/2000 | Rosenberg et al. |
| 6,152,564 A | 11/2000 | Ober et al. |
| D434,769 S | 12/2000 | Goto |
| D434,770 S | 12/2000 | Goto |
| 6,155,926 A | 12/2000 | Miyamoto et al. |
| 6,162,189 A | 12/2000 | Girone et al. |
| 6,167,299 A | 12/2000 | Galchenkov et al. |
| 6,190,287 B1 | 2/2001 | Nashner |
| 6,200,253 B1 | 3/2001 | Nishiumi et al. |
| 6,203,432 B1 | 3/2001 | Roberts et al. |
| 6,216,542 B1 | 4/2001 | Stockli et al. |
| 6,216,547 B1 | 4/2001 | Lehtovaara |
| 6,220,865 B1 | 4/2001 | Macri et al. |
| D441,369 S | 5/2001 | Goto |
| 6,225,977 B1 | 5/2001 | Li |
| 6,227,968 B1 | 5/2001 | Suzuki et al. |
| 6,228,000 B1 | 5/2001 | Jones |
| 6,231,444 B1 | 5/2001 | Goto |
| 6,239,806 B1 | 5/2001 | Nishiumi et al. |
| 6,241,611 B1 | 6/2001 | Takeda et al. |
| 6,244,987 B1 | 6/2001 | Ohsuga et al. |
| D444,469 S | 7/2001 | Goto |
| 6,264,558 B1 | 7/2001 | Nishiumi et al. |
| 6,280,361 B1 | 8/2001 | Harvey et al. |
| D447,968 S | 9/2001 | Pagnacco et al. |
| 6,295,878 B1 | 10/2001 | Berme |
| 6,296,595 B1 | 10/2001 | Stark et al. |
| 6,325,718 B1 | 12/2001 | Nishiumi et al. |
| 6,330,837 B1 | 12/2001 | Charles et al. |
| 6,336,891 B1 | 1/2002 | Fedrigon et al. |
| 6,353,427 B1 | 3/2002 | Rosenberg |
| 6,354,155 B1 | 3/2002 | Berme |
| 6,357,827 B1 | 3/2002 | Brightbill et al. |
| 6,359,613 B1 | 3/2002 | Poole |
| D456,410 S | 4/2002 | Ashida |
| D456,854 S | 5/2002 | Ashida |
| D457,570 S | 5/2002 | Brinson |
| 6,387,061 B1 | 5/2002 | Nitto |
| 6,388,655 B1 | 5/2002 | Leung |
| 6,389,883 B1 | 5/2002 | Berme et al. |
| 6,394,905 B1 | 5/2002 | Takeda et al. |
| 6,402,635 B1 | 6/2002 | Nesbit et al. |
| D459,727 S | 7/2002 | Ashida |
| D460,506 S | 7/2002 | Tamminga et al. |
| 6,421,056 B1 | 7/2002 | Nishiumi et al. |
| 6,436,058 B1 | 8/2002 | Krahner et al. |
| D462,683 S | 9/2002 | Ashida |
| 6,454,679 B1 | 9/2002 | Radow |
| 6,461,297 B1 | 10/2002 | Pagnacco et al. |
| 6,470,302 B1 | 10/2002 | Cunningham et al. |
| 6,482,010 B1 | 11/2002 | Marcus et al. |
| 6,510,749 B1 | 1/2003 | Pagnacco et al. |
| 6,514,145 B1 | 2/2003 | Kawabata et al. |
| 6,515,593 B1 | 2/2003 | Stark et al. |
| 6,516,221 B1 | 2/2003 | Hirouchi et al. |
| D471,594 S | 3/2003 | Nojo |
| 6,543,769 B1 | 4/2003 | Podoloff et al. |
| 6,563,059 B2 | 5/2003 | Lee |
| 6,568,334 B1 | 5/2003 | Guadette et al. |
| 6,616,579 B1 | 9/2003 | Reinbold et al. |
| 6,624,802 B1 | 9/2003 | Klein et al. |
| 6,632,158 B1 | 10/2003 | Nashner |
| 6,636,161 B2 | 10/2003 | Rosenberg |
| 6,636,197 B1 | 10/2003 | Goldenberg et al. |
| 6,638,175 B2 | 10/2003 | Lee et al. |
| 6,663,058 B1 | 12/2003 | Peterson et al. |
| 6,676,520 B2 | 1/2004 | Nishiumi et al. |
| 6,676,569 B1 | 1/2004 | Radow |
| 6,679,776 B1 | 1/2004 | Nishiumi et al. |
| 6,697,049 B2 | 2/2004 | Lu |
| 6,719,667 B2 | 4/2004 | Wong et al. |
| 6,726,566 B2 | 4/2004 | Komata |
| 6,764,429 B1 | 7/2004 | Michalow |
| 6,797,894 B2 | 9/2004 | Montagnino et al. |
| 6,811,489 B1 | 11/2004 | Shimizu et al. |
| 6,813,966 B2 | 11/2004 | Dukart |
| 6,817,973 B2 | 11/2004 | Merril et al. |
| D500,100 S | 12/2004 | van der Meer |
| 6,846,270 B1 | 1/2005 | Etnyre |
| 6,859,198 B2 | 2/2005 | Onodera et al. |
| 6,872,139 B2 | 3/2005 | Sato et al. |
| 6,872,187 B1 | 3/2005 | Stark et al. |
| 6,888,076 B2 | 5/2005 | Hetherington |
| 6,913,559 B2 | 7/2005 | Smith |
| 6,936,016 B2 | 8/2005 | Berme et al. |
| D510,391 S | 10/2005 | Merril et al. |
| 6,975,302 B1 | 12/2005 | Ausbeck, Jr. |
| 6,978,684 B2 | 12/2005 | Nurse |
| 6,991,483 B1 | 1/2006 | Milan et al. |
| D514,627 S | 2/2006 | Merril et al. |
| 7,004,787 B2 | 2/2006 | Milan |
| D517,124 S | 3/2006 | Merril et al. |
| 7,011,605 B2 | 3/2006 | Shields |
| 7,033,176 B2 | 4/2006 | Feldman et al. |
| 7,038,855 B2 | 5/2006 | French et al. |
| 7,040,986 B2 | 5/2006 | Koshima et al. |
| 7,070,542 B2 | 7/2006 | Reyes et al. |
| 7,083,546 B2 | 8/2006 | Zillig et al. |
| 7,100,439 B2 | 9/2006 | Carlucci |
| 7,121,982 B2 | 10/2006 | Feldman |
| 7,126,584 B1 | 10/2006 | Nishiumi et al. |
| 7,127,376 B2 | 10/2006 | Nashner |
| 7,163,516 B1 | 1/2007 | Pagnacco et al. |
| 7,179,234 B2 | 2/2007 | Nashner |
| 7,195,355 B2 | 3/2007 | Nashner |
| 7,202,424 B2 | 4/2007 | Carlucci |
| 7,202,851 B2 | 4/2007 | Cunningham et al. |
| 7,270,630 B1 | 9/2007 | Patterson |
| 7,307,619 B2 | 12/2007 | Cunningham et al. |
| 7,308,831 B2 | 12/2007 | Cunningham et al. |
| 7,331,226 B2 | 2/2008 | Feldman et al. |
| 7,335,134 B1 | 2/2008 | LaVelle |
| RE40,427 E | 7/2008 | Nashner |
| 7,416,537 B1 | 8/2008 | Stark et al. |
| 7,530,929 B2 | 5/2009 | Feldman et al. |
| 7,722,501 B2 | 5/2010 | Nicolas et al. |
| 7,938,751 B2 | 5/2011 | Nicolas et al. |
| 2001/0001303 A1 | 5/2001 | Ohsuga et al. |
| 2001/0018363 A1 | 8/2001 | Goto et al. |
| 2001/0050683 A1 | 12/2001 | Ishikawa et al. |
| 2002/0055422 A1 | 5/2002 | Airmet et al. |
| 2002/0080115 A1 | 6/2002 | Onodera et al. |
| 2002/0185041 A1 | 12/2002 | Herbst |
| 2003/0054327 A1 | 3/2003 | Evensen |
| 2003/0069108 A1 | 4/2003 | Kaiserman et al. |
| 2003/0107502 A1 | 6/2003 | Alexander |
| 2003/0176770 A1 | 9/2003 | Merril et al. |
| 2003/0193416 A1 | 10/2003 | Ogata et al. |
| 2004/0038786 A1 | 2/2004 | Kuo et al. |
| 2004/0041787 A1 | 3/2004 | Graves |
| 2004/0077464 A1 | 4/2004 | Feldman et al. |
| 2004/0099513 A1 | 5/2004 | Hetherington |
| 2004/0110602 A1 | 6/2004 | Feldman |
| 2004/0127337 A1 | 7/2004 | Nashner |
| 2004/0163855 A1 | 8/2004 | Carlucci |
| 2004/0180719 A1 | 9/2004 | Feldman et al. |
| 2004/0259688 A1 | 12/2004 | Stabile |
| 2005/0070154 A1 | 3/2005 | Milan |
| 2005/0076161 A1 | 4/2005 | Albanna et al. |
| 2005/0130742 A1 | 6/2005 | Feldman et al. |
| 2005/0202384 A1 | 9/2005 | DiCuccio et al. |
| 2006/0097453 A1 | 5/2006 | Feldman et al. |
| 2006/0161045 A1 | 7/2006 | Merril et al. |
| 2006/0181021 A1* | 8/2006 | Seelig ................ G07F 17/3216 273/143 R |
| 2006/0205565 A1 | 9/2006 | Feldman et al. |
| 2006/0211543 A1 | 9/2006 | Feldman et al. |
| 2006/0217243 A1 | 9/2006 | Feldman et al. |
| 2006/0223634 A1 | 10/2006 | Feldman et al. |
| 2006/0258512 A1 | 11/2006 | Nicolas et al. |
| 2007/0021279 A1 | 1/2007 | Jones |
| 2007/0027369 A1 | 2/2007 | Pagnacco et al. |
| 2007/0155589 A1 | 7/2007 | Feldman et al. |
| 2007/0219050 A1 | 9/2007 | Merril |

(56) References Cited

U.S. PATENT DOCUMENTS

| | | | |
|---|---|---|---|
| 2008/0012826 A1 | 1/2008 | Cunningham et al. | |
| 2008/0228110 A1 | 9/2008 | Berme | |
| 2008/0261696 A1* | 10/2008 | Yamazaki | A63F 13/06 463/39 |
| 2009/0093315 A1 | 4/2009 | Matsunaga et al. | |
| 2010/0137063 A1 | 6/2010 | Shirakawa et al. | |
| 2010/0265173 A1* | 10/2010 | Matsunaga | G06F 3/0334 345/157 |
| 2011/0070953 A1 | 3/2011 | Konishi | |
| 2011/0077899 A1 | 3/2011 | Hayashi et al. | |
| 2011/0207534 A1 | 8/2011 | Meldeau | |
| 2011/0207543 A1* | 8/2011 | Park | A63B 57/0006 473/133 |
| 2013/0143664 A1* | 6/2013 | Taniguchi | A63F 7/022 463/38 |
| 2013/0143665 A1* | 6/2013 | Taniguchi | A63F 7/022 463/38 |

FOREIGN PATENT DOCUMENTS

| | | |
|---|---|---|
| DE | 297 12 785 | 1/1998 |
| DE | 20 2004 021 792 | 5/2011 |
| DE | 20 2004 021 793 | 5/2011 |
| EP | 0 275 665 | 7/1988 |
| EP | 0 299 738 | 1/1989 |
| EP | 0 335 045 | 10/1989 |
| EP | 0 519 836 | 12/1992 |
| EP | 1 043 746 | 11/2000 |
| EP | 1 120 083 | 8/2001 |
| EP | 1 257 599 | 8/2001 |
| EP | 1 870 141 | 12/2007 |
| FR | 2 472 929 | 7/1981 |
| FR | 2 587 611 | 3/1987 |
| FR | 2 604 910 | 4/1988 |
| FR | 2 647 331 | 11/1990 |
| FR | 2 792 182 | 10/2000 |
| FR | 2 801 490 | 6/2001 |
| FR | 2 811 753 | 1/2002 |
| FR | 2 906 365 | 3/2008 |
| GB | 1 209 954 | 10/1970 |
| GB | 2 288 550 | 10/1995 |
| JP | 44-23551 | 10/1969 |
| JP | 55-95758 | 12/1978 |
| JP | 54-73689 | 6/1979 |
| JP | 55-113472 | 9/1980 |
| JP | 55-113473 | 9/1980 |
| JP | 55-125369 | 9/1980 |
| JP | 55-149822 | 11/1980 |
| JP | 55-152431 | 11/1980 |
| JP | 59-225439 | 12/1984 |
| JP | 60-79460 | 6/1985 |
| JP | 60-153159 | 10/1985 |
| JP | 61-154689 | 7/1986 |
| JP | 62-34016 | 2/1987 |
| JP | 63-158311 | 10/1988 |
| JP | 63-163855 | 10/1988 |
| JP | 63-193003 | 12/1988 |
| JP | 02-102651 | 4/1990 |
| JP | 2-238327 | 9/1990 |
| JP | 3-25325 | 2/1991 |
| JP | 3-103272 | 4/1991 |
| JP | 03-107959 | 11/1991 |
| JP | 05-317524 | 12/1993 |
| JP | 6-063198 | 3/1994 |
| JP | 6-282373 | 10/1994 |
| JP | 07-213741 | 8/1995 |
| JP | 7-213745 | 8/1995 |
| JP | 07-213745 | 8/1995 |
| JP | 7-241281 | 9/1995 |
| JP | 7-241282 | 9/1995 |
| JP | 7-275307 | 10/1995 |
| JP | 07-302161 | 11/1995 |
| JP | 8-43182 | 2/1996 |
| JP | 08-131594 | 5/1996 |
| JP | 08-182774 | 7/1996 |
| JP | 08-184474 | 7/1996 |
| JP | 8-215176 | 8/1996 |
| JP | 08-244691 | 9/1996 |
| JP | 2576247 | 1/1997 |
| JP | 9-120464 | 5/1997 |
| JP | 9-168529 | 6/1997 |
| JP | 9-197951 | 7/1997 |
| JP | 09-197951 | 7/1997 |
| JP | 9-305099 | 11/1997 |
| JP | 11-309270 | 11/1999 |
| JP | 2000-146679 | 5/2000 |
| JP | U3068681 | 5/2000 |
| JP | U3069287 | 6/2000 |
| JP | 2000-254348 | 9/2000 |
| JP | 3172738 | 6/2001 |
| JP | 2001-178845 | 7/2001 |
| JP | 2001-286451 | 10/2001 |
| JP | 2002-112984 | 4/2002 |
| JP | 2002-157081 | 5/2002 |
| JP | 2002-253534 | 9/2002 |
| JP | 2002-297267 | 10/2002 |
| JP | 2003-79599 | 3/2003 |
| JP | 2003-235834 | 8/2003 |
| JP | 3722678 | 11/2005 |
| JP | 2005-334083 | 12/2005 |
| JP | 3773455 | 5/2006 |
| JP | 2006-167094 | 6/2006 |
| JP | 3818488 | 9/2006 |
| JP | 2006-284539 | 10/2006 |
| JP | U3128216 | 12/2006 |
| JP | 2008-49117 | 3/2008 |
| WO | WO 91/11221 | 8/1991 |
| WO | WO 92/12768 | 8/1992 |
| WO | WO 98/40843 | 9/1998 |
| WO | WO 00/12041 | 3/2000 |
| WO | WO 00/57387 | 9/2000 |
| WO | WO 00/69523 | 11/2000 |
| WO | WO 02/29375 | 4/2002 |
| WO | WO 02/057885 | 7/2002 |
| WO | WO 2004/051201 | 6/2004 |
| WO | WO 2004/053629 | 6/2004 |
| WO | WO 2005/043322 | 5/2005 |
| WO | WO 2008/034965 | 3/2008 |
| WO | WO 2008/099582 | 8/2008 |

OTHER PUBLICATIONS

Declaration of R. Lee Rawls in Support of Nintendo Co., Ltd. and Nintendo of America Inc.'S Opposition to IA Labs CA, LLC'S Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), including Exhibits 1, 3-12, 193 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), 7 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Appendix of Exhibits, 2 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 1, 36 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant),

(56) References Cited

OTHER PUBLICATIONS

United States District Court for the District of Maryland Southern Division (May 16, 2011), Exhibit 2, 40 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 3, 85 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 4, 10 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 5, 9 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 6, 17 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 7, 16 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 8, 45 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 9, 4 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 10, 22 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 11, 27 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 12, 3 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 13, 7 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 14, 22 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 15, 45 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 16, 42 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 17, 19 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 18, 27 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 19, 13 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 20, 29 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 21, 25 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 22, 11 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 23, 20 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 24, 7 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 25, 80 pages.

(56) References Cited

OTHER PUBLICATIONS

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 26, 32 pages.

U.S. Trademark Application No. 74/402,755 filed Jun. 14, 1993, 43 pages.

"AccuSway Dual Top: For Balance and Postural Sway Measurement," AMTI: Force and Motion, ISO 9001:2000, 2 pages.

Borzelli G., Cappozzo A., and Papa E., "Inter- and intra-individual variability of ground rejection forces during sit-to-stand with principal component analysis," Medical Engineering & Physics 21 (1999), pp. 235-240.

Chiari L., Cappello A., Lenzi D., and Della Croce U, "An Improved Technique for the Extraction of Stochasitc Parameters from Stabilograms," Gait and Posture 12 (2000), pp. 225-234.

Cutlip R., Hsiao H., Garcia R., Becker E., Mayeux B., "A comparison of different postures for scaffold end-frame disassembly," Applied Ergonomics 31 (2000), pp. 507-513.

Davis K.G., Marras W.S., Waters T.R., "Evaluation of spinal loading during lowering and lifting," The Ohio State University, Biodynamics Laboratory, Clinical Biomechanics vol. 13, No. 3, 1998 pp. 141-152.

Rolf G. Jacob, Mark S. Redfern, Joseph M. Furman, "Optic Flow-induced Sway in Anxiety Disorders Associated with Space and Motion Discomfort," Journal of Anxiety Disorders, vol. 9, No. 5, 1995, pp. 411-425.

Jorgensen M.J., Marras W.S., "The effect of lumbar back support tension on trunk muscle activity," Clinical Biomechanics 15 (2000), pp. 292-294.

Deborah L. King and Vladimir M. Zatsiorsky, "Extracting gravity line displacement from stabilographic recordings," Gait & Posture 6 (1997), pp. 27-38.

Kraemer W.J., Volek J.S., Bush J.A., Gotshalk L.A., Wagner P.R., Gòmez A.L., Zatsiorsky V.M., Duzrte M., Ratamess N.A., Mazzetti S.A., Selle B.J., "Influence of compression hosiery on physiological responses to standing fatigue in women," The Human Performance Laboratory, Medical & Science in Sports & Exercise, 2000, pp. 1849-1858.

Papa E. and Cappozzo A., "A telescopic inverted-pendulum model of the musculo-skeletal system and its use for the analysis of the sit-to-stand motor task," Journal of Biomechanics 32 (1999), pp. 1205-1212.

Balance System, BalanceTrak 500, & Quantrem, ZapConnect.com: Medical Device Industry Portal, http://www.zapconnect.com/products/index/cfm/fuseaction/products, 2 pages. (Retrieved Apr. 5, 2011).

BERTEC: Dominate Your Field, Physician's Quick Guide, Version 1.0.0, Feb. 2010, 13 pages.

BERTEC: Dominate Your Field, Balancecheck Screener, Version 1.0.0, Feb. 2010, 35 pages.

BERTEC: Dominate Your Field, Balancecheck Trainer, Version 1.0.0, Feb. 2010, 37 pages.

BERTEC Corporation—BALANCECHECK Standard Screener Package, http://bertec.com/products/balance-systems/standard-screener.html, 1 page. (Retrieved Apr. 12, 2011).

BERTEC Corporation—Balance Systems: Balancecheck Advanced balance assessment & training products for the balance professional, http://bertec.com/products/balance-systems.html, 1 page. (Retrieved Mar. 31, 2011).

BERTEC Corporation—Balancecheck Mobile Screener Package: Portable balance screening with full functionality, http://bertec.com/products/balance-systems/mobile-screener.html, 1 page. (Retrieved Mar. 31, 2011).

BERTEC Corporation—Balancecheck Standard Screener & Trainer Package: Advanced balance screening and rehabilitation system, http://bertec.com/products/balance-systems/standard-screener-trainer.html, 1 page. (Retrieved Mar. 31, 2011).

U.S. Trademark Application No. 75/136,330 filed Jul. 19, 1996, 47 pages.

BERTEC: Dominate Your Field, Digital Acquire 4, Version 4.0.10, Mar. 2011, 22 pages.

BERTEC: Dominate Your Field, Bertec Force Plates, Version 1.0.0, Sep. 2009, 31 pages.

BERTEC: Dominate Your Field, Product Information: Force Plate FP4060-08:Product Details and Specifications, 4 pages.

BERTEC: Dominate Your Field, Product Information: Force Plate FP4060-10:Product Details and Specifications, 2 pages.

U.S. Trademark Application No. 73/542,230 filed Jun. 10, 1985, 52 pages.

Brent L. Arnold and Randy J. Schmitz, "Examination of Balance Measures Produced by the Biodex Stability System," Journal of Athletic Training, vol. 33(4), 1998, pp. 323-327.

Trademark Registration No. 1,974,115 filed Mar. 28, 1994, 8 pages.

U.S. Trademark Application No. 75/471,542 filed Apr. 16, 1998, 102 pages.

VTI Force Platform, Zapconnect.com: Medical Device Industry Portal, http://zapconnect.com/products/index.cfm/fuseaction/products, 2 pages. (Retrieved Apr. 5, 2011).

Amin M, Girardi M., Konrad H.R., Hughes L., "A Comparison of Electronystagmorgraphy Results with Posturography Findings from the BalanceTrak 500," Otology Neurotology, 23(4), 2002, pp. 488-493.

Girardi M., Konrad H.R., Amin M., Hughes L.F., "Predicting Fall Risks in an Elderly Population: Computer Dynamic Posturography Versus Electronystagmography Test Results," Laryngoscope, 111(9), 2001, 1528-32.

Dr. Guido Pagnacco, Publications, 1997-2008, 3 pages.

College of Engineering and Applied Science: Electrical and Computer Engineering, University of Wyoming, Faculty: Guido Pagnacco, http://wwweng.uwyo.edu/electrical/faculty/Pagnacco.html, 2 pages. (Retrieved Apr. 20, 2011).

EyeTracker, IDEAS, DIFRA, 501(k) Summary: premarket notification, Jul. 5, 2007, 7 pages.

Vestibular technologies, copyright 2000-2004, 1 page.

Scopus preview—Scopus—Author details (Pagnacco, Guido), http:www.scopus.com/authid/detail.url?authorId=6603709393, 2 pages. (Retrieved Apr. 20, 2011).

Vestibular Technologies Company Page, "Vestibular technologies: Helping People Regain their Balance for Life," http:www.vestibtech.com/AboutUs.html, 2 pages. (Retrieved Apr. 20, 2011).

GN Otometrics Launces ICS Balance Platform: Portable system for measuring postural sway, http://audiologyonline.com/news/pf_news_detail.asp?news_id=3196, 1 page. (Retrieved Mar. 31, 2011).

U.S. Trademark Application No. 75/508,272 filed Jun. 25, 1998, 36 pages.

U.S. Trademark Application No. 75/756,991 filed Jul. 21, 1999, 9 pages.

U.S. Trademark Application No. 76/148,037 filed Oct. 17, 2000, 78 pages.

Vestibular technologies, VTI Products: BalanceTRAK User's Guide, Preliminary Version 0.1, 2005, 34 pages.

U.S. Trademark Application No. 76/148,037 filed Oct. 17, 2000, 57 pages.

Vestibular Technologies, Waybackmachine, http://vestibtech.com/balancetrak500.html, 7 pages. (Retrieved Mar. 30, 2011).

Vestibular Technologies, 2004 Catalog, 32 pages.

State of Delaware: The Official Website of the First State, Division of Corporations—Online Services, http://delecorp.delaware.gov/tin/controller, 2 pages. (Retrieved Mar. 21, 2011).

Memorandum in Support of Plaintiff IA Labs' Motion for Partial Summary Judgment on Defendants' Affirmative Defense and Counterclaim That U.S. Pat. No. 7,121,982 is Invalid Under 35 U.S.C. §§ 102 and 103, *IA Labs CA, LLC*, (Plaintiff) v. *Nintendo Co., Ltd. et al.*, (Defendant), United States District Court for the District of Maryland Southern Division (Apr. 27, 2011), 17 pages.

Interface, Inc.—Advanced Force Measurement—SM Calibration Certificate Installation Information, 1984.

Hugh Stewart, "Isometric Joystick: A Study of Control by Adolescents and Young Adults with Cerebral Palsy," The Australian Occupational Therapy Journal, Mar. 1992, vol. 39, No. 1, pp. 33-39.

(56) References Cited

OTHER PUBLICATIONS

Raghavendra S. Rao, et al., "Evaluation of an Isometric and a Position Joystick in a Target Acquisition Task for Individuals with Cerebral Palsy," IEEE Transactions on Rehabilitation Engineering, vol. 8, No. 1, Mar. 2000, pp. 118-125.
D. Sengupta, et al., "Comparative Evaluation of Control Surfaces for Disabled Patients,"Proceedings of the 27th Annual Conference on Engineering in Medicine and Biology, vol. 16, Oct. 6-10, 1974, p. 356.
Ludonauts, "Body Movin'," May 24, 2004, http://web.archive.org/web/20040611131903/http:/www.ludonauts.com; retrieved Aug. 31, 2010, 4 pages.
Atari Gaming Headquarters—AGH's Atari Project Puffer Page, http://www.atarihq.com/othersec/puffer/index.html, retrieved Sep. 19, 2002, 4 pages.
Michael Antonoff, "Real estate is cheap here, but the places you'd most want to visit are still under construction," Popular Science, Jun. 1993, pp. 33-34.
Steve Aukstakalnis and David Blatner, "The Art and Science of Virtual Reality—Silicon Mirage," 1992, pp. 197-207.
Electronics, edited by Michael Antonoff, "Video Games—Virtual Violence: Boxing Without Bruises," Popular Science, Apr. 1993, p. 60.
Stuart F. Brown, "Video cycle race," Popular Science, May 1989, p. 73.
Scanning the Field for Ideas, "Chair puts Player on the Joystick," Machine Design, No. 21, Oct. 24, 1991, XP 000255214, 1 page.
Francis Hamit, "Virtual Reality and the Exploration of Cyberspace," University of MD Baltimore County, 1993, 4 pages.
Ric Manning, "Videogame players get a workout with the Exertainment," The Gizmo Page from the Courier Journal Sep. 25, 1994, 1 page.
Tech Lines, Military—Arcade aces and Aviation—Winging it, Popular Mechanics, Mar. 1982, p. 163.
Sarju Shah, "Mad Catz Universal MC2 Racing Wheel: Mad Catz MC2 Universal," Game Spot, posted Feb. 18, 2005, 3 pages.
Joe Skorupa, "Virtual Fitness," Sports Science, Popular Mechanics, Oct. 1994, 3 pages.
Nintendo Zone—The History of Nintendo (1889-1997), retrieved Aug. 24, 1998 pp. 1, 9-10.
The Legible City, Computergraphic Installation with Dirk Groeneveld, Manhattan version (1989), Amsterdam version (1990), Karlsruhe version (1991), 3 pages.
The New Exertainment System. It's All About Giving Your Members Personal Choices, Life Fitness, Circle Reader Service Card No. 28, 1995, 1 page.
The Race Begins with $85, Randal Windracer, Circle Reader Service Card No. 34, 1990, 1 page.
Universal S-Video/Audio Cable; Product #5015, MSRP 9.99; http://www.madcatz.com/Default.asp?Page=133 &CategoryImg=Universal—Cables, retrieved May 12, 2005, 1 page.
Tom Dang, et al., "Interactive Video Exercise System for Pediatric Brain Injury Rehabilitation," Assistive Technology Research Center, Rehabilitation Engineering Service, National Rehabilitation Hospital, Proceedings of the RESNA 20th Annual Conference, Jun. 1998, 3 pages.
Raymond W. McGorry, "A system for the measurement of grip forces and applied moments during hand tool use," Liberty Mutual Research Center for Safety and Health, Applied Ergonomics 32 (2001) 271-279.
NordicTrack's Aerobic Cross Trainer advertisement as shown in "Big Ideas—For a Little Money: Great Places to Invest $1,000 or Less," Kiplinger's Personal Finance Magazine, Jul. 1994, 3 pages.
Maurice R. Masliah, "Measuring the Allocation of Control in 6 Degree of Freedom Human-Computer Interaction Tasks," Graduate Department of Mechanical and Industrial Engineering, University of Toronto, 2001, 177 pages.
Leigh Ann Roman, "Boing! Combines Arcade Fun with Physical Training," Memphis - Health Care News: Monitoring the Pulse of Our Health Care Community, Sep. 20, 1996, One Section, 1 page.
"No More Couch Potato Kids," as shown in Orange Coast, Sep. 1994, p. 16.
Gary L. Downey, et al., "Design of an Exercise Arcade for Children with Disabilities," Resna, Jun. 26-30, 1998, pp. 405-407.
Frank Serpas, et al., "Forward-dynamics Simulation of Anterior Cruciate Ligament Forces Developed During Isokinetic Dynamometry," Computer Methods in Biomechanics and Biomedical Engineering, vol. 5 (1), 2002, pp. 33-43.
Carolyn Cosmos, "An 'Out of Wheelchair Experience'", The Washington Post, May 2, 2000, 3 pages.
David H. Ahl, "Controller update," Creative Computing, vol. 9, No. 12, Dec. 1983, p. 142.
Ian Bogost, "Water Cooler Games—The Prehistory of Wii Fit," Videogame Theory, Criticism, Design, Jul. 15, 2007, 2 pages.
Jeremy Reimer, "A history of the Amiga, part 2: The birth of Amiga," last updated Aug. 12, 2007, 2 pages.
The Amiga Joyboard (1982) image, Photos: Fun with plastic—peripherals that changed gaming; http://news.cnet.com/2300-27076_3-10001507-2.html (retrieved Jul. 23, 2010), 1 page.
The Amiga Power System Joyboard, Amiga history guide, http://www.amigahistory.co.uk/joyboard.html (retrieved Jul. 23, 2010), 2 pages.
"Joyboard," Wikipedia—the free encyclopedia, http://en.wikipedia.org/wiki/Joyboard (retrieved Jul. 26, 2010), 2 pages.
"Dance Dance Revolution," Wikipedia—the free encyclopedia, http://en.wikipedia.org/wiki/Dance Dance Revolution (retrieved Jul. 23, 2010), 9 pages.
"Cure for the couch potato," Kansas City Star (MO), Jan. 2, 2005, WLNR 22811884, 1 page.
JC Fletcher, "Virtually Overlooked: The Power Pad games," Joystiq, http://www.joystiq.com/2007/09/20/virtually-overlooked-the-power-pad-games/ (retrieved Jul. 26, 2010), 3 pages.
"Power Pad/Family Fun and Fitness/Family Trainer," http://www.gamersgraveyard.com/repository/nes/peripherals/powerpad.html (retrieved Jul. 26, 2010), 2 pages.
"Power Pad Information," Version 1.0 (Sep. 23, 1999) http://www.gamersgraveyard.com/repository/nes/peripherals/powerpad.txt (retrieved Jul. 26, 2010), 2 pages.
Wii+Power+Pad.jpg (image), http://bpl.blogger.com/_J5LEiGp54I/RpZbNpnLDgl/AAAAAAAAAic/Gum6DD3Umjg/s1600-h/Wii+Power+Pad.jpg (retrieved Jul. 26, 2010), 1 page.
Vs. Slalom—Videogame by Nintendo, KLOV—Killer List of Video Games, http://www.arcade-museum.com/game_detail.php?game_id=10368 (retrieved Jul. 26, 2010), 3 pages.
"Nintendo Vs. System," Wikipedia—the free encyclopedia, http://en.wikipedia.org/wiki/Nintendo_Vs._System (retrieved Jul. 26, 2010), 3 pages.
HyperspaceArcade.com—Specialists in Arcade Video Game Repair and Restoration, http://www.hyperspacearcade.com/VSTypes.html (retrieved Jul. 3, 2010), 3 pages.
Vs. Slalom—Attachment Pak Manual; For Installation in: VS. UniSystem (UPRIGHT) and VS. DualSystem (UPRIGHT), TM of Nintendo of America Inc., 1986, 15 pages.
Leiterman, "Project Puffer: Jungle River Cruise," Atari, Inc., 1982, 2 pages.
Leiterman, "Project Puffer: Tumbleweeds," Atari, Inc., 1982, 1 page.
Trevor Meers, "Virtually There: VR Entertainment Transports Players to Entrancing New Worlds," Smart Computing, vol. 4, Issue 11, Nov. 1993, 6 pages.
"Dance Aerobics," Moby Games, Feb. 12, 2008, 2 pages.
Electronic Entertainment Expo (E3) Overview, Giant Bomb—E3 2004 (video game concept), http://www.giantbomb.com/e3-2004/92-3436/ (retrieved Sep. 3, 2010), 3 pages.
Michael Goldstein, "Revolution on Wheels—Thatcher Ulrich," Nov.-Dec. 1994, 3 pages.
Fitness article, Sep. 1994, p. 402-404.
"Wired Top 10: Best Selling Toys in Jun. 1994," Wired Sep. 1994, 1 page.
Complaint for Patent Infringement, *IA Labs CA, LLC v. Nintendo Co., Ltd. and Nintendo of America, Inc.*, United States District Court for the District of Maryland Northern Division (Apr. 2, 2010), 317 pages.

(56) References Cited

OTHER PUBLICATIONS

Plaintiff IA Labs CA, LLC's Opening Claim Construction Brief, *IA Labs CA, LLC* v. *Nintendo Co., Ltd. and Nintendo of America, Inc.*, United States District Court for the District of Maryland Southern Division (Dec. 13, 2010), 36 pages.
Nintend Co., Ltd. and Nintendo of America Inc.'s Opening Claim Construction Brief, *IA Labs CA, LLC* v. *Nintendo Co., Ltd. and Nintendo of America, Inc.*, United States District Court for the District of Maryland Southern Division (Dec. 13, 2010), 55 pages.
Plaintiff IA Labs CA, LLC's Response Claim Construction Brief, *IA Labs CA, LLC* v. *Nintendo Co., Ltd. and Nintendo of America, Inc.*, United States District Court for the District of Maryland Southern Division (Jan. 6, 2011), 49 pages.
Nintendo Co., Ltd. and Nintendo of America Inc.'s Closing Claim Construction Brief, *IA Labs CA, LLC* v. *Nintendo Co., Ltd. and Nintendo of America, Inc.*, United States District Court for the District of Maryland Southern Division (Jan. 6, 2011), 25 pages.
Expert Report of Lee Rawls, Nov. 2, 2010, 37 pages. (redacted).
Addlesee, M.D., et al., "The ORL Active Floor," IEEE—Personal Communications, Oct. 1997.
Baek, Seongmin, et al., "Motion Evaluation for VR-based Motion Training," Eurographics 2001, vol. 20, No. 3, 2001.
Chen, I-Chun, et al., "Effects of Balance Training on Hemiplegic Stroke Patients," Chang Gung Medical Journal, vol. 25, No. 9, pp. 583-590, Sep. 2002.
Dingwell, Jonathan, et al., "A Rehabilitation Treadmill with Software for Providing Real-Time Gait Analysis and Visual Feedback," Transactions of the ASME, Journal of Biomechanical Engineering, 118 (2), pp. 253-255, 1996.
Geiger, Ruth Ann, et al., "Balance and Mobility Following Stroke: Effects of Physical Therapy Interventions With and Without Biofeedback/Forceplate Training," Physical Therapy, vol. 81, No. 4, pp. 995-1005, Apr. 2001.
Harikae, Miho, "Visualization of Common People's Behavior in the Barrier Free Environment," Graduate Thesis—Master of Computer Science and Engineering in the Graduate School of the University of Aizu, Mar. 1999.
Hodgins, J.K., "Three-Dimensional Human Running," Proceedings: 1996 IEEE International Conference on Robotics and Automation, vol. 4, Apr. 1996.
Kim, Jong Yun, et al., "Abstract—A New VR Bike System for Balance Rehabilitation Training," Proceedings: 2001 IEEE Seventh International Conference on Virtual Systems and Multimedia, Oct. 2001.
McComas, Joan, et al., "Virtual Reality Applications for Prevention, Disability Awareness, and Physical Therapy Rehabilitation in Neurology: Our Recent Work," School of Rehabilitation Sciences, University of Ottawa—Neurology Report, vol. 26, No. 2, pp. 55-61, 2002.
Nicholas, Deborah S, "Balance Retraining After Stroke Using Force Platform Feedback," Physical Therapy, vol. 77, No. 5, pp. 553-558, May 1997.
Redfern, Mark, et al., "Visual Influences of Balance," Journal of Anxiety Disorders, vol. 15, pp. 81-94, 2001.
Sackley, Catherine, "Single Blind Randomized Controlled Trial of Visual Feedback After Stroke: Effects on Stance Symmetry and Function," Disavility and Rehabilitation, vol. 19, No. 12, pp. 536-546, 1997.
Tossavainen, Timo, et al., "Postural Control as Assessed with Virtual Reality," Acta Otolaryngol, Suppl 545, pp. 53-56, 2001.
Tossavainen, Timo, et al., "Towards Virtual Reality Simulation in Force Platform Posturography," MEDINFO, pp. 854-857, 2001.
Tsutsuguchi, Ken, et al., "Human Walking Animation Based on Foot Reaction Force in the Three-Dimensional Virtual World," The Journal of Visualization and Computer Animation, vol. 11, pp. 3-16, 2000.
Wong, Alice, et al., "The Development and Clinical Evaluation of a Standing Biofeedback Trainer," Journal of Rehabilitation Research and Development, vol. 34, No. 3, pp. 322-327, Jul. 1997.
Yang, Ungyeon, et al., "Implementation and Evaluation of 'Just Follow Me': An Immersive, VR-Based, Motion-Training System," Presence, vol. 11, No. 3, pp. 304-323, 2002.
Search Report (2 pgs.) dated May 27, 2011 issued in German Application No. 20 2004 021 793.7.
Japanese Office Action issued for corresponding JP Patent Application No. 2007-111177, dated Dec. 26, 2012.

* cited by examiner

FIG. 12
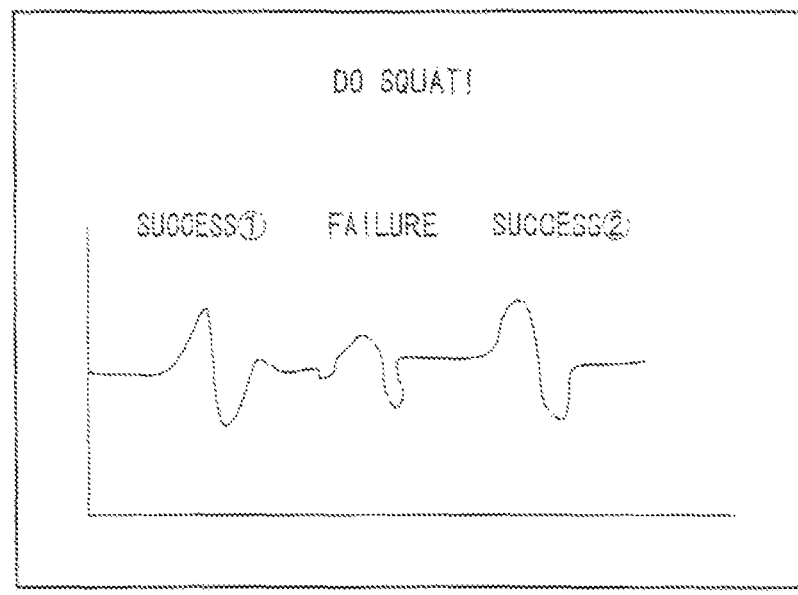
FIG. 13
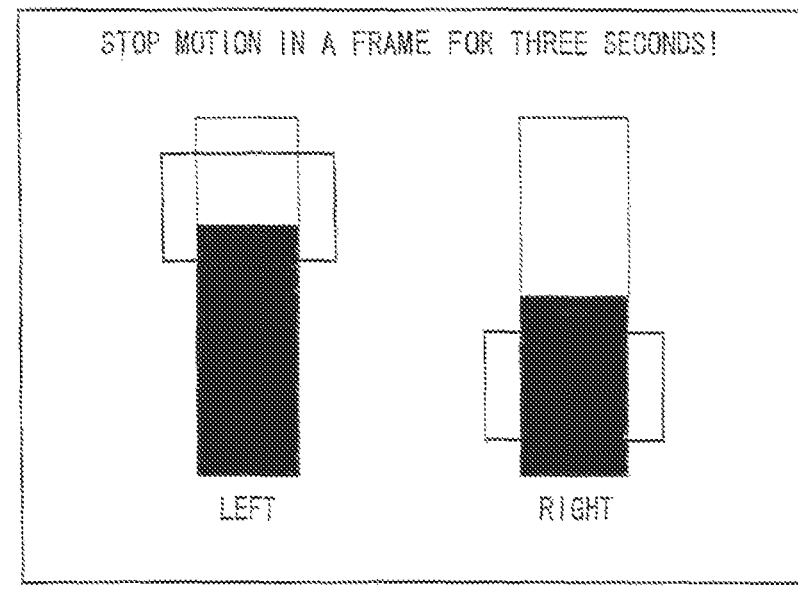
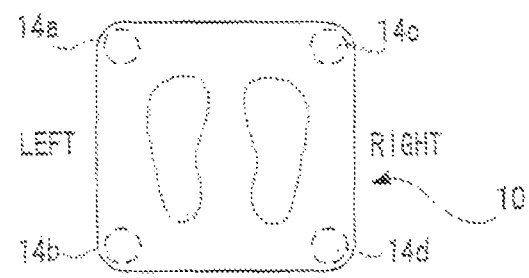

FIG. 14
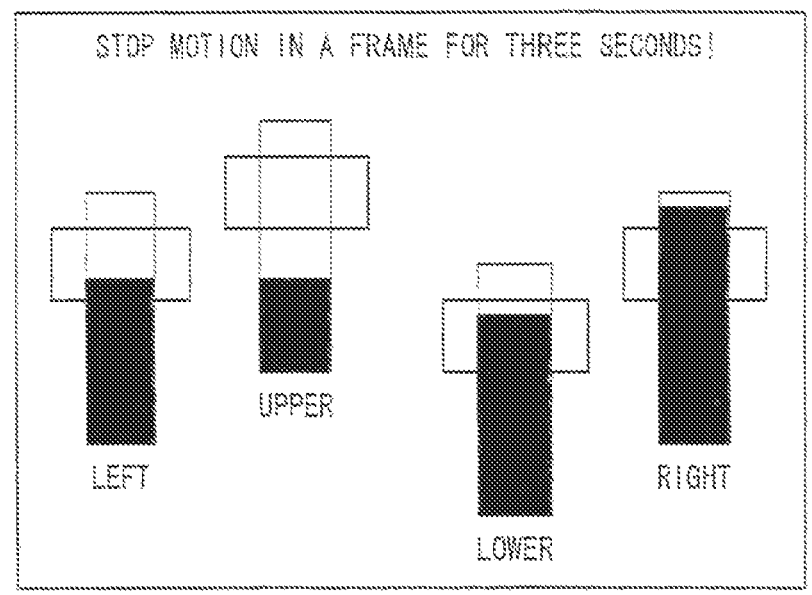
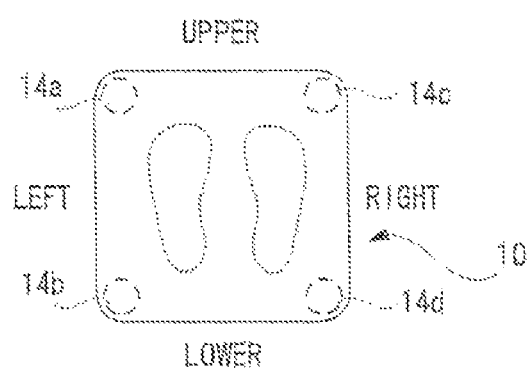

FIG. 23
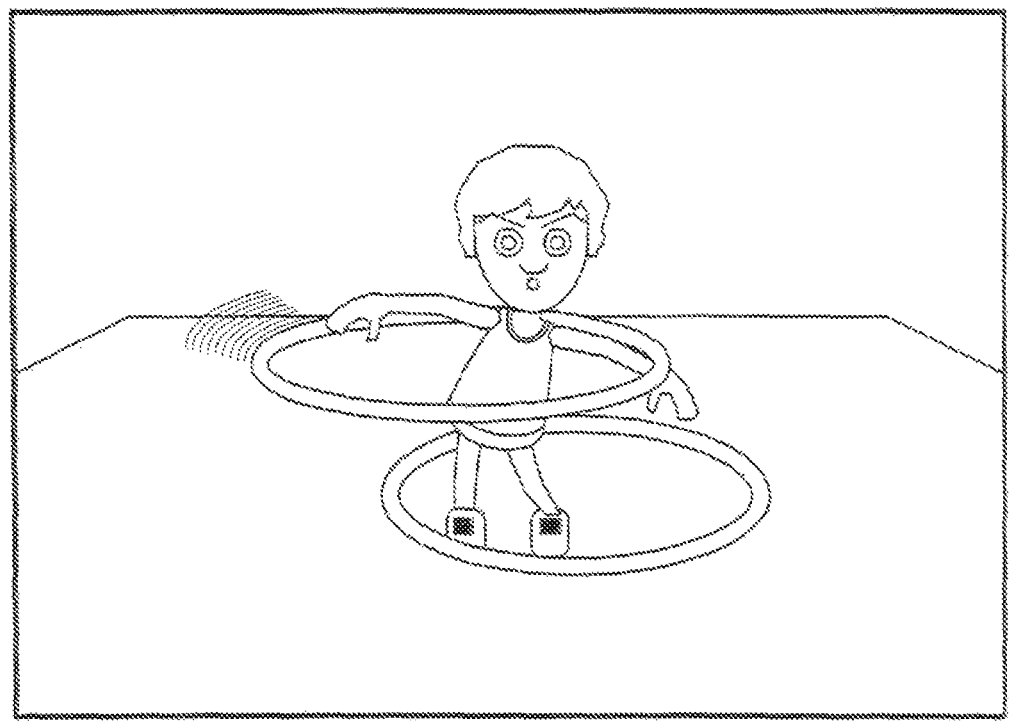
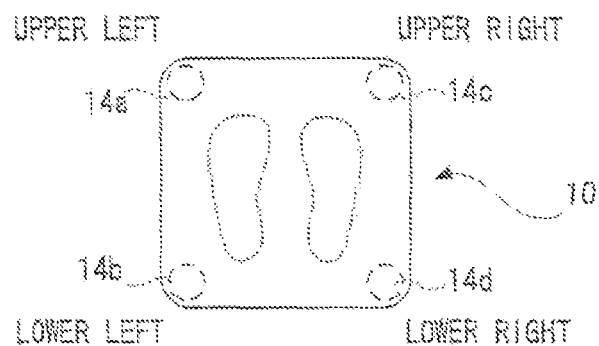
FIG. 24
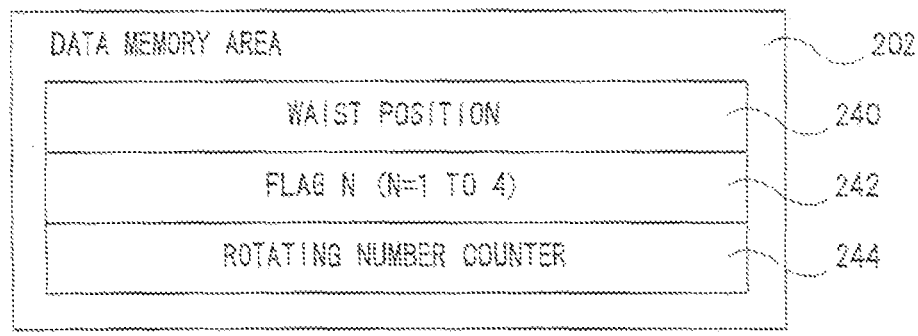

FIG. 27
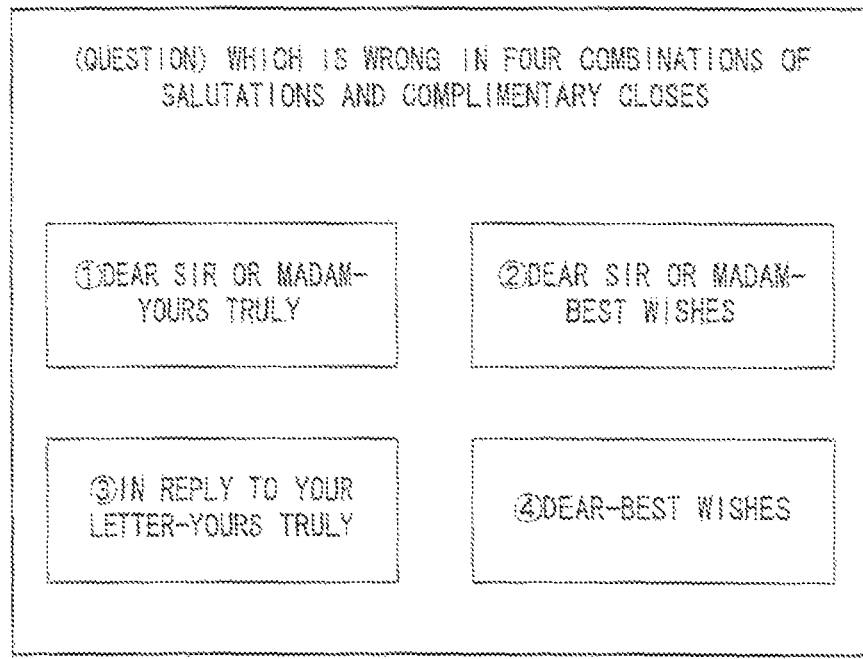
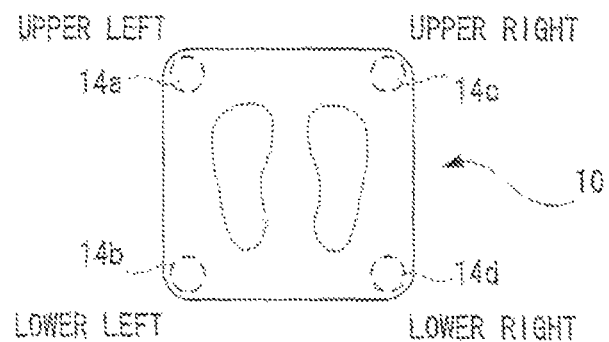
FIG. 28
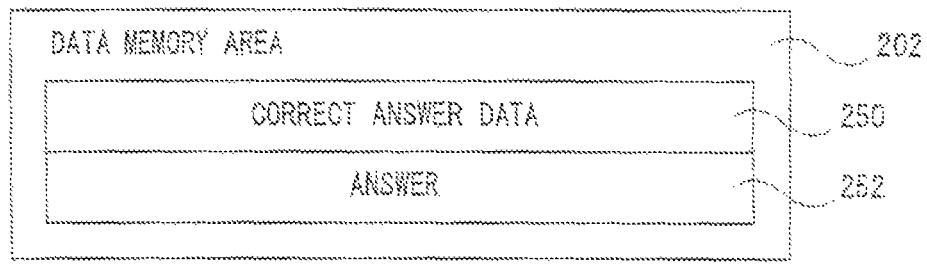

FIG. 30
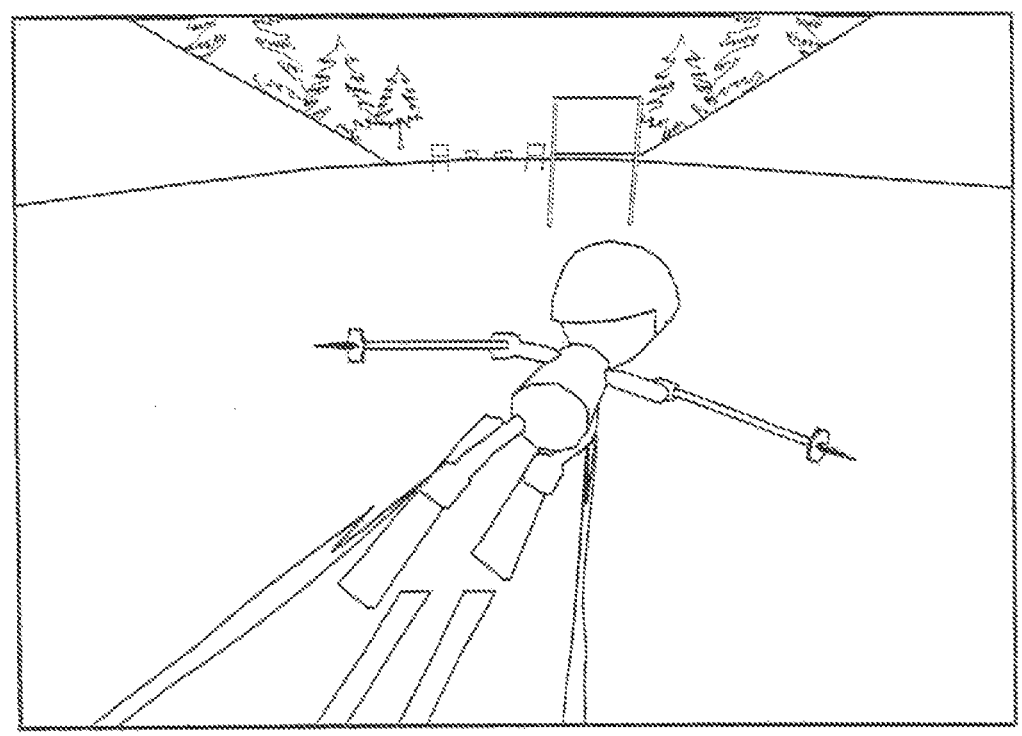
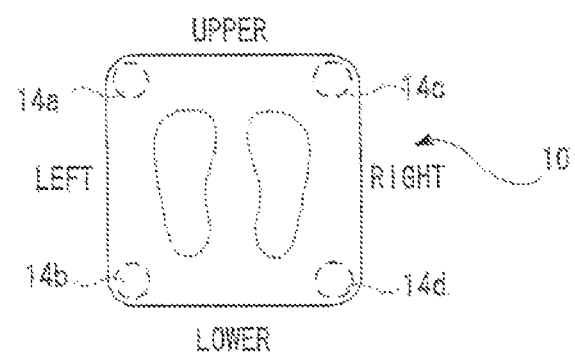
FIG. 31
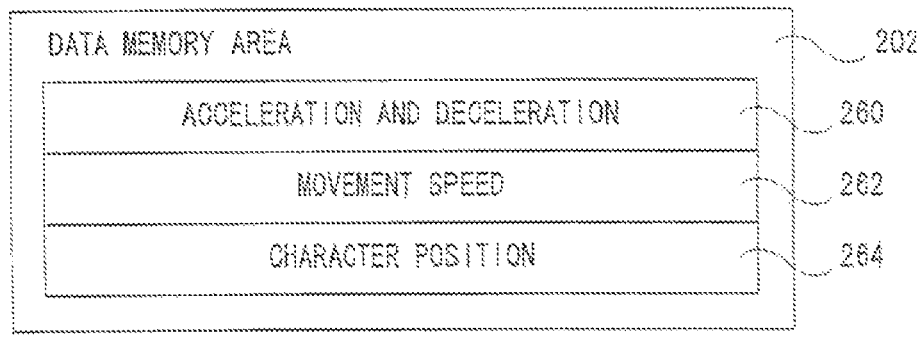

FIG. 33
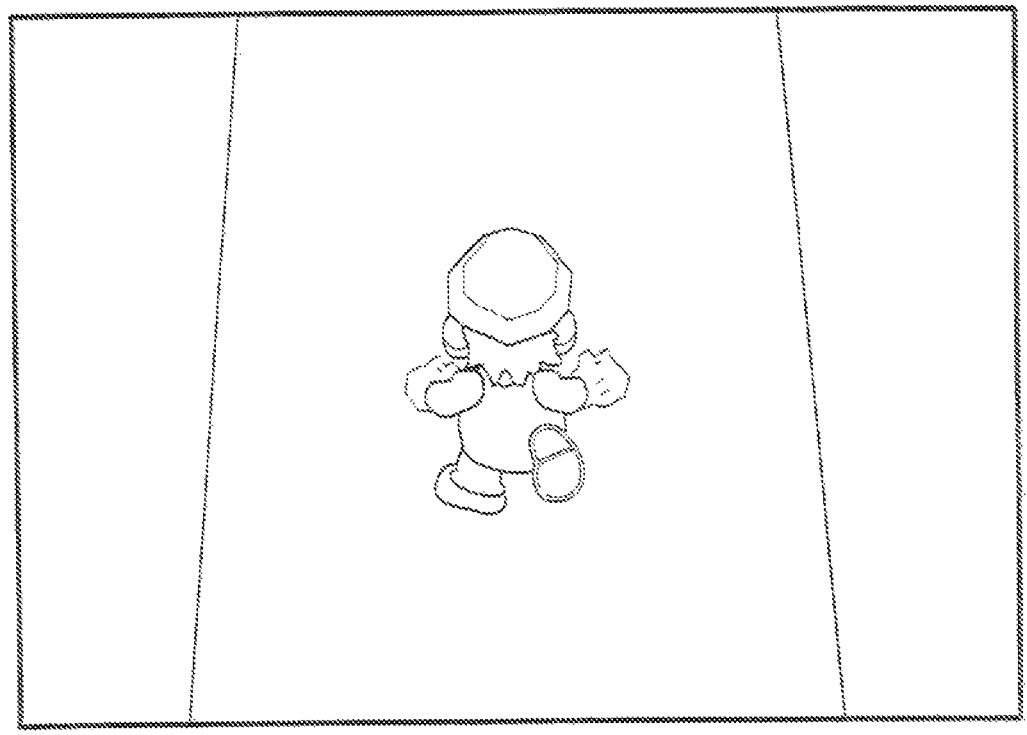
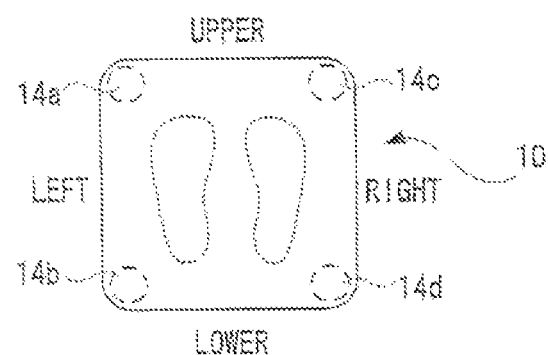
FIG. 34
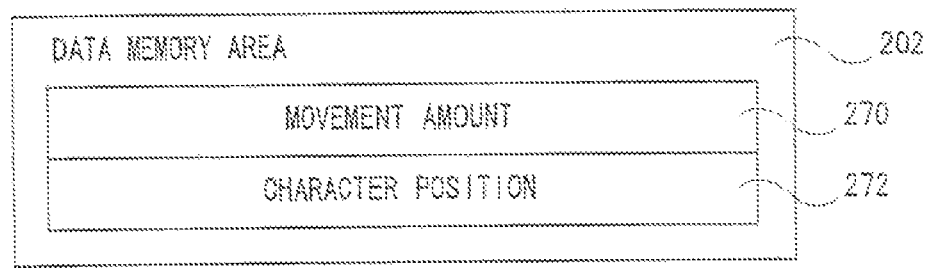

FIG. 36
(A) FIELD SCENE
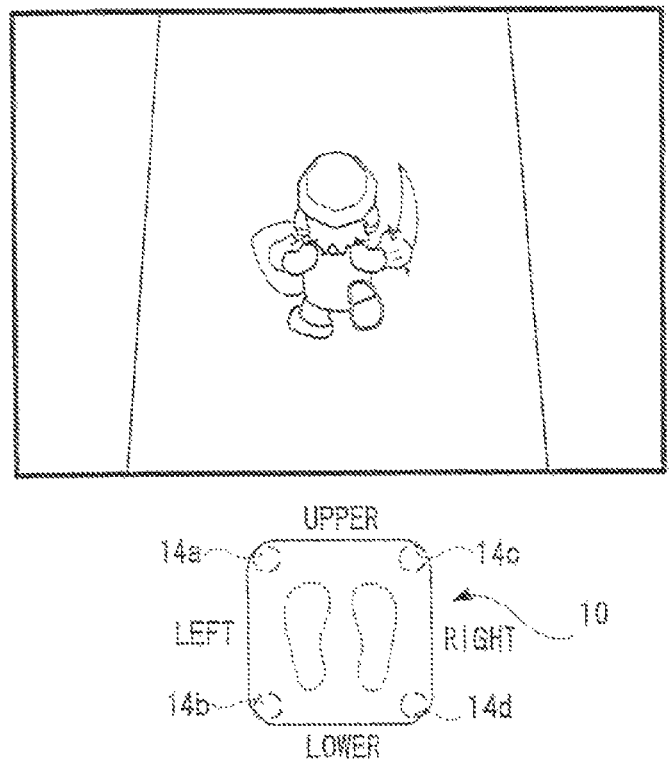
(B) BATTLE SCENE
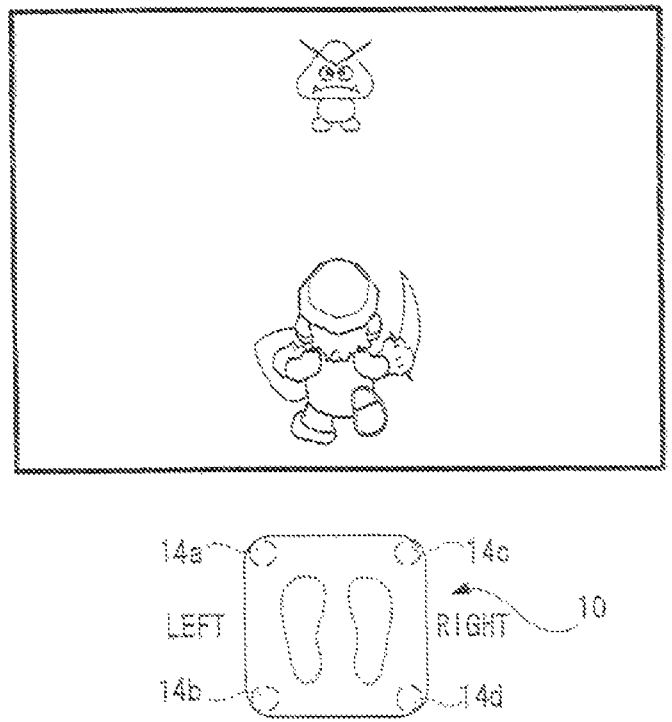

FIG. 41
FIELD SCENE
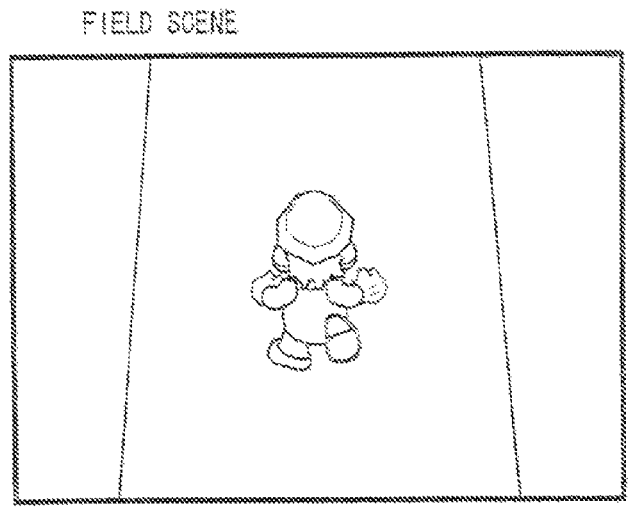
COORDINATE SYSTEM ON SCREEN
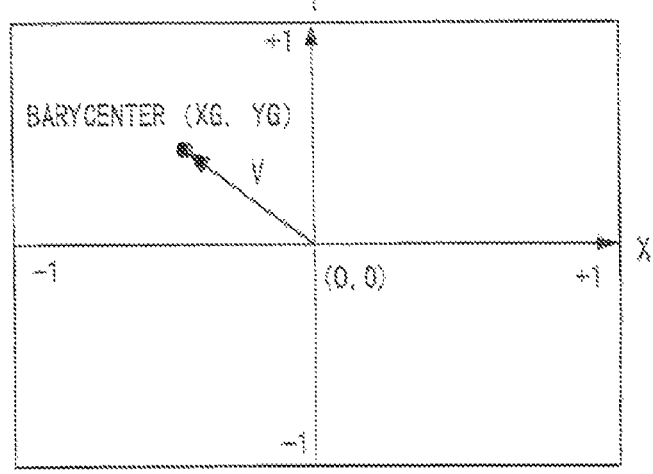
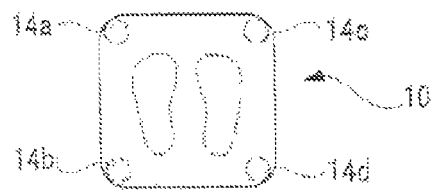
ASSUMING THAT a IS VALUE OF UPPER-LEFT LOAD SENSOR, b IS VALUE OF LOWER-LEFT LOAD SENSOR, c IS VALUE OF UPPER-RIGHT LOAD SENSOR, AND d IS VALUE OF LOWER-RIGHT LOAD SENSOR.
X COORDINATE OF BARYCENTER: $XG = ((c+d)-(a+b))*m$
Y COORDINATE OF BARYCENTER: $YG = ((a+c)-(b+d))*n$
WHERE m AND n ARE CONSTANT FIG. 42
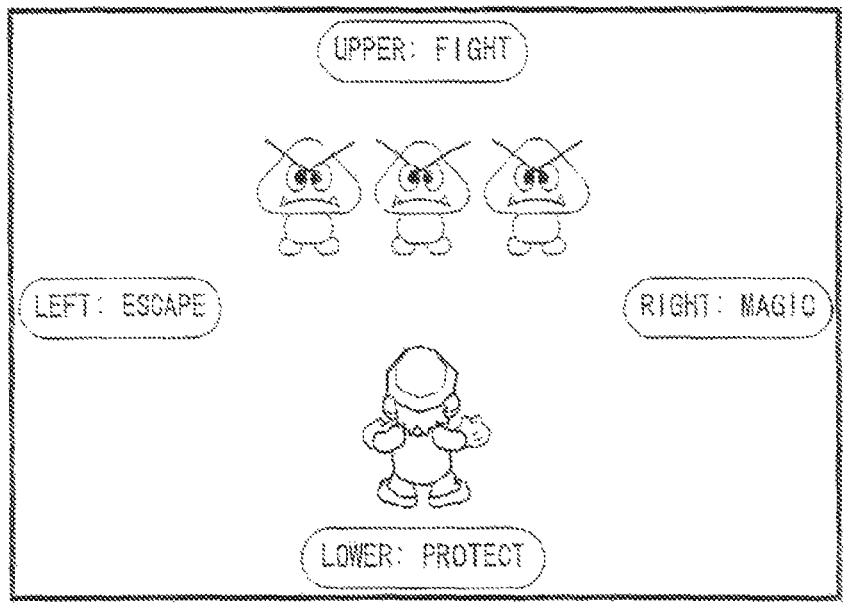
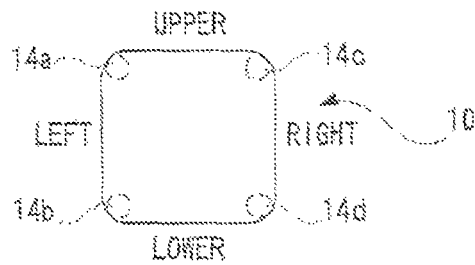
FIG. 43
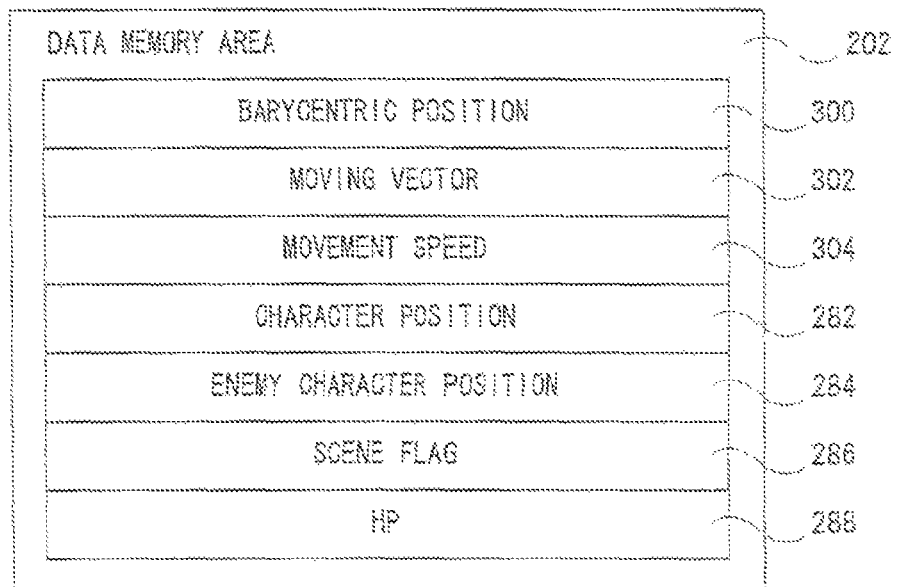

GAME CONTROLLER, STORAGE MEDIUM STORING GAME PROGRAM, AND GAME APPARATUS

CROSS REFERENCE OF RELATED APPLICATION

This application is a continuing application of U.S. patent application Ser. No. 13/313,841 filed Dec. 7, 2011, which is a continuing application of U.S. patent application Ser. No. 12/073,327, filed Mar. 4, 2008, (now U.S. Pat. No. 8,100,770 issued Jan. 24, 2012), and is based upon and claims the benefit of priority from Japanese Patent Application No. 2007-111177, filed on Apr. 20, 2007, the entire contents of all are incorporated herein by reference.

BACKGROUND OF THE INVENTION

1. Field of the Invention

The present invention relates to a game controller, a storage medium storing a game program, and a game apparatus, and particularly to the game controller including a plurality of load sensors, the storage medium storing a game program for performing game processing with the game controller, and the game apparatus.

2. Description of the Related Art

Conventionally, there is known a load detecting device including a plurality of load sensors in the field of medical equipment for the purpose of training such as rehabilitation.

For example, Japanese Patent Publication Laid-Open No. 62-34016 discloses a variable load display apparatus including the two load sensors. In the variable load display apparatus, legs are ridden on the load sensors respectively, and a balance between right and left is measured by displaying load values detected from the two load sensors.

Japanese Patent Publication Laid-Open No. 7-275307 discloses a barycentric movement training apparatus including three load detecting means. In the barycentric movement training apparatus, legs are ridden on a detecting board in which the three load detecting means are provided. A barycentric position is computed and displayed by computation of signals detected from the three load detecting means, thereby conducting barycentric movement training.

On the other hand, in a conventional general-purpose game controller, a cross key, for example, is provided, and at least four-directional instructions can be issued.

In view of the application of the apparatus including the load sensor of Japanese Patent Publication Laid-Open Nos. 62-34016 and 7-275307 to the game controller, only the instructions in the right and left directions are enabled using outputs of the right and left sensors in the technique disclosed in Japanese Patent Publication Laid-Open No. 62-34016, and the instructions in the three directions are enabled using the load values of the three load detecting means in the technique disclosed in Japanese Patent Publication Laid-Open No. 7-275307.

Thus, unfortunately the techniques disclosed in Japanese Patent Publication Laid-Open Nos. 62-34016 and 7-275307 are hardly used as the general-purpose game controller in which manipulations are required in at least four directions.

In the technique disclosed in Japanese Patent Publication Laid-Open No. 62-34016, because the values detected from the two load sensors are directly used, only simple measurement can be performed to hardly make an interesting game, even if the technique is applied to the game processing.

In the technique disclosed in Japanese Patent Publication Laid-Open No. 7-275307, the barycentric position is computed by the three load detecting means and an image indicating the barycentric position is displayed. However, various quantities of load values are not computed from the signals of the three load detecting means.

SUMMARY OF THE INVENTION

In view of the foregoing, an object of the present invention is to provide a novel game controller.

Another object of the present invention is to provide a game controller that can perform various manipulations using the load sensor.

Still another object of the present invention is to provide a novel storage medium storing a game program, in which a game controller including a plurality of load sensors is used, and a game apparatus.

Still another object of the present invention is to provide a storage medium storing a game program, which can compute a quantity of load values necessary for game processing to perform game processing using a game controller including a plurality of load sensors, and a game apparatus.

In the present invention, the following configurations are adopted to solve the problems. A parenthetic reference numeral and supplementary explanation indicate correlation with the later-described embodiments for the purpose of the easy understanding of the present invention, and do not restrict the present invention.

In a first aspect of the present invention, a game controller used in a game machine, includes a support portion on which player's legs are ridden; at least four load sensors disposed at predetermined intervals below the support portion; and a communication means for transmitting a load value as manipulation data detected from each of the four load sensors.

In the first aspect of the present invention, the game controller (10) is used as the manipulation means or input means of the game machine (52). The game controller includes the support portion (16) on which the player's legs are ridden, and at least the four load sensors (14) are disposed at predetermined intervals below the support portion. The load applied by the player ride on the support portion is detected by the four load sensors. The communication means (20, 42, S7) transmits the load value as the manipulation data detected from each of the four load sensors. Accordingly, in the game machine, the game can be performed based on the load values detected by the four load sensors.

According to the first aspect of the present invention, the four load sensors are provided, and the load value as the manipulation data detected from each of the four load sensors is transmitted to the game machine, so that the game controller that can perform various manipulations using the load applied by the player can be provided.

In a second aspect of the present invention, preferably a game controller according to the first aspect of the present invention further includes a power supply unit that supplies electric power to the load sensor; and a power supply control means for controlling power supply from the power supply unit to the load sensor, wherein the communication means includes a reception determining means for determining whether or not a load obtaining command is received from the game machine, the power supply control means supplies electric power from the power supply unit to the load sensor when the reception determining means determines that the load obtaining command is received, and the power supply control means stops electric power supply from the power supply unit to the load sensor when the reception determining means determines that the load obtaining command is not received.

In the second aspect of the present invention, the power supply from the power supply unit (30) to the load sensor is controlled by the power supply control means (20, 26). Specifically, the electric power is supplied to the load sensor when the reception determining means (20, S1) determines that the load obtaining command is received from the game machine, and the electric power supply is stopped when the reception determining means determines that the load obtaining command is not received. Accordingly, the electric power is supplied to detect the load only when the load is required, so that power consumption for operating the load sensor can be suppressed.

A third aspect of the present invention is a game controller according to the first aspect of the present invention, preferably the communication means includes a wireless communication unit receiving wirelessly the load obtaining command from the game machine; and a processing means for imparting the load value as the manipulation data detected from each of the four load sensors to the wireless communication unit when the wireless communication unit receives the load obtaining command, and the wireless communication unit wirelessly transmits the manipulation data received from the processing means to the game machine.

In the third aspect of the invention, the wireless communication unit (42) conducts wireless communication with the game machine. The processing means (20) imparts the load value as the manipulation data detected from each of the four load sensors to the wireless communication unit when the load obtaining command is received and the wireless communication unit transmits the manipulation data to the game machine. Accordingly, the wireless game controller that can wirelessly transmit and receive the data to and from the game machine can be provided.

A fourth aspect of the present invention is a game controller according to the second aspect of the present invention, preferably the communication means includes a wireless communication unit receiving wirelessly the load obtaining command from the game machine; and a processing means for imparting the load value as the manipulation data detected from each of the four load sensors to the wireless communication unit when the wireless communication unit receives the load obtaining command, and the wireless communication unit transmits wirelessly the manipulation data received from the processing means to the game machine.

In the fourth aspect of the present invention, similarly to the third aspect of the present invention, the wireless game controller that can wirelessly transmit and receive the data to and from the game machine can be provided.

A fifth aspect of the present invention is a game controller according to the first aspect of the present invention, preferably the communication means includes a connector unit detachable from a different type of game controller, and the communication means transmits the load value to the game machine through the different type of game controller attached to the connector unit.

In the fifth aspect of the present invention, the game controller is connected to the different type of game controller (54) by the connector unit (24). The communication means transmits the load value to the game machine through the different type of game controller. Accordingly, the extended type game controller that is used while attached to the different type of game controller by the connector unit can be provided.

A sixth aspect of the present invention is a game controller according to the first aspect of the present invention, preferably the communication means includes a command determining means for determining which load obtaining command in a plurality of types of load obtaining commands is received from the game machine; and a manipulation data computing means for computing a predetermined quantity of pieces of manipulation data according to the load obtaining command determined by the command determining means from the load value detected from each of the four load sensors.

In the sixth aspect of the present invention, the command determining means (20, S621 to S625) determines the type of load obtaining command from the game machine. The manipulation data computing means (20, S627, S631, S633) computes the predetermined quantity of pieces of manipulation data according to the determined command. Accordingly, because the quantity of pieces of manipulation data according to the command can be transmitted to the game machine, various quantities of pieces of manipulation data can be imparted to the game machine according to contents of the game.

In a seventh aspect of the present invention, preferably a game controller according to the first aspect of the present invention further includes a manipulation button provided in a surface different from an upper surface of the support portion to be manipulated by the player's legs.

In the seventh aspect of the invention, the manipulation button (40) manipulated by the player's legs is provided in the surface different from the upper surface of the support portion on which the player rides. When the manipulation button is manipulated, the communication means transmits the manipulation data of the manipulation button to the game machine. Accordingly, the game controller in which button manipulation can be performed by the legs can be provided.

In an eighth aspect of the present invention, a storage medium stores a game program executed in a computer of a game machine that performs a game using a game controller including a plurality of load sensors, wherein the game program causes the computer to execute a detection value obtaining step of obtaining a detection value outputted from each of the plurality of load sensors; a quantity determining step of determining a quantity of load values necessary for game processing; a load value computing step of computing the quantity of load values determined by the quantity determining step from a plurality of detection values; and a game processing step of performing game processing based on the load value.

In the eighth aspect of the present invention, the game program is executed by the computer (82) of the game machine (52), and the game is performed using the game controller (10) including the plurality of load sensors (14) in the game machine. The detection value outputted from each of the plurality of load sensors is obtained in the detection value obtaining step (S49, S399). The quantity of load values necessary for the game processing is determined in the quantity determining step (S53 to S57, S403, S405). The determined quantity of load values are computed from the plurality of detection values in the load value computing step (S101, S151, S153, S181, S311, S351, S431, S471, S511, S543). The game processing is performed based on the load value in the game processing step (S59, S61, S63, S407, S409).

According to the eighth aspect of the present invention, the quantity of load values necessary for the game processing, and the necessary quantity of load values is computed from the plurality of load detection values. Therefore, various quantities of load values can be used in the game by a combination of values of the plurality of load sensors, and novel play can be proposed.

A ninth aspect of the present invention is a storage medium storing a game program according to the eighth aspect of the present invention, preferably the game program causes the computer to further execute a selection step of causing a player to select a type of game, and the quantity determining step determines the necessary quantity according to the type of game by determining the type of game.

In the ninth aspect of the present invention, the type of game is selected by the player in the selection step (S43). In the quantity determining step (S53 to S57), the type of game is determined, and the necessary quantity according to the type of game is determined. According to the ninth aspect of the present invention, the necessary quantity of load values can appropriately be set in each game, and the necessary quantity of load values can be computed in each playing game to perform the game processing, so that various games can be proposed.

A tenth aspect of the present invention is a storage medium storing a game program according to the eighth aspect of the present invention, preferably the game program causes the computer to further execute a difference computing step of computing difference of the detection values outputted from the plurality of load sensors; and a correction step of correcting the detection value based on the difference computed by the difference computing step.

In the tenth aspect of the present invention, the difference of the detection values outputted from the plurality of load sensors is computed in the difference computing step (S41, S77, S85). In the correction step (S51, S401), the detection value is corrected based on the computed difference. Accordingly, a fluctuation in load detection value caused by an attitude and a standing position, etc. of the player can properly be corrected.

An eleventh aspect of the present invention is a storage medium storing a game program according to the tenth aspect of the present invention, preferably the difference computing step includes a first difference computing step of dividing the detection values into first two sets to compute difference between the first two sets, the detection value being outputted from each of the plurality of load sensors; and a second difference computing step of dividing the detection values into second two sets to compute difference between the second two sets, the detection value being outputted from each of the plurality of load sensors, the second two sets being different from the first two sets, and the correction step corrects the detection value based on the first difference and the second difference.

In the eleventh aspect of the present invention, the plurality of detection values are divided into the first two sets to compute the difference between the first two sets in the first difference computing step (S77). The plurality of detection values are divided into the second two sets different from the first two sets to compute the difference between the second two sets in the second difference computing step (S85). In the correction step, the detection value is corrected based on the first difference and the second difference. The plurality of load detection values are corrected based on the two types of differences of the different combinations, so that accuracy of load value correction can be improved.

A twelfth aspect of the present invention is a storage medium storing a game program according to the eighth aspect of the present invention, preferably the game program causes the computer to further execute a load value comparing step of comparing the load values computed by the load value computing step, and the game processing step performs the game processing based on the load value that is determined to be the largest value as a result of comparison in the load value comparing step.

In the twelfth aspect of the present invention, the computed load values are compared to another in the load value comparing step (S211 to S217, S271 to S277, S353 to S357, S433 to S437, S545 to S549), and the game processing is performed based on the maximum load value in the game processing step (S219 to S233, S279 to S285, S359 to S373, S439 to S453, S551 to S557).

According to the twelfth aspect of the present invention, the largest load value is selected in the plurality of load values, and the game processing can be performed based on the selected load value. Accordingly, a novel manipulation can be realized by such simple processing that a character is moved in one of the vertical and horizontal directions according to the selected load value.

A thirteenth aspect of the present invention is a storage medium storing a game program according to the eighth aspect of the present invention, preferably the quantity determining step determines the necessary quantity according to a scene by determining the scene in the game.

In the thirteenth aspect of the present invention, the necessary quantity is determined according to the scene by determining the scene in the game in the quantity determining step (S403, S405). According to the thirteenth aspect of the invention, the necessary quantity of load values can appropriately be set in each scene of the game, and the necessary quantity of load values can be computed in each scene of the game to perform the game processing. Therefore, the game can be played by various manipulations.

In a fourteenth aspect of the present invention, a storage medium stores a game program executed in a computer of a game machine that performs a game using a game controller including the plurality of load sensors, wherein the game program causes the computer to execute a quantity determining step of determining a quantity of load values necessary for game processing; a command transmitting step of transmitting a command according to the quantity determined by the quantity determining step to the game controller; a load value obtaining step of obtaining the quantity of load values according to the command from the game controller; and a game processing step of performing game processing based on the load value obtained by the load value obtaining step.

In the fourteenth aspect of the present invention, the game program is executed in the computer (82) of the game machine (52), and the game is performed using the game controller (10) including the plurality of load sensors (14) in the game machine. The quantity of load values necessary for the game processing is determined in the quantity determining step (S53 to S57, S403, S405). The command according to the determined quantity is transmitted to the game controller in the command transmitting step (S581, S585, S589, S601, S605). The quantity of load values according to the command is obtained from the game controller in the load value obtaining step (S583, S587, S591, S603, S607). The game processing is performed based on the obtained load value in the game processing step (S59, S61, S63, S407, S409).

According to the fourteenth aspect of the present invention, the command according to the necessary quantity is transmitted to the game controller, and the necessary quantity of load values according to the command can be obtained from the game controller. Therefore, the game processing can be performed based on the various quantities of load values according to contents of the game. Accordingly, various quantities of load values can be used in the game by a combination of values of the plurality of load sensors, and novel play can be proposed.

In a fifteenth aspect of the present invention, a game apparatus executing a game played by a load of a player includes a manipulation means including a support portion on which player's legs are ridden and a plurality of load sensors detecting a load applied to the support portion; a quantity determining means for determining a quantity of load values necessary for game processing; a load value computing means for computing the quantity of load values based on a detection value detected by each of the plurality of load sensors, the quantity of load values being determined by the quantity determining step; and a game processing means for performing the game processing based on the load value computed by the load value computing means.

In the fifteenth aspect of the present invention, the game apparatus (50,52) includes the manipulation means (10) to perform the game played by the load of the player, and the manipulation means includes the support portion (16) on which the player's legs are ridden and the plural load sensors (14) detecting the load applied to the support portion. The quantity determining means (82, S53 to S57, S403 to S405, 20, S621 to S625) determines the quantity of load values necessary for the game processing. The load value computing means (82, S101, S151, S153, S181, S311, S351, S431, S471, S511, S543, 20, S627, S631, S633) computes the determined quantity of load values based on the detection values of the plurality of load sensors. The game processing means (82, S59, S61, S63, S407, S409) performs the game processing based on the computed load value.

According to the fifteenth aspect of the present invention, the four load sensors are provided in the manipulation means, the quantity of load values necessary for the game processing is determined, and the necessary quantity of load values is computed from the plurality of load detection values, so that the game processing can be performed based on the various quantities of load values by various combinations of values of the plurality of load sensors. Accordingly, a novel game played by various manipulations according to the load of the player can be performed.

According to the present invention, the load of the player is detected by at least the four load sensors and the detected load value is set to the manipulation data to perform the game processing, so that the game controller that can perform various manipulations using the load sensors can be provided.

The necessary quantity is determined and the necessary quantity of load values is computed, so that various quantities of load values can be used in the game processing by various combinations of values of the plural load sensors. Accordingly, a novel game played by the load of the player using the game controller including the plurality of load sensors can be proposed.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 12 is an illustrative view showing an example of a screen of a total load game;

FIG. 13 is an illustrative view for explaining a right and left balance game;

FIG. 14 is an illustrative view for explaining a four-directional balance game;

FIG. 23 is an illustrative view for explaining a hoop game;

FIG. 24 is an illustrative view partially showing a memory map when the hoop game is performed;

FIG. 27 is an illustrative view for explaining a quiz game;

FIG. 28 is an illustrative view partially showing the memory map when the quiz game is performed;

FIG. 30 is an illustrative view for explaining a ski game;

FIG. 31 is an illustrative view partially showing the memory map when the ski game is performed;

FIG. 33 is an illustrative view for explaining a moving game;

FIG. 34 is an illustrative view partially showing the memory map when the moving game is performed;

FIG. 36 is an illustrative view for explaining an action game, FIG. 36(A) shows a field scene, and FIG. 36(B) shows a battle scene;

FIG. 41 is an illustrative view for explaining movement of a role-playing game;

FIG. 42 is an illustrative view for explaining battle of the role-playing game;

FIG. 43 is an illustrative view partially showing the memory map when the role-playing game is performed;

DETAILED DESCRIPTION OF THE PREFERRED EMBODIMENTS

Figure 1:
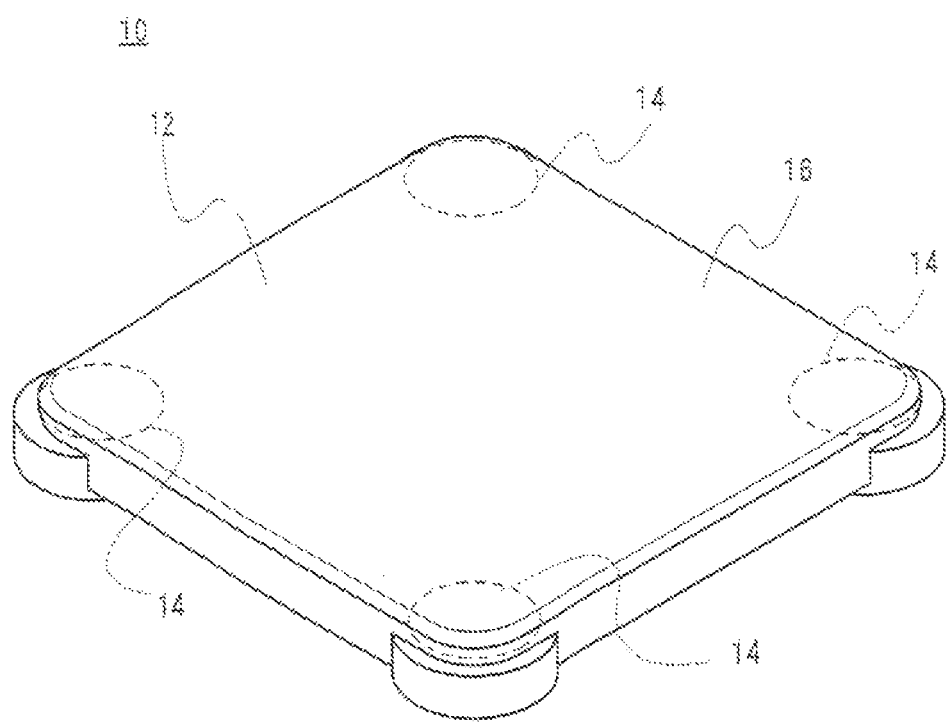
FIG. 1 is a perspective view showing an appearance of a game controller according to an embodiment of the present invention.

With reference to FIG. 1, a game controller 10 according to an embodiment of the present invention is a manipulation device or input device for game. The game controller 10 includes a board 12 on which a player rides and four load sensors 14 that detect loads applied on the board 12. The load sensors 14 are accommodated in the board 12 (see FIG. 2), and the arrangement of the load sensors 14 is shown by dotted line in FIG. 1.

The board 12 is formed in a substantially rectangular solid, and the board 12 has a substantially square shape when viewed from above. For example, one side of the square is set in a range of about 30 cm to 50 cm. An upper surface of the board 12 on which the player rides is formed in flat. Side faces at four corners of the board 12 are formed so as to be partially projected in a cylindrical shape.

In the board 12, the four load sensors 14 are arranged at predetermined intervals. In the embodiment, the four load sensors 14 are arranged in peripheral portions of the board 12, specifically, at the four corners. The interval between the load sensors 14 is set an appropriate value such that player's intention can accurately be detected for the load applied to the board 12 in a game manipulation.

Figure 2:
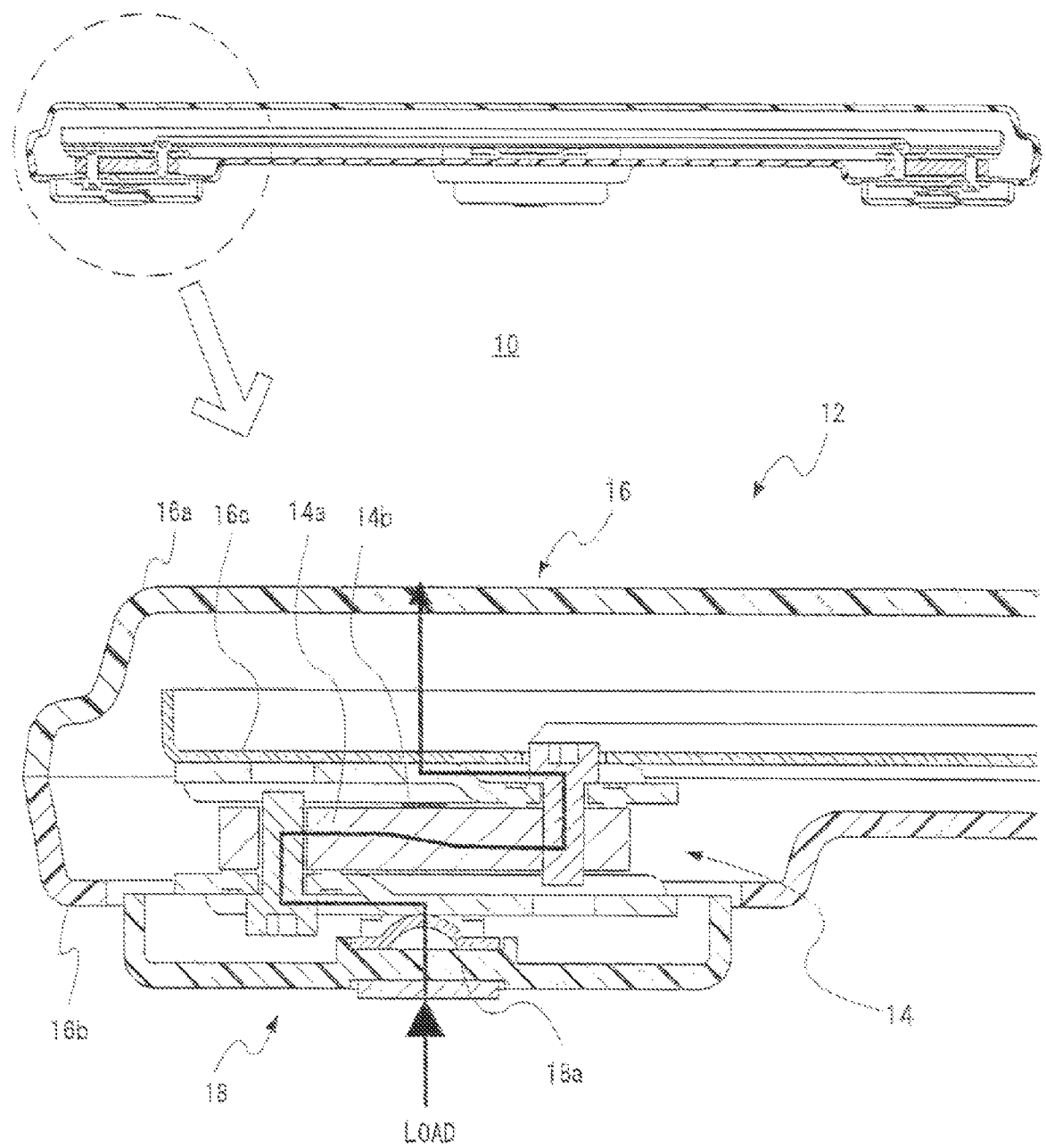
FIG. 2 is a diagonal sectional view showing the game controller shown in FIG. 1.

FIG. 2 shows a diagonal sectional view of the game controller 10, and FIG. 2 also shows an enlarged corner portion disposed in the load sensor 14.

As can be seen from FIG. 2, the board 12 includes a support plate 16 on which the player rides and legs 18. The legs 18 are provided at positions where the load sensors 14 are arranged. In the embodiment, because the four load sensors 14 are arranged at four corners, the four legs 18 are provided at the four corners. The leg 18 is formed in a cylindrical shape with bottom by, e.g., plastic molding. The load sensor 14 is placed on a spherical part 18a provided in the bottom of the leg 18. The support plate 16 is supported by the leg 18 while the load sensor 14 is interposed.

The support plate 16 includes an upper-layer plate 16a that constitutes an upper surface and an upper side face, a lower-layer plate 16b that constitutes a lower surface and a lower side face, and an intermediate-layer plate 16c provided between the upper-layer plate 16a and the lower-layer plate 16b. For example, the upper-layer plate 16a and the lower-layer plate 16b are formed by plastic molding and integrated with each other by bonding. For example, the intermediate-layer plate 16c is formed by pressing one metal plate. The intermediate-layer plate 16c is fixed onto the four load sensors 14. The upper-layer plate 16a has a lattice-shaped rib (not shown) in a lower surface thereof, and the upper-layer plate 16a is supported by the intermediate-layer plate 16c while the rib is interposed.

Accordingly, when the player rides on the board 12, the load is transmitted to the support plate 16, the load sensor 14, and the leg 18. As shown by an arrow in FIG. 2, reaction generated from a floor by the input load is transmitted from the leg 18 to the upper-layer plate 16a through the spherical part 18a, the load sensor 14, and the intermediate-layer plate 16c.

The load sensor 14 is formed by, e.g., a strain gage (strain sensor) type load cell, and the load sensor 14 is a load transducer that converts the input load into an electric signal. In the load sensor 14, a strain inducing element 14a is deformed to generate a strain according to the input load. The strain is converted into a change in electric resistance by a strain sensor 14b adhering to the strain inducing element 14a, and the change in electric resistance is converted into a change in voltage. Accordingly, the load sensor 14 outputs a voltage signal indicating the input load from an output terminal when the voltage is imparted to the load sensor 14 from a power supply terminal.

Other types of load sensors such as a folk vibrating type, a string vibrating type, an electrostatic capacity type, a piezo-electric type, a magneto-striction type, and gyroscope type may be used as the load sensor 14.

Figure 3:
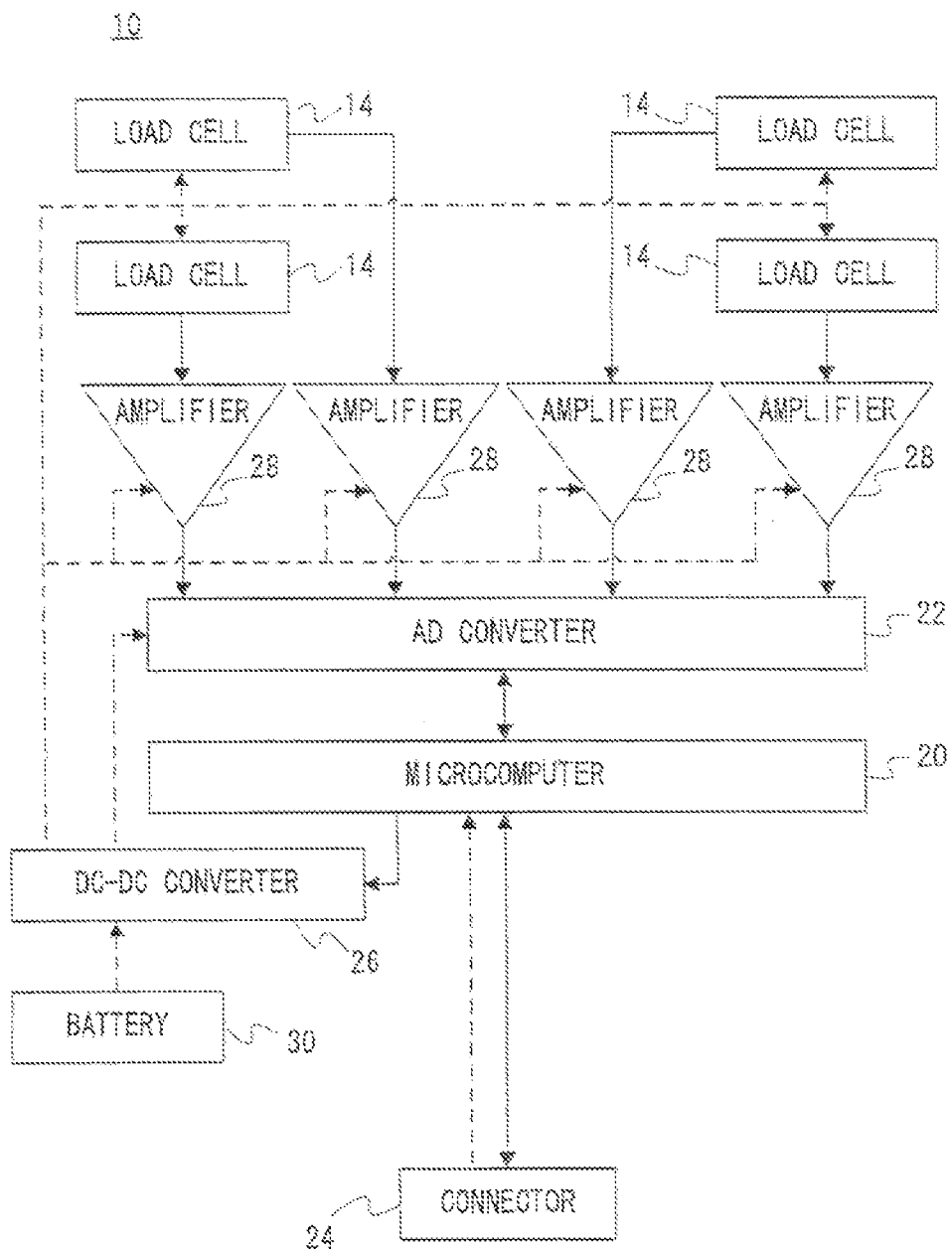
FIG. 3 is a block diagram showing an example of an electric configuration of the game controller shown in FIG. 1.

FIG. 3 is a block diagram showing an example of an electric configuration of the game controller 10. In FIG. 3, the signal and communication stream are indicated by solid-line arrows, and electric power supply is indicated by broken-line arrows.

The game controller 10 includes a microcomputer 20 that controls an operation of the game controller 10. The microcomputer 20 includes a ROM and a RAM (not shown) and controls the operation of the game controller 10 according to a program stored in the ROM.

An AD converter 22, a connector 24, and a DC-DC converter 26 are connected to the microcomputer 20. In FIG. 3, the four load sensors 14 are shown as the load cell 14. Each of the four load sensors 14 is connected to the AD converter 22 through each amplifier 28.

Figure 4:
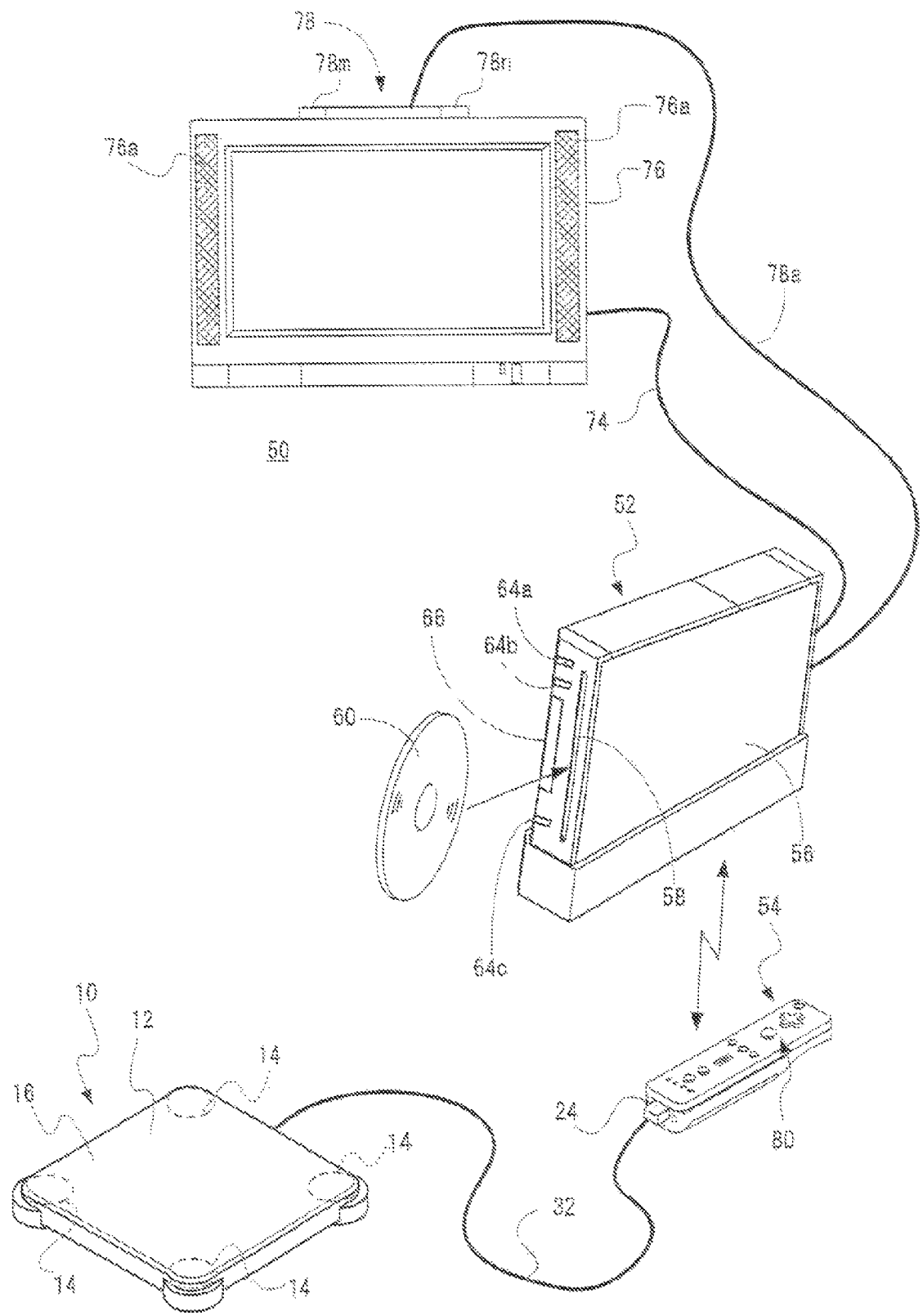
FIG. 4 is an illustrative view showing an appearance of a game system according to an embodiment of the present invention.

The connector 24 is provided such that the game controller 10 conducts communication with a game machine 52 (see FIG. 4). Although not shown in FIG. 1, the connector 24 is provided at a front end of a cable 32 (see FIG. 4). The game controller 10 may directly be connected to the game machine 52 using the connector 24 or the game controller 10 may be connected to a device that can conduct communication with the game machine 52. For example, the game controller 10 may be connected to the game machine 52 through a different type of controller 54 (see FIG. 4) for the game machine 52.

A battery 30 that supplies the electric power is also accommodated in the game controller 10. However, in the embodiment, the electric power is supplied to the microcomputer 20 from an external device, such as the game machine 52 and the different type of controller 54, which is connected using the connector 24. On the other hand, the electric power is supplied from the battery 30 to the load sensor 14, the amplifier 28, and the AD converter 22 through the DC-DC converter 26. The DC-DC converter 26 converts a direct-current voltage from the battery 30 into a different voltage to impart the converted voltage to the load sensor 14, the amplifier 28, and the AD converter 22.

The electric power may be supplied to the load sensor 14, the AD converter 22, and the amplifier 28 if needed such that the microcomputer 20 controls the DC-DC converter 26. That is, when the microcomputer 20 determines that a need to operate the load sensor 14 to detect the load arises, the microcomputer 20 may control the DC-DC converter 26 to supply the electric power to each load sensor 14, each amplifier 28, and the AD converter 22.

Once the electric power is supplied, each load sensor 14 outputs a signal indicating the input load. The signal is amplified by each amplifier 28, and the analog signal is converted into a digital data by the AD converter 22. Then, the digital data is inputted to the microcomputer 20. Identification information on each load sensor 14 is imparted to the detection value of each load sensor 14, allowing for distinction among the detection values of the load sensors 14. Thus, the microcomputer 20 can obtains the pieces of data indicating the detection values of the four load sensors 14 at the same time.

On the other hand, when the microcomputer 20 determines that the need to operate the load sensor 14 does not arise, i.e., when the microcomputer 20 determines it is not the time the load is detected, the microcomputer 20 controls the DC-DC converter 26 to stop the supply of the electric power to the load sensor 14, the amplifier 28, and the AD converter 22. Thus, in the game controller 10, the load sensor 14 is operated to detect the load only when needed, so that the power consumption for detecting the load can be suppressed.

Typically, the time the load detection is required shall means the time the game machine 52 (FIG. 4) obtains the load data. For example, when the game machine 52 requires the load information, the game machine 52 transmits a load obtaining command to the game controller 10. When the microcomputer 20 receives the load obtaining command from the game machine 52, the microcomputer 20 controls the DC-DC converter 26 to supply the electric power to the load sensor 14, etc., thereby detecting the load. On the other hand, when the microcomputer 20 does not receive the load obtaining command from the game machine 52, the microcomputer 20 controls the DC-DC converter 26 to stop the electric power supply. Alternatively, the microcomputer 20 determines it is the time the load is detected at regular time intervals, and the microcomputer 20 may control the DC-DC converter 26. In the case when the microcomputer 20 periodically obtains the load, information on the period may initially be imparted from the game machine 52 to the microcomputer 20 or previously stored in the microcomputer 20.

The data indicating the detection value from the load sensor 14 is transmitted as the manipulation data (input data) of the game controller 10 from the microcomputer 20 to the game machine 52 (FIG. 4) through the connector 24. For example, in the case where the command is received from the game machine 52 to detect the load, the microcomputer 20 transmits the detection value data to the game machine 52 when receiving the detection value data of the load sensor 14 from the AD converter 22. Alternatively, the microcomputer 20 may transmit the detection value data to the game machine 52 at regular time intervals.

FIG. 4 shows an example of a game system or game apparatus 50 in which the game controller 10 is used. With reference to FIG. 4, the game system 50 includes a video game machine (hereinafter simply referred to as "game machine") 52 and a controller 54. Although not shown, the game machine 52 of the embodiment is designed to be able to conduct communication with up to four controllers 54. The game machine 52 and the controllers 54 are wirelessly connected. For example, the wireless communication is conducted pursuant to Bluetooth (registered trademark) standard. However, the wireless communication may be conducted pursuant to other standards such as an infrared ray and wireless LAN. In another embodiment, the controller 54 may be connected to the game machine 52 in a wired manner.

The controller 54 is a game controller, a different type from the game controller 10. In the embodiment, the controller 54 is a main game controller of the game machine 52, and the game controller 10 is prepared as an extended unit of the controller 54 in order to utilize a wireless communication function of the controller 54 with the game machine 52. The game controller 10 is connected to the controller 54 by the connector 24 that is located at the front end of the cable 32 extended from the board 12. For the purpose of distinction, sometimes the controller 54 is referred to as "remote control".

The game machine 52 includes a housing 56 having a substantially rectangular solid, and a disk slot 58 is provided in a front face of the housing 56. An optical disk 60 that is of an example of an information storage medium in which the game program and the like are stored is inserted from the disk slot 58 and placed on a disk drive 62 (see FIG. 5) in the housing 56. Although not shown, an LED and a light guide plate can be disposed around the disk slot 58 to turn on or blink the light of the disk slot 58 in response to various kinds of processing.

A power button 64a and a reset button 64b are provided in the front face and in the upper portion of the housing 56 of the game machine 52, and an eject button 64c is provided in the front face and in the lower portion of the housing 56. An external memory card connector cover 66 is provided between the reset button 64b and the eject button 64c and near the disk slot 58. An external memory card connector 68 (see FIG. 5) is provided inside the external memory card connector cover 66, and an external memory card (not shown, hereinafter simply referred to as "memory card") is inserted in the external memory card connector 68. The memory card is used to load and temporarily store the game program, etc. from the optical disk 60 or to store (save) game data (game result or data in the midstream of the game) of the game played using the game system 50. However, instead of the storage of the game data in the memory card, the game data may be stored in an internal memory such as a flash memory 70 (see FIG. 5) provided inside the game machine 52. The memory card may be used as a backup memory of the internal memory. Application except for the game can be performed in the game machine 52. In such cases, pieces of data of other applications can be stored in the memory card.

A general-purpose SD card can be used as the memory card, and other general-purpose memory cards such as Memory Stick and MultiMediaCard (registered trademark) can also be used.

Although not shown in FIG. 4, an AV cable connector 72 (see FIG. 5) is provided in a rear face of the housing 56 of the game machine 52, and a monitor 76 and a speaker 76a are connected to the game machine 52 through an AV cable 74 using the AV connector 72. Typically, the monitor 76 and the speaker 76a are a color television receiver, a video signal is inputted from the game machine 52 to a video input terminal of the color television receiver by the AV cable 74, and an audio signal is inputted from the game machine 52 to an audio input terminal. Accordingly, for example, a game image of a three-dimensional (3D) video game is displayed on a screen of the color television receiver (monitor) 76 while the stereo game sound such as game music and sound effect is outputted from the right and left speakers 76a. A marker unit 78 including two infrared LEDs (markers) 78m and 78n is provided around the monitor 76 (in the embodiment, on the monitor 76). The marker unit 78 is connected to the game machine 52 through a power cable 78a, which allows the electric power to be supplied to the marker unit 78 from the game machine 52. Therefore, the markers 78m and 78n emit the light to output the infrared light ahead of the monitor 76.

The electric power of the game machine 52 is imparted by a general AC adaptor (not shown). The AC adaptor is inserted in a standard wall socket in home, and the game machine 52 converts home-use power supply (commercial power supply) into a low DC voltage signal suitable to the drive of the game machine 52. In another embodiment, the battery is used as the power supply.

In order that a user or player plays a game (or other applications except for the game) with the game system 50, the user turns on the power of the game machine 52, then the user appropriately selects the optical disk 60 in which a program of a video game (or another application to be played) is stored, and the user loads the optical disk 60 on the disk drive 62 of the game machine 52. Accordingly, the game machine 52 starts the execution of the video game or another application based on the program recorded in the optical disk 60. The user manipulates the remote control 54 or the game controller 10 to impart the input to the game machine 52. For example, the game or another application can be started by manipulating one of input means 80 such as various manipulation buttons provided in the remote control 54 or using the game controller 10. In addition to the manipulation of the input means 80, the movement of the remote control 54 itself or the use of the game controller 10 can move a moving picture object (player object) in a different direction or change a viewpoint (camera position) of the user in the 3D game world.

Alternatively, the program of the video game or another application may be stored (installed) in the internal memory (flash memory 70) of the game machine 52 and executed from the internal memory. In such cases, the program stored in the storage medium such as the optical disk 60 may be installed in the internal memory or downloaded program may be installed in the internal memory.

Figure 5:
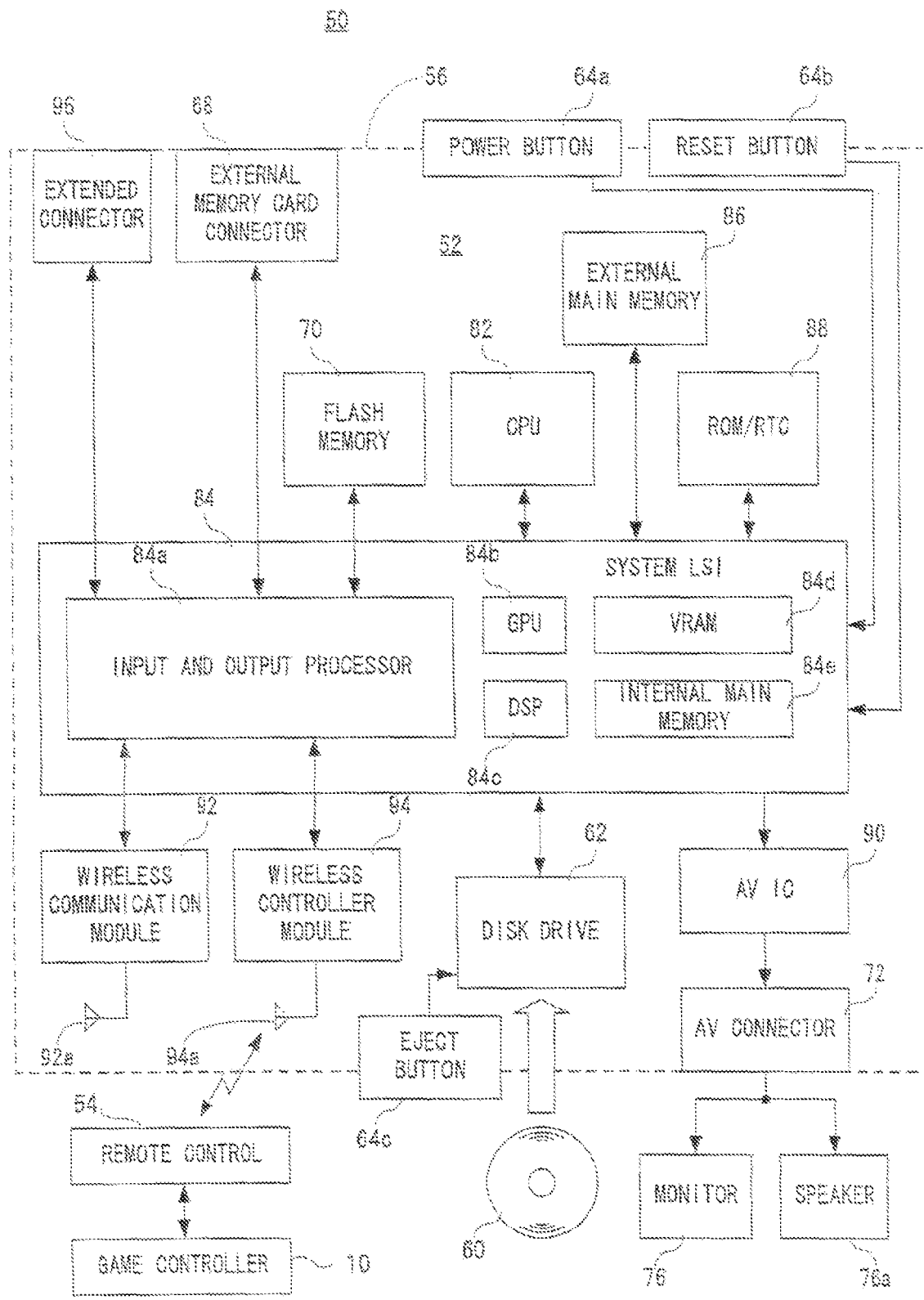
FIG. 5 is a block diagram showing an example of an electric configuration of the game system shown in FIG. 4.

FIG. 5 is a block diagram showing an example of an electric configuration of the game system 50 of the embodiment shown in FIG. 4. Although not shown, each component in the housing 56 is mounted on a printed board. As shown in FIG. 5, a CPU 82 is provided in the game machine 52 to act as a game processor. A system LSI 84 is connected to the CPU 82. An external main memory 86, a ROM/RTC 88, and the disk drive 62, and an AVIC 90 are connected to the system LSI 84.

The external main memory 86 is used to store the programs such as the game program or various kinds of data, and the external main memory 86 is used as a work area or a buffer area of the CPU 82. The ROM/RTC 88 is a so-called boot ROM into which a program starting up the game machine 52 is incorporated, and a time circuit is provided to count time in the ROM/RTC 88. The disk drive 62 reads the program or texture data or the like from the optical disk 60, and the disk drive 62 writes the program or texture data or the like in an internal main memory 84e or an external main memory 86 under the control of the CPU 82.

An input and output processor 84a, a GPU (Graphics Processor Unit) 84b, a DSP (Digital Signal Processor) 84c, a VRAM 84d, and an internal main memory 84e are provided in the system LSI 84 and connected to one another by an internal bus (not shown).

The input and output processor (I/O processor) 84a performs the transmission and reception of the data or the download of the data.

The GPU 84b constitutes a part of a drawing means and receives a graphics command (graphics generation command) from the CPU 82 to generate game image data according to the command. In addition to the graphics command, the CPU 82 imparts an image producing program necessary to produce the game image data to the GPU 84b.

Although not shown, as described above, the VRAM 84d is connected to the GPU 84b. The GPU 84b accesses the VRAM 84d to obtain the data (image data such as polygon data and texture data) necessary to execute the graphics generation command. The CPU 82 writes the image data necessary for the graphics generation in the VRAM 84d through the GPU 84b. The GPU 84b accesses the VRAM 84d to produce the game image data for drawing.

In the embodiment, the explanation will be made in a case where the GPU 84b produces the game image data. However, in a case where any application except for the game application is executed, the GPU 84b produces the image data for the application.

The DSP 84c acts as an audio processor that produces audio data corresponding to the sound, voice, or music outputted from the speaker 76a using sound data or sound waveform (tone) data stored in the internal main memory 84e or external main memory 86.

The game image data and audio data produced in the above-described ways are read by the AVIC 90 and outputted to the monitor 76 and speaker 76a through the AV connector 72. Accordingly, a game screen is displayed on the monitor 76, and the sound (music) necessary for the game is outputted from the speaker 76a.

A flash memory 70, a wireless communication module 92, and a wireless controller module 94 are connected to the input and output processor 84a. An extended connector 96 and the memory card connector 68 are also connected to the input and output processor 84a. An antenna 92a is connected to the wireless communication module 92 and an antenna 94a is connected to the wireless controller module 94.

The input and output processor 84a can conduct communication with another game apparatus and various servers connected to a network through the wireless communication module 92. However, the input and output processor 84a can directly conduct communication with another game apparatus without the network. The input and output processor 84a periodically accesses the flash memory 70 to detect the presence or absence of data (referred to as "transmission data") necessary to be transmitted to the network, and the input and output processor 84a can transmit the transmission data to the network through the wireless communication module 92 and antenna 92a when the transmission data exists. The input and output processor 84a receives data (referred to as "reception data") transmitted from another game apparatus through the network, antenna 92a, and wireless communication module 92, and the input and output processor 84a can store the reception data in the flash memory 70. However, the reception data is directly destroyed in the case where the reception data does not satisfy a predetermined condition. The input and output processor 84a receives data (referred to as "download data") downloaded from a download server through the network, antenna 92a, and wireless communication module 92, and the input and output processor 84a can store the download data in the flash memory 70.

The input and output processor 84a receives the input data (manipulation data) transmitted from the remote control 54 through the antenna 94a and wireless controller module 94, and the input and output processor 84a stores (temporarily stores) the input data in the buffer area in the internal main memory 84e or external main memory 86. The input data is erased from the buffer area after used in processing (for example, game processing) of the CPU 82.

In the embodiment, as described above, the wireless controller module 94 conducts communication with the remote control 54 pursuant to the Bluetooth standard.

Moreover, the extended connector 96 and the memory card connector 68 are connected to the input and output processor 84a. The extended connector 96 is a connector used for an interface such as a USB and an SCSI, and a medium such as an external storage medium or a peripheral device such as a controller different from the remote control 54 can be connected to the extended connector 96. The wired LAN can also be used instead of the wireless communication module 92 by connecting a wired LAN adaptor to the extended connector 96. An external storage medium such as the memory card can be connected to the memory card connector 68. Accordingly, the input and output processor 84a can access the storage medium to store or read the data through the extended connector 96 or memory card connector 68.

Although the detailed description is omitted, the power button 64a, the reset button 64b, and the eject button 64c are provided in the game machine 52 (housing 56) as shown in FIG. 4. The power button 64a is connected to the system LSI 84. When the power button 64a is turned on, the electric power is supplied to each component of the game machine 52 through the AC adaptor (not shown), and the system LSI 84 is set to a mode (referred to as "normal mode") in which a normal electric conduction state is established. On the other hand, when the power button 64a is turned off, the electric power is supplied only to a part of the components of the game machine 52, and the system LSI 84 is set to a mode (hereinafter referred to as "standby mode") in which the power consumption is kept at a minimum level. In the case where the standby mode is set, the system LSI 84 provides an instruction to stop the electric power supply to the components except for the input and output processor 84a, the flash memory 70, the external main memory 86, the ROM/RTC 88, the wireless communication module 92, and the wireless controller module 94. Accordingly, in the standby mode, the CPU 82 does not execute the application.

Although the electric power is supplied to the system LSI 84 even in the standby mode, the GPU 84b, the DSP 84c, and the VRAM 84d are not driven to reduce the power consumption by stopping clock supply to the GPU 84b, the DSP 84c, and the VRAM 84d.

Although not shown, a fan is provided in the housing 56 of the game machine 52 to discharge heat of ICs such as the CPU 82 and the system LSI 84 to the outside. The fan is also stopped in the standby mode.

In the case where the standby mode is not utilized, the electric power supply is completely stopped to all the circuit components by selecting a setting in which the standby mode is not utilized, when the power button 64a is turned off.

Figure 6:
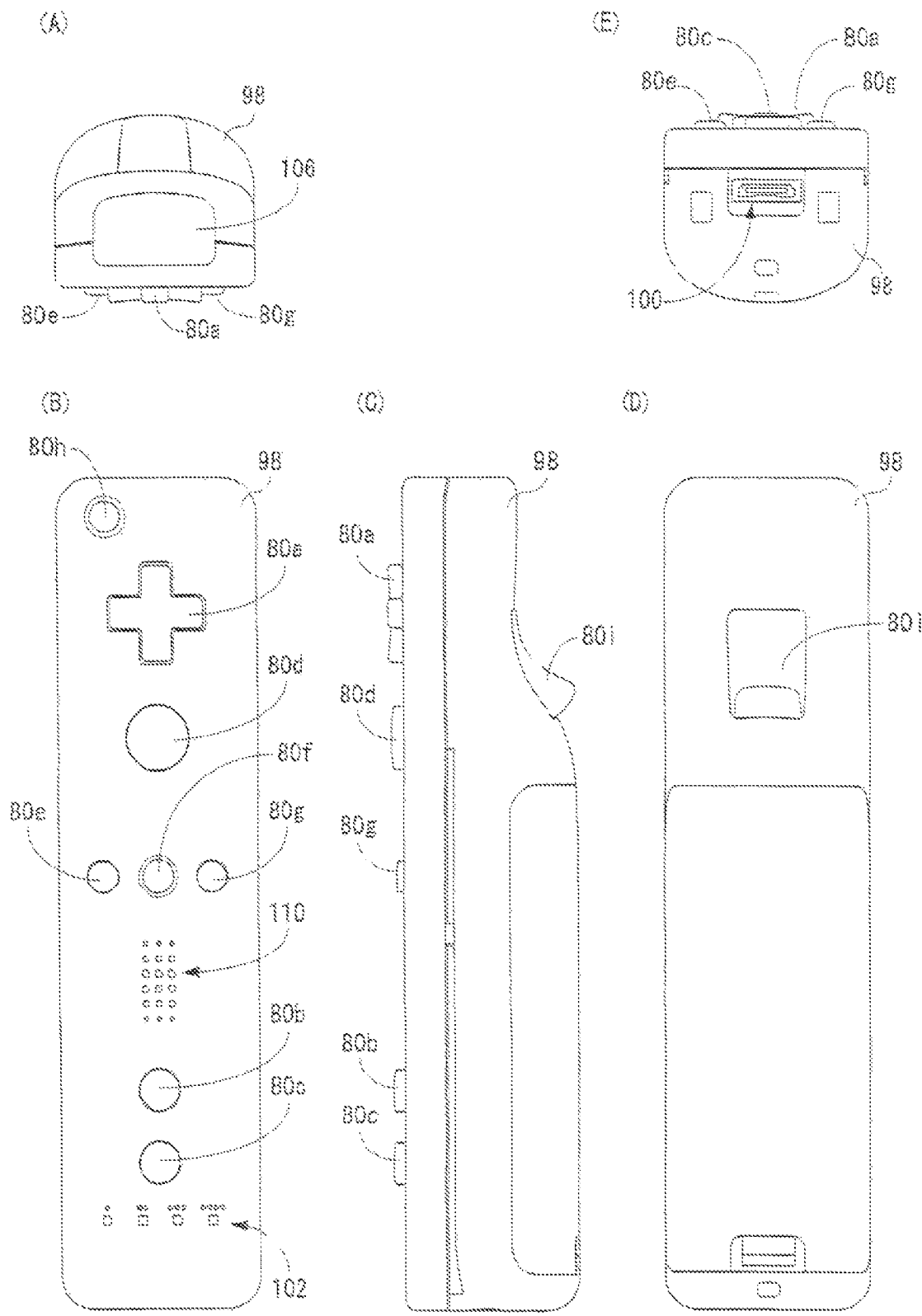
FIG. 6 is an illustrative view showing an appearance of the controller shown in FIG. 4.

The switch between the normal mode and the standby mode can remotely be performed by the switch of on/off of a power switch 80h (see FIG. 6) of the remote control 54. In the case where the remote manipulation is not performed, a setting in which the electric power is not supplied to the wireless controller module 94a may be established in the standby mode.

The reset button 64b is also connected to the system LSI 84. When the reset button 64b is pressed, the system LSI 84 restarts a start-up program of the game machine 52. The eject button 64c is connected to the disk drive 62. When the eject button 64c is pressed, the optical disk 60 is ejected from the disk drive 62.

FIGS. 6(A) to 6(E) show an example of an appearance of the remote control 54. FIG. 6(A) shows a front-end surface of the remote control 54, FIG. 6(B) shows an upper surface of the remote control 54, FIG. 6(C) shows a right side face of the remote control 54, FIG. 6(D) shows a lower surface of the remote control 54, and FIG. 6(E) shows a rear-end surface of the remote control 54.

With reference to FIGS. 6(A) to 6(E), the remote control 54 has a housing 98 formed by, e.g., plastic molding. The housing 98 is formed in a substantially rectangular solid, and the housing 98 has a size that can be grasped by a single hand of the user. Input means (a plurality of buttons and switches) 80 are provided in the housing 98 (remote control 54). Specifically, as shown in FIG. 6(B), a cross key 80a, a (1) button 80b, a (2) button 80c, an A button 80d, a (−) button 80e, a HOME button 80f, a (+) button 80g, and the power button 80h are provided in an upper surface of the housing 98. As shown in FIGS. 6(C) and 6(D), an inclined surface is provided in a lower surface of the housing 98, and a B trigger switch 80i is provided in the inclined surface.

The cross key 80a is a four-directional push switch, and the cross key 80a includes manipulation portions of four directions shown by arrows, i.e., forward (or upward), backward (or downward), rightward, and leftward directions. For example, the player can provide the instruction of moving direction of a manipulable character or object (player character or player object) or cursor by manipulating one of the manipulation portions.

The (1) button 80b and the (2) button 80c are push-button switches. For example, the (1) button 80b and the (2) button 80c are used in the game manipulation such that the viewpoint position or the viewpoint direction, i.e, the position or a view angle of a virtual camera are adjusted when the three-dimensional game image is displayed. Alternatively, the (1) button 80*b* and the (2) button 80*c* may be used to perform the same manipulations as the A button 80*d* and B trigger switch 80*i* or a supplementary manipulation.

The A button switch 80*d* is a push-button switch used to cause the player character or player object to perform motions except for the directional instruction, i.e., any action such as punch, throw, grasp (obtaining), ride, and jump. For example, in an action game, the user can provide the instructions such as the jump, punch, and movement of a weapon. In a role-playing game (RPG) or a simulation RPG, the user can provide the instructions such as obtaining of an item and selection and determination of the weapon or command. The A button switch 80*d* is also used to instruct the determination of an icon indicated by a pointer (indicated image) or a button image on the game screen. For example, when the icon or button image is determined, the instruction or command (game command) previously set corresponding to the icon or button image can be inputted.

Similarly, the (−) button 80*e*, the HOME button 80*f*, the (+) button 80*g*, and the power button 80*h* are push-button switches. For example, the (−) button 80*e* is used to select a game mode. The HOME button 80*f* is used to display a game menu (menu screen). The (+) button 80*g* is used to start (resume) the game or suspend the game. The power switch 80*h* is used to remotely turn on/off the power of the game machine 52.

In the embodiment, a power switch for turning on/off the remote control 54 itself is not provided. The remote control 54 is turned on by manipulating one of the input means 80 of the remote control 54, and the remote control 54 is automatically turned off unless manipulated for over a predetermined time (for example, 30 seconds).

The B trigger switch 80*i* is also a push-button switch, and is mainly used to perform the input emulating a trigger such as shooting or specify the position selected by the remote control 54. When the B trigger switch 80*i* is continuously pressed, the motion or a parameter of the player object can be kept at a constant state. In a certain state, the B trigger switch 80*i* acts as the normal B button, and the B trigger switch 80*i* is used to delete the action or command or the like determined by the A button 80*d*.

As shown in FIG. 6(E), an external extended connector 100 is provided in a rear end face of the housing 98, and an indicator 102 is provided in the upper surface of the housing 98 and on the rear end face side as shown in FIG. 6(B). The external extended connector 100 is used to connect an extended controller different from the remote control 54. The indicator 102 includes, e.g. four LEDs. The indicator 102 can indicate identification information (controller number) of the remote control 54 according to the lit LED by lighting on one of the four LEDs. The indicator 102 can also indicate a remaining battery level of the remote control 54 by the number of lit LEDs.

The remote control 54 includes an imaging information computation unit 104 (see FIG. 7), and a light incident port 106 of the imaging information computation unit 104 is provided in a front-end face of the housing 98 as shown in FIG. 6(A). The remote control 54 includes a speaker 108 (see FIG. 7), and the speaker 108 is provided in the housing 98 according to a sound release hole 110 provided in the upper surface of the housing 98 and between the (1) button 80*b* and the HOME button 80*f* as shown in FIG. 6(B).

The shape of the remote control 54 and the shape, the quantity, and the installation position, etc. of each input means 80 are shown in FIGS. 6(A) to 6(E) only by way of example, and which may be changed as appropriate.

Figure 7:
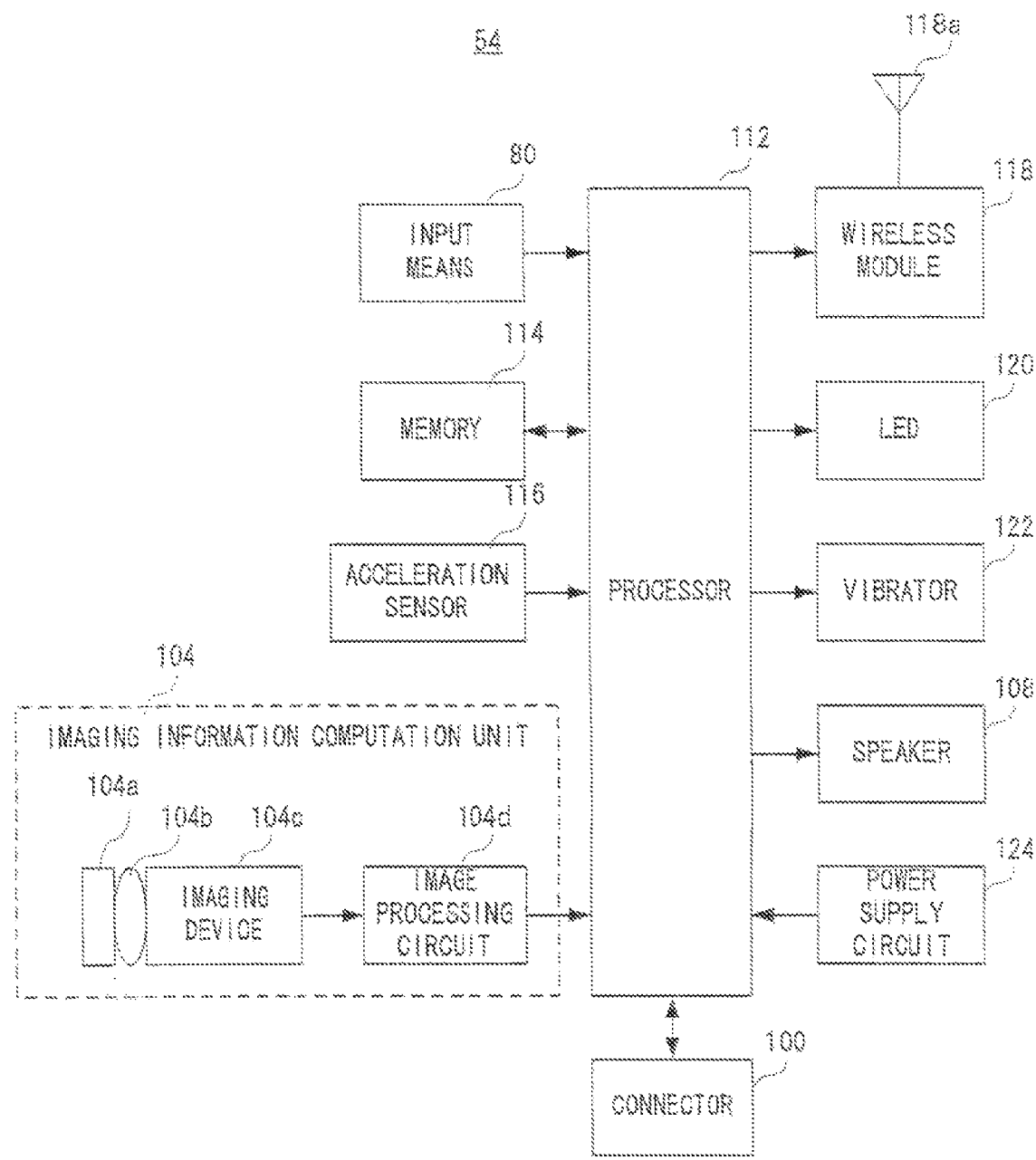
FIG. 7 is a block diagram showing an example of an electric configuration of the controller shown in FIG. 4.

FIG. 7 is a block diagram showing an example of the electric configuration of the remote control 54. With reference to FIG. 7, the remote control 54 includes a processor 112, and the external extended connector 100, the input means 80, a memory 114, an acceleration sensor 116, a wireless module 118, the imaging information computation unit 104, the LED 120 (indicator 102), a vibrator 122, the speaker 108, and a power supply circuit 124 are connected to the processor 112 by an internal bus (not shown). An antenna 118*a* is connected to the wireless module 118.

A power supply circuit 124 supplies the electric power to each component of the remote control 54. Typically the power supply circuit 124 is a battery exchangeably accommodated in the housing 98. The power supply circuit 124 can also supply the electric power to the extended units (such as the game controller 10) connected through the external extended connector 100.

Although not shown in FIG. 7 for the purpose of simple explanation, the indicator 102 includes the four LEDs 120 as described above.

The processor 112 controls the whole of the remote control 54. The processor 112 transmits (inputs) pieces of information (input information) inputted by the input means 80, acceleration sensor 116, and imaging information computation unit 104 and pieces of information (such as data from the game controller 10) obtained through the external extended connector 100 to the game machine 52 through the wireless module 118 and antenna 118*a* in the form of the input data (manipulation data). At this point, the processor 112 uses the memory 114 as the work area or buffer area. The manipulation signals (pieces of manipulation data) from the input means 80 (80*a* to 80*i*) are inputted to the processor 112, and the processor 112 temporarily stores the pieces of manipulation data in the memory 114.

The acceleration sensor 116 detects acceleration in each of three axes of a longitudinal direction (y-axis direction), a crosswise direction (x-axis direction), and a fore-and-aft direction (z-axis direction) of the remote control 54. Typically, an electrostatic capacity type acceleration sensor is used as the acceleration sensor 116. However, different type acceleration sensor may be used.

For example, the acceleration sensor 116 detects the acceleration (ax, ay, az) for the x-axis, y-axis, and z-axis at first predetermined time intervals, and the acceleration sensor 116 inputs the detected acceleration data to the processor 112. For example, the acceleration sensor 116 detects the acceleration in each axial direction in a range of −2.0 g to 2.0 g (g is gravitational acceleration, hereinafter the same). The processor 112 detects the acceleration data imparted from the acceleration sensor 116 at second predetermined time intervals, and the processor 112 temporarily stores the acceleration data in the memory 114.

The processor 112 produces input data (manipulation data) including at least one of the manipulation data, the acceleration data, and later-mentioned marker coordinate data, and the processor 112 transmits the produced input data to the game machine 52 at third predetermined time intervals (for example, 5 ms). The processor 112 can add the data received from the game controller 10 through the external extended connector 100 to the input data.

Although not shown in FIGS. 6(A) to 6(E), in the embodiment, the acceleration sensor 116 is provided near the position where the cross key 80*a* is disposed on the board in the housing 98.

At this point, those skilled in the art easily understand from the description of the present invention that the computer such as the processor (for example, CPU 82) of the game machine 52 and the processor (for example, processor 112) of the remote control 54 can perform processing to estimate or compute (determine) further information on the remote control 54 based on the acceleration data outputted from the acceleration sensor 116.

For example, in the case where the uni-axial acceleration sensor 116 is mounted on the remote control 54 to perform the processing on the computer side while the remote control 54 is assumed to be in the static state, namely, in the case where the processing is performed while the acceleration detected by the acceleration sensor 116 is assumed to be formed only by the gravitational acceleration, whether or not an attitude of the remote control 54 is inclined with respect to the gravitational direction or how much the attitude of the remote control 54 is inclined with respect to the gravitational direction can be understood based on the detected acceleration data when the remote control 54 is actually in the static state. Specifically, on the basis of the state in which the acceleration sensor 116 has a vertically-downward detection axis, whether or not the attitude of the remote control 54 is inclined by the application of 1 g (gravitational acceleration) and how much the attitude of the remote control 54 is inclined by a magnitude of the acceleration can be understood.

In the case where the multi-axis acceleration sensor 116 is mounted on the remote control 54, how much the attitude of the remote control 54 is inclined with respect to the gravitational direction can be understood in detail by performing processing to the acceleration data of each axis. In this case, the processor 112 may perform processing for computing data of an inclination angle of the remote control 54 based on the output of the acceleration sensor 116, or processing for roughly estimating the inclination may be performed without performing the processing for computing the data of the inclination angle based on the output from the acceleration sensor 116. Thus, the inclination, attitude, or position of the remote control 54 can be determined by the combination of the acceleration sensor 116 and the processor 112.

On the other hand, assuming that the acceleration sensor 116 is in a dynamic state, because the acceleration is detected according to the motion of the acceleration sensor in addition to the gravitational acceleration component, the direction of the motion and the like can be understood when the gravitational acceleration component is removed by predetermined processing. Specifically, in the case where the remote control 54 on which the acceleration sensor 116 is mounted is moved by the user while dynamically accelerated, various motions and/or positions of the remote control 54 can be computed by processing the acceleration data produced by the acceleration sensor 116.

Even if the acceleration sensor 116 is assumed to be in the dynamic state, the inclination can be understood with respect to the gravitational direction when the acceleration corresponding to the motion of the acceleration sensor 116 is removed by predetermined processing. In another embodiment, the acceleration sensor 116 may include a built-in signal processing unit or another dedicated processing unit in order to perform desired processing to the acceleration signal (acceleration data) outputted from the built-in acceleration detection means before the acceleration data is outputted from the processor 112. For example, in the case where the acceleration sensor 116 is used to detect the static acceleration (for example, gravitational acceleration), the built-in or dedicated processing unit may convert the detected acceleration data into the corresponding inclination angle (or other preferable parameter).

The wireless module 118 uses, e.g., the Bluetooth technique to modulate a carrier wave having a predetermined frequency using the input data, and the wireless module 118 radiates the weak radio signal from the antenna 118a. That is, the input data is modulated into the weak radio signal by the wireless module 118 and transmitted from the antenna 118a (remote control 54). The weak radio signal is received by the wireless controller module 94 provided in the game machine 52. Demodulation and decoding are performed to the received weak radio signal, which allows the game machine 52 (CPU 82) to obtain the input data from the remote control 54. The CPU 82 can perform the application processing (game processing) according to the obtained input data and the application program (game program).

As described above, the imaging information computation unit 104 is provided in the remote control 54. The imaging information computation unit 104 includes an infrared filter 104a, a lens 104b, an imaging device 104c, and an image processing circuit 104d. The infrared filter 104a transmits only the infrared ray in the light incident from ahead of the remote control 54. As described above, the markers 78m and 78n disposed near (around) the display screen of the monitor 76 are infrared LEDs that output the infrared ray ahead of the monitor 76. Accordingly, the images of the markers 78m and 78n can be taken more exactly by providing the infrared filter 104a. The infrared ray transmitted through the infrared filter 104a is outputted to the imaging device 104c through the lens 104b. The imaging device 104c is a solid-state imaging device, such as a CMOS sensor or a CCD, which images the infrared ray collected by the lens 104b. Accordingly, the imaging device 104c images only the infrared ray transmitted through the infrared filter 104a to produce the image data. Hereinafter the image taken by the imaging device 104c is referred to as taken image. The image data produced by the imaging device 104c is processed by the image processing circuit 104d. The image processing circuit 104d computes the position of the imaging target (markers 78m and 78n) in the taken image and outputs each coordinate value indicating the position as imaging data (later-mentioned marker coordinate data) to the processor 112 at fourth predetermined time intervals. The processing performed in the image processing circuit 104d is described later.

Figure 8:
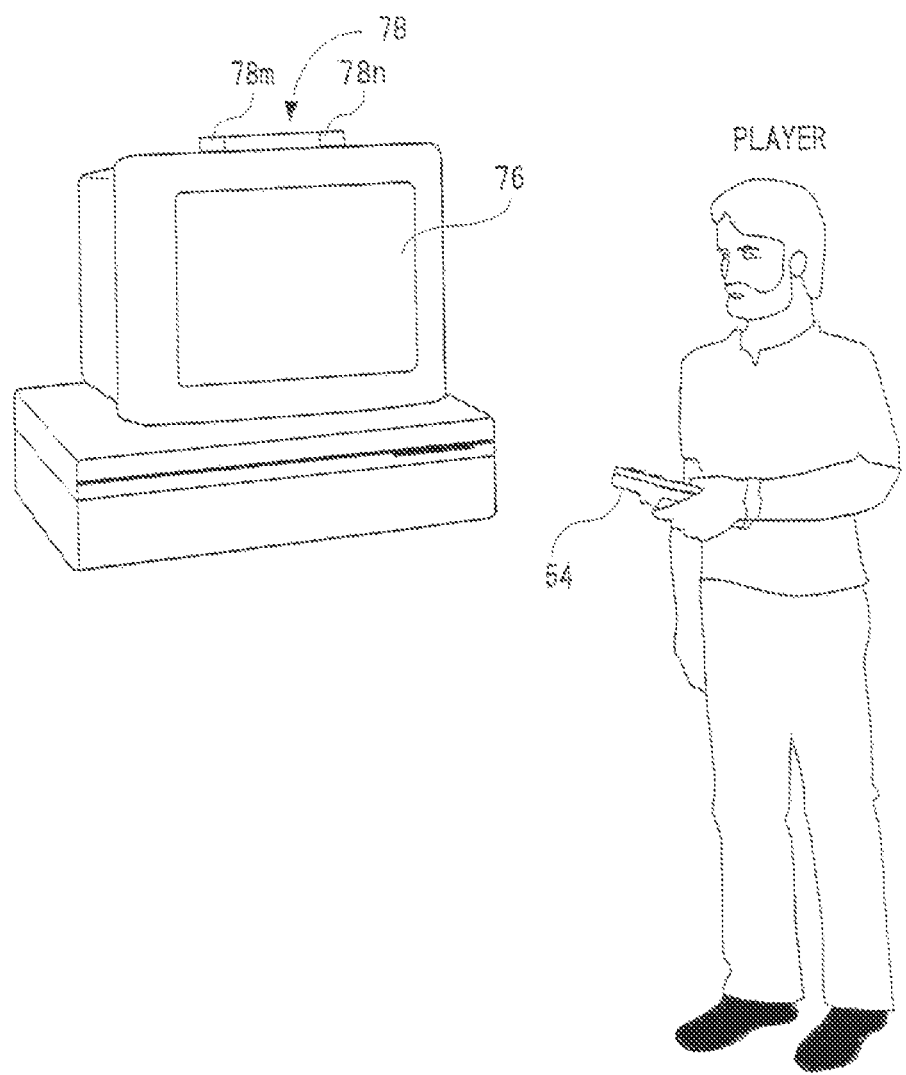
FIG. 8 is an illustrative view showing a state in which a position on a screen is indicated using the controller shown in FIG. 4.

FIG. 8 is an illustrative view roughly explaining a state in which the game is played using the remote control 54 in the video game system 50. As shown in FIG. 8, the player grasps the remote control 54 in one hand. Exactly, in the case where the pointing function of the remote control 54 is used, the player grasps the remote control 54 while the front-end surface (the side of the incident port 106 to which the light imaged by the imaging information computation unit 104 is incident) of the remote control 54 is orientated toward the markers 78m and 78n. However, as can be seen from FIG. 4, the markers 78m and 78n are disposed in parallel with the crosswise direction of the screen of the monitor 76. In this state of things, the player changes the position on the screen indicated by the remote control 54 or the distance between the remote control 54 and the marker 78m or 78n to perform the game manipulation.

Figure 9:
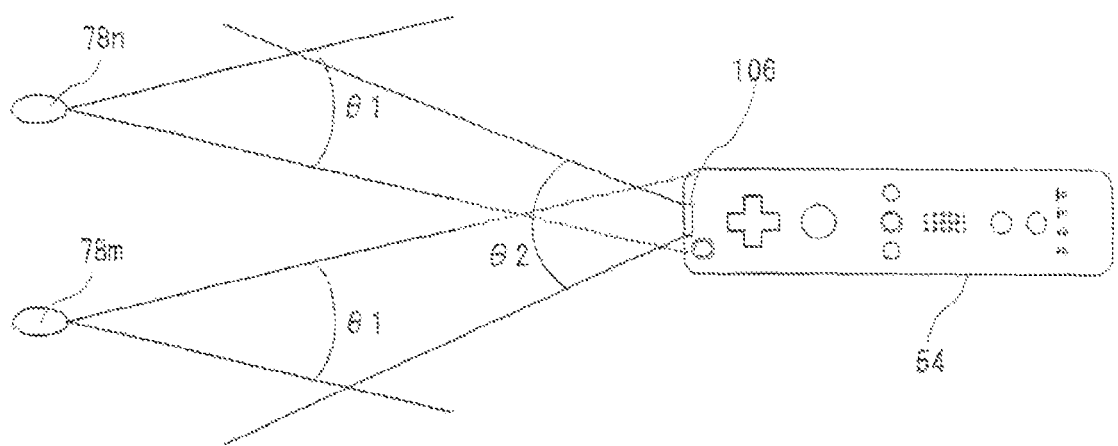
FIG. 9 is an illustrative view for explaining view angles of marker units and controller shown in FIG. 4.

FIG. 9 is an illustrative view for explaining view angles of the markers 78m and 78n and remote control 54. As shown in FIG. 9, the markers 78m and 78n each emit the infrared ray in a range of a view angle θ1. The imaging device 104c of the imaging information computation unit 104 can receive the incident light in a range of a view angle θ2 around a visual axis direction of the remote control 54. For example, each of the markers 78m and 78n has the view angle θ1 of 34° (half-value angle), and the imaging device 104c has the view angle θ2 of 41°. The player grasps the remote control 54 such that the imaging device 104c is set to the position and orientation at which the infrared rays can be received from the two markers 78m and 78n. Specifically, the player grasps the remote control 54 such that at least one of the markers 78m and 78n exists in the view angle θ2 of the imaging device 104c while the remote control 54 exists in the view angle θ1 of at least one of the markers 78m and 78n. In this state, the remote control 54 can detect at least one of the markers 78m and 78n. The player can change the position and orientation of the remote control 54 to perform the game manipulation in the range satisfying this state. In the case where one of the markers 78m and 78n is detected, for example, a tentative marker coordinate is set instead of the marker that is not detected by utilizing the immediately preceding pieces of data in which the two markers 78m and 78n are detected, allowing the computation of the position indicated by the remote control 54.

In the case where the position and orientation of the remote control 54 are out of the range, the game manipulation cannot be performed based on the position and orientation of the remote control 54. Hereinafter the range is referred to as "manipulable range".

Figure 10:
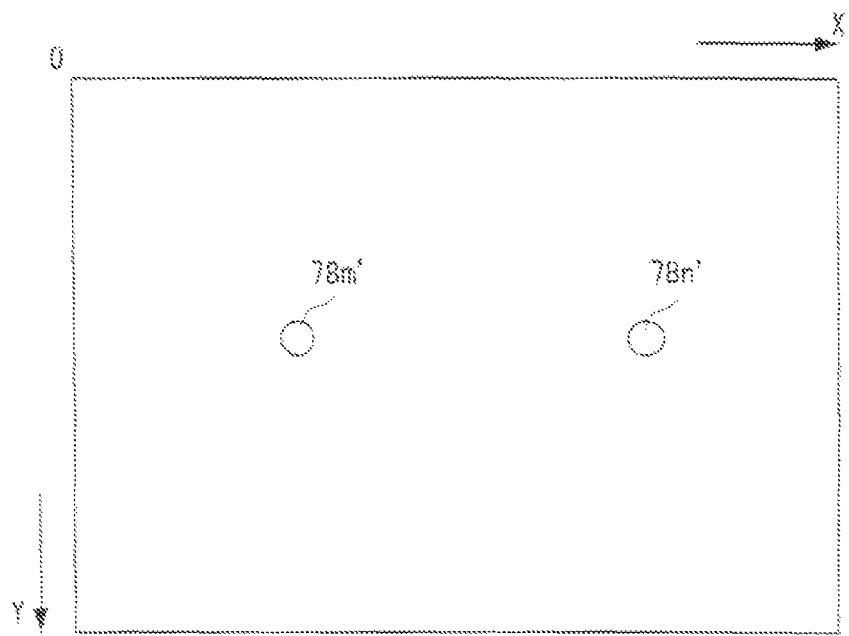
FIG. 10 is an illustrative view showing an example of a taken image including a target image.

In the case where the remote control 54 is grasped in the manipulable range, the images of the markers 78m and 78n are taken by the imaging information computation unit 104. That is, the taken image obtained by the imaging device 104c includes the images (target images) of the markers 78m and 78n that are of the imaging target. FIG. 10 is a view showing an example of the taken image including the target image. Using the image data of the taken image including the target image, the image processing circuit 104d computes the coordinate (marker coordinate) indicating the position in the taken images of the markers 78m and 78n.

Because the target image appears as a high-brightness portion in the image data of the taken image, the image processing circuit 104d detects the high-brightness portion as a candidate of the target image. Then, the image processing circuit 104d determines whether or not the high-brightness portion is the target image based on the size of the detected high-brightness portion. Sometimes the taken image includes not only images 78m' and 78n' corresponding to the two markers 78m and 78n that are of the target image but also the image except for the target image due to the sunlight from a window or a fluorescent light. The processing of the determination whether or not the high-brightness portion is the target image is performed in order to distinguish the images 78m' and 78n' that are of the target image from other images to exactly detect the target image. Specifically, the determination whether or not the detected high-brightness portion has the size within a predetermined range is made in the determination processing. When the high-brightness portion has the size within the predetermined range, it is determined that the high-brightness portion indicates the target image. On the contrary, when the high-brightness portion does not have the size within the predetermined range, it is determined that the high-brightness portion indicates the image except for the target image.

Then, the image processing circuit 104d computes the position of the high-brightness portion for the high-brightness portion in which it is determined as a result of the determination processing that the high-brightness portion indicates the target image. Specifically, a barycentric position of the high-brightness portion is computed. Hereinafter the coordinate of the barycentric position is referred to as marker coordinate. The barycentric position can be computed in more detail compared with resolution of the imaging device 104c. At this point, it is assumed that the image taken by the imaging device 104c has the resolution of 126×96 and the barycentric position is computed in a scale of 1024×768. That is, the marker coordinate is expressed by an integer number of (0, 0) to (1024, 768).

The position in the taken image is expressed by a coordinate system (XY-coordinate system) in which an origin is set to an upper left of the taken image, a downward direction is set to a positive Y-axis direction, and a rightward direction is set to a positive X-axis direction.

In the case where the target image is correctly detected, two marker coordinates are computed because the two high-brightness portions are determined as the target image by the determination processing. The image processing circuit 104d outputs the pieces of data indicating the two computed marker coordinates. As described above, the outputted pieces of marker coordinate data are added to the input data by the processor 112 and transmitted to the game machine 52.

When the game machine 52 (CPU 82) detects the marker coordinate data from the received input data, the game machine 52 can compute the position (indicated coordinate) indicated by the remote control 54 on the screen of the monitor 76 and the distances between the remote control 54 and the markers 78m and 78n based on the marker coordinate data. Specifically, the position toward which the remote control 54 is orientated, i.e., the indicated position is computed from the position at the midpoint of the two marker coordinates. When the coordinate of the position indicated by the remote control 54 is computed from the marker coordinate, the coordinate system of the taken image of FIG. 10 is appropriately converted into the coordinate system for expressing the position on the screen.

In the embodiment, the remote control 54 performs the predetermined computation processing to the imaging data to detect the marker coordinate, and the marker coordinate data is transmitted to the game machine 52. Alternatively, in another embodiment, the imaging data is transmitted as the input data from the remote control 54 to the game machine 52, and the CPU 82 of the game machine 52 may perform the predetermined computation processing to the imaging data to detect the marker coordinate and the coordinate of the indicated position.

The distance between the target images in the taken image is changed according to the distances between the remote control 54 and the markers 78m and 78n. The distance between the markers 78m and 78n, a width of the taken image, and the view angle θ2 of the imaging device 104c are previously determined, so that the game machine 52 can compute the current distances between the remote control 54 and the markers 78m and 78n by computing the distance between the marker coordinates.

In the game system 50, the game controller 10 is used for the game manipulation by the load applied by the player. The connector 24 of the game controller 10 is connected to the external extended connector 100 of the remote control 54, thereby connecting the game controller 10 and the remote control 54. This enables the game controller 10 to transmit and receive the data to and from the game machine 52 through the remote control 54.

As described above, the game controller 10 can detect the load only when the game machine 52 requires the load. Specifically, when the game machine 52 requires the load detected by the game controller 10, the CPU 82 of the game machine 52 wirelessly transmits the load obtaining command for the game controller 10 to the remote control 54. When the processor 112 of the remote control 54 receives the load obtaining command from the game machine 52, the processor 112 transmits the load obtaining command to the game controller 10 through the external extended connector 100. When the microcomputer 20 of the game controller 10 receives the load obtaining command through the connector 24 and cable 32, the microcomputer 20 controls the DC-DC converter 26 to supply the electric power to the load sensor 14, amplifier 28, and AD converter 22. Therefore, the signal indicating the load applied to each load sensor 14 is outputted, and the signal is amplified by each amplifier 28 and imparted to the AD converter 22. The AD converter 22 converts the signal into the digital data and outputs the digital data to the microcomputer 20. Accordingly, the microcomputer 20 can obtain the load detection value data detected by each of the four load sensors 14.

The microcomputer 20 transmits the obtained load detection value data to the remote control 54 through the cable 32 and connector 24. The load detection value data may directly be transmitted, or the load detection value data may be transmitted after predetermined computation processing is performed to the detection value or computation processing is performed according to the load obtaining command. The processor 112 of the remote control 54 stored the load detection value data in the memory 114 when receiving the load detection value data from the game controller 10 through the external extended connector 100. The processor 112 produces the input data (manipulation data) including the load detection value data and transmits the input data to game machine 52 through the wireless module 118. The CPU 82 of the game machine 52 obtains the load value of the game controller 10 from the received input data, and the CPU 82 can use the load value for the game processing. Accordingly, the player can perform various game manipulations by the load applied to the game controller 10.

Figure 11:
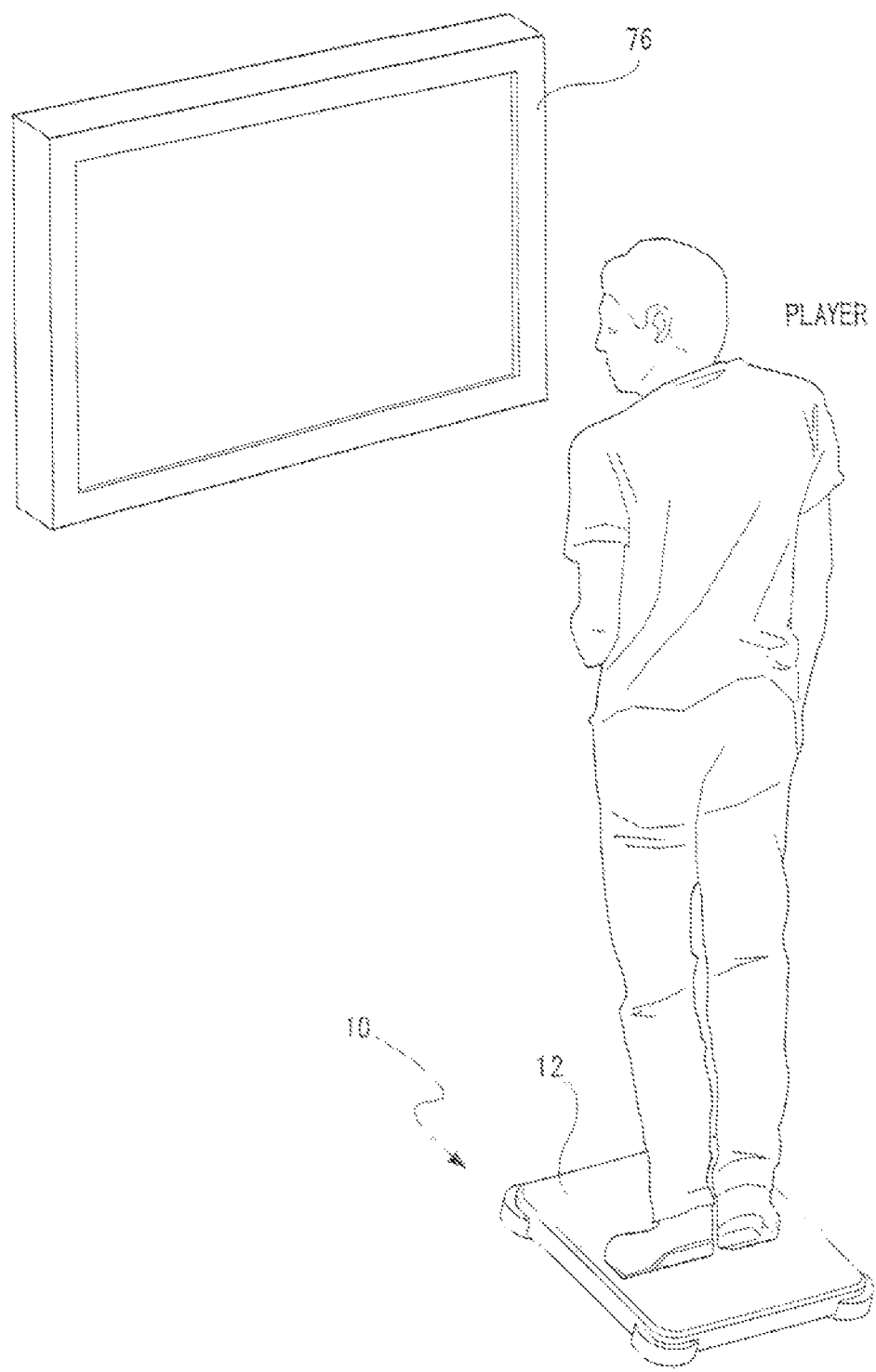
FIG. 11 is an illustrative view showing a state in which the game is played using the game controller shown in FIG. 1.

FIG. 11 is an illustrative view roughly explaining a state in which the game is played using the game controller 10. The devices except for the board 12 of the game controller 10 and the monitor 76 are omitted in FIG. 11. In playing the game with the load, typically the player puts the player's legs on the board 12 of the game controller 10 as shown in FIG. 11. The four load sensors 14 detect the loads applied to the game controller 10 by the player, and the load detection value that is of the manipulation data by the player is transmitted to the game machine 52. The load value detected by each load sensor 14 depends on the position where the player rides on the board 12. The load value detected by each load sensor 14 is changed according to the change in load when the player moves the body on the board 12 or when the player changes the loads applied to the right and left legs or the like. In the game machine 52, the game processing is performed based on the load applied by the player. Accordingly, the player can play the game by performing the game manipulation for appropriately applying the load such as the change in position where the player rides on the board 12 and the movement of the body.

For example, in the case of a game performed based on the simple total value of the four load values detected by the four load sensors 14, the player can take any position with respect to the four load sensors 14 of the game controller 10, that is, the player can play the game while riding on any position of the board 12 with any orientation. However, depending on the type of the game, it is necessary to perform processing while determining toward which direction the load value detected by each load sensors 14 is orientated when viewed from the player. That is, it is necessary to understand a positional relationship between the four load sensors 14 of the game controller 10 and the player. For example, the positional relationship between the four load sensors 14 and the player is previously defined, and it may be assumed that the player rides on the board 12 such that the predetermined positional relationship is obtained. Typically, there is defined such the positional relationship that each two load sensors 14 exist at the front and the back of and on right and left sides of the player riding on the center of the board 12, i.e. such the positional relationship that the load sensors 14 exist in the right front, left front, right rear, and left rear directions from the center of the player respectively when the player rides on the center of the board 12 of the game controller 10. In the typical game in which the screen of the monitor 76 is located at the front of the player, as shown in FIG. 11, the game controller 10 is disposed such that a predetermined one side of the board 12 is located on the side of the monitor 76 in parallel with the screen. Therefore, the above-described predetermined positional relationship is easily obtained, and the load value of each load sensor 14 becomes the load value in the predetermined direction when viewed from the player.

A spot may be provided in the board 12 in order to provide information on such the arrangement of the game controller 10 that the predetermined positional relationship is obtained to the player. For example, in order that the two adjacent load sensors 14 in predetermined one side of the board 12 are disposed at the front of the player, i.e., on the side of the monitor 76, the spot may be provided in a predetermined portion such as the upper surface or side face along the predetermined one side of the board 12. Alternatively, the cable 32 of the connector 24 is configured to be extracted from a predetermined portion in the side face or lower surface along the predetermined one side of the board 12, and the position from which the cable 32 is extracted may be set to the spot.

The game controller 10 and the game machine 52 can understand that the load detection values correspond to which direction when viewed from the player based on the identification information on each load sensor 14 included in the load detection value data and the previously-set (stored) information on the arrangement of the load sensors 14. Accordingly, the intention of the game manipulation, such as the front, rear, right, and left manipulation directions, which is performed by the player can be understood.

The arrangement of the load sensors 14 relative to the player is not previously defined but the arrangement may be set by the player's input in the initial setting or the like. For example, the load is obtained while the screen in which the player instructed to ride on the portion in a predetermined direction (such as the right front, left front, right rear, and left rear directions) when viewed from the player. Therefore, the positional relationship between each load sensor 14 and the player can be specified, and the information on the arrangement by the setting can be generated and stored.

A positional relationship in which the load sensors 14 exist at the front and back of and on right and left sides of the player respectively may be assumed in another embodiment. In this case, the game controller 10 is disposed such that one predetermined corner of the board 12 exists on the side of the monitor 76 while a predetermined diagonal line is parallel to the screen. The spot may be provided in the upper surface or side face at the one predetermined corner of the board 12.

In the game system 50, the quantity of load values necessary to the game processing is determined, and the determined quantity of load values is computed from the four load detection values. The game processing is performed based on the necessary quantity of load computation values. Because the necessary quantity of load values is computed from the four load detection values to perform the game processing, a novel game with the game controller 10 including the load sensor 14 can be proposed to perform various games.

In the embodiment, the game is performed such that the necessary quantity of load values is kept constant. FIGS. 12 to 14 show screens of the three games of the embodiment.

FIG. 12 shows the screen of the game in which the one load value is required. In the game, one load value is computed from the four load detection values and the game processing is performed based on the load value. The game is called a total load game (total load mode) and based on the summation (total load value) of the four load detection values. An example of the total load game is a squat game in which the player does the squat (knee bending) on the board 12. For example, a message of "Do squat!" is displayed on the screen, and the player is required to do the squat as many as possible within a time-limit. The determination whether or not the player is successful in the squat is made based on the total load value. For example, a waveform indicating a temporal change in total load value is shown by a graph. When the waveform is changed in a predetermined shape, it is determined that the player is successful in the squat, and the character of success and the number of successful times are displayed on the screen. When the waveform is not changed in the predetermined shape, it is determined that the player fails in the squat, and the character of failure is displayed. A score is given to the player according to the number of successful times within the time-limit.

FIG. 13 shows the screen of the game in which the two load values are required. In the game, two load values are computed from the four load detection values and the game processing is performed based on the two load values. The game is called right and left balance game (right and left balance mode) played by the balance of the player in the right and left directions. Specifically, as shown in the lower portion of FIG. 13, the four load sensors 14 of the game controller 10 are divided into two sets of the right set including the two load sensors 14 and the left set including the two load sensors 14. The player's legs are schematically shown by the two shapes shown by the dotted line on the game controller 10 for the purpose of easy understanding of the positional relationship between the player and the four load sensors 14. The numeral 14a designates the load sensor 14 located in the upper left (left front) of the player, the numeral 14b designates the load sensor 14 located in the lower left (left rear) of the player, the numeral 14c designates the load sensor 14 located in the upper right (right front) of the player, and the numeral 14d designates the load sensor 14 located in the lower right (right rear) of the player. The load values of the two sets are computed. That is, the summation (left load value) of the load detection values of the load sensors 14a and 14b on the left side of the player and the summation (right load value) of the load detection values of the load sensors 14c and 14d on the right side of the player are computed. In the game, the player is required to keep the right and left balance such that the right load value and the left load value are kept within each predetermined range for a predetermined time. A message of "Stop motion in a frame for three seconds!", a bar graph indicating the right load value, a bar graph indicating the left load value, and two frames indicating target ranges of the right and left load values are shown on the screen. When the upper end of the bar indicating each load value is falls within each frame for three seconds, the game is cleared and a score is given to the player.

FIG. 14 shows the screen of the game in which the four load values are required. In the game, the four load values are computed from the four load detection values and the game processing is performed based on the four load values. The game is called four-directional balance game (four-directional balance mode) played by the balance of the player in the vertical and horizontal directions. As used herein, the vertical direction of the player shall mean the fore-and-aft direction of the player. Specifically, as shown in the lower portion of FIG. 14, the load values are computed in the vertical and horizontal directions of the player. That is, the summation (upper load value) of the load detection values of the load sensors 14a and 14c on the upper side of the player, the summation (lower load value) of the load detection values of the load sensors 14b and 14d on the lower side of the player, the summation (left load value) of the load detection values of the load sensors 14a and 14b on the left side of the player, and the summation (right load value) of the load detection values of the load sensors 14c and 14d on the right side of the player are computed. In the game, the player is required to keep the vertical and horizontal balances such that the upper load value, the lower load value, the right load value, and the left load value are kept within each predetermined range for a predetermined time. Similarly to the right and left balance game, a message, four bar graphs indicating the load values, and four frames indicating target ranges of the load values are shown on the screen. When the upper end of the bar indicating each load value is falls within each frame for three seconds, the game is cleared and a score is given to the player.

Figure 15:
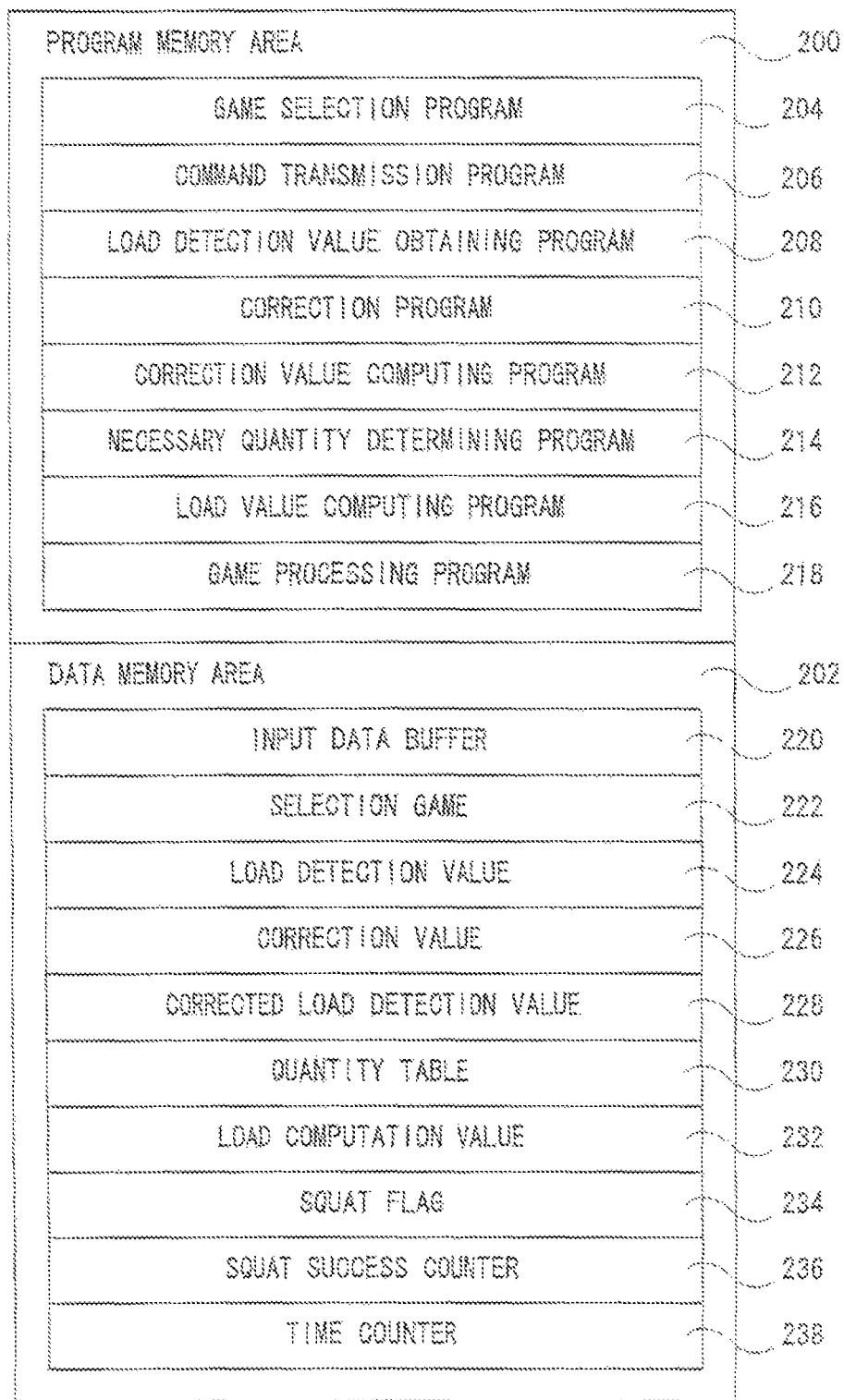
FIG. 15 is an illustrative view partially showing a memory map of the game machine shown in FIG. 4.

FIG. 15 shows an example of a memory map of the game machine 52. The memory map includes a program memory area 200 and a data memory area 202. The program and part of pieces of data are read at once from the optical disk 60 or read partially and sequentially if needed, and the program and part of pieces of data are stored in the external main memory 86. FIG. 15 only shows a part of the memory map, and other program and pieces of data necessary for the processing are also stored. For example, the sound data for outputting the sound such as the voice, sound effect, and music, the image data for producing the screen, the sound output program, and the image producing display program are read from the optical disk 60 and stored in the data memory area 202 or program memory area 200. In the embodiment, the program and part of pieces of data are read from the optical disk 60. However, in another embodiment, the program and pieces of data previously stored in a nonvolatile storage medium such as the flash memory 70 incorporated in the game machine 52 may be read and stored in the external main memory 86. At this point, the program downloaded through the network may be stored in the storage medium using the wireless communication module 92 of the game machine 52 or the communication module connected to the extended connector 96.

A game selection program is stored in a memory area 204. The game selection program is used to select the game (mode) to be performed. For example, one game is selected from the plurality of games (the total load game, the right and left balance game, and the four-directional balance game) by the input of the player. In the case where the selection is made by the player input, a game selection screen having icons corresponding to the plurality of games is displayed, and the icon is selected by the position indication using the imaging information computation unit 104 of the remote control 54, the indication using the cross key 80a, or the indication using the game controller 10, or the like. Alternatively, the game may be selected according to the performance order previously determined in the program or the game may randomly be selected.

A command transmission program is stored in a memory area 206. The command transmission program is used to transmit the load obtaining command to the game controller 10. The load obtaining command is transmitted when the load value is required (load obtaining timing). The load obtaining timing may be set so as to come at regular time intervals, or the load obtaining timing may be set only when a predetermined game status or an event is generated. When the game controller 10 receives the load obtaining command, in the game controller 10, the load is detected by the load sensor 14 and the load detection value is transmitted to the game machine 52.

A load detection value obtaining program is stored in a memory area 208. The load detection value obtaining program is used to receive and obtain the load detection value transmitted from the game controller 10.

A correction program is stored in a memory area 210. The correction program is used to correct the obtained load detection value. For example, even if the player believes that the player rides on the center of the board 12, namely, even if the player believes the player rides on the board 12 such that the barycenter is located in the center of the board 12, sometimes a variation in load values detected by the four load sensors 14 is generated depending on individual characteristics such as the attitude of the player, a standing position, a physical feature (such as difference in length of the legs), and a habit. Accordingly, in the embodiment, the load detection value is appropriately corrected to accurately recognize the game manipulation by the load of the player. The correction is performed based on difference of the load detection values of the four load sensors 14. Specifically, the detection value is corrected based on a correction value computed by a correction value computing program described below.

The correction value computing program is stored in a memory area 212. The correction value computing program is used to compute the correction value for correcting the load detection value. The correction value computation is performed by the initial setting before the game is started. For example, the image in which the player is instructed to ride on the center of the board 12 of the game controller 10 is displayed on the monitor 76, and the four load detection values detected by the four load sensors 14 are obtained. The two kinds of the differences are computed in the different combinations from the four load detection values, and the correction value is computed based on the two kinds of the differences. Specifically, the four load sensors 14 are divided into first two sets, i.e., into the right and left, the right load value and the left load value are computed, and a first difference is computed by taking the difference between the right load value and the left load value. A first correction value is computed to correct each of the load detection values divided into the right and left based on the first difference. The four load sensors 14 are divided into second two sets, i.e., into the upper and lower portions, the upper load value and the lower load value are computed, and a second difference is computed by taking the difference between the upper load value and the lower load value. A second correction value is computed to correct each of the load detection values divided into the upper and lower portions based on the second difference. Then, a final correction value of each load detection value is computed based on the first difference and the second difference. Each load detection value is corrected based on each final correction value.

For example, assuming that the left load has the value of 60 and the right load has the value of 40, the first difference becomes 20, and the first correction value is computed by equally dividing the first difference into four. That is, the first correction value for the upper left load sensor 14a and lower left load sensor 14b becomes −5 (=−20/4), and the first correction value for the upper right load sensor 14c and lower right load sensor 14d becomes 5 (=20/4). Assuming that the upper load has the value of 30 and the lower load has the value of 70, the second difference becomes 40, and the second correction value is computed by equally dividing the second difference into four. That is, the second correction value for the upper left load sensor 14a and upper right load sensor 14c becomes 10 (=40/4), and the second correction value for the lower left load sensor 14b and lower right load sensor 14d becomes −10 (=−40/4). The correction values finally set for the four load sensors 14 are computed based on the first correction value and the second correction value. Specifically, the final correction value is computed by adding the first correction value and the second correction value. That is, the final correction value for the upper left load sensor 14a becomes +5 (=−5+10), the final correction value for the lower left load sensor 14b becomes −15 (=−5−10), the final correction value for the upper right load sensor 14c becomes +15 (=5+10), and the final correction value for the lower right load sensor 14d becomes −5 (=5−10).

A necessary quantity determining program is stored in a memory area 214. The necessary quantity determining program is used to determine the quantity of load values necessary for the game processing. In the embodiment, because the total load game, the right and left balance game, and the four-directional balance game, etc. as described above are performed, the necessary quantity of load values is determined in each game or game mode or the like, and information such as a quantity table in which the necessary quantity of load values is set in each game or game mode or the like is previously stored. Accordingly, the necessary quantity of load values can be determined by the identification information such as a game name or the type or mode of the game. In another embodiment, the necessary quantity of load values may be changed according to the scene or status or the like of the game. In such cases, the necessary quantity of load values is determined by the scene of the game or the like.

A load value computing program is stored in a memory area 216. The load value computing program is used to compute the quantity of load values necessary for the game processing based on the load detection values from the four load sensors 14. In the case where the correction is performed by the correction program, the load value is computed based on the corrected load detection value. Specifically, the summation (total load value) of the four load detection values is computed in the case of the total load game, the right and left load values are computed in the case of the right and left balance game, and the left load value, the right load value, the upper load value, and the lower load value are computed in the case of the four-directional balance game. Because the necessary quantity of load values is computed from the four load detection values, the game processing can be performed using various quantities of load values according to the game. Depending on the game, sometimes the load detection value (corrected load detection value) is directly used. In such cases, the load detection value (corrected load detection value) is directly computed as the load computation value.

A game processing program is stored in a memory area 218. The game processing program is used to perform the game processing based on the load computation value. In the embodiment, the game processing is performed for the total load game, the right and left balance game, and the four-directional balance game, etc.

A memory area 220 is an input data buffer in which the pieces of input data (manipulation data) from the game controller 10 and remote control 54 are stored. A memory area 222 is a selection game memory area where the identification information on the game selected by the game selection program is stored.

The load detection values of the four load sensors 14 obtained from the input data buffer 220 using the load detection value obtaining program are stored in a memory area 224. The correction values, i.e., the final correction values for the four load sensors 14 computed using the correction value computing program are stored in a memory area 226. The load detection values corrected using the correction program are stored in a memory area 228.

The quantity table indicating the quantity of load values necessary for the game processing is stored in a memory area 230. In the embodiment, the necessary quantity of load values is stored while correlated with the name or type of the game or the like. The load computation value obtained using the load value computing program is stored in a memory area 232.

A squat flag is stored in a memory area 234. The squat flag indicates status in action or at rest in the total load game. For example, the squat flag is turned on when the change in summation (total load value) of the four load detection values is not lower than a predetermined value. A squat success counter indicating the number of times at which the player is successful in the squat is stored in a memory area 236. A time counter is stored in a memory area 238. In the squat determination of the total load game, the time counter is used to measure a time for one-time squat. In the right and left balance game and the four-directional balance game, the time counter is used to measure a time during which each load computation value falls within the predetermined target range.

Figure 16:
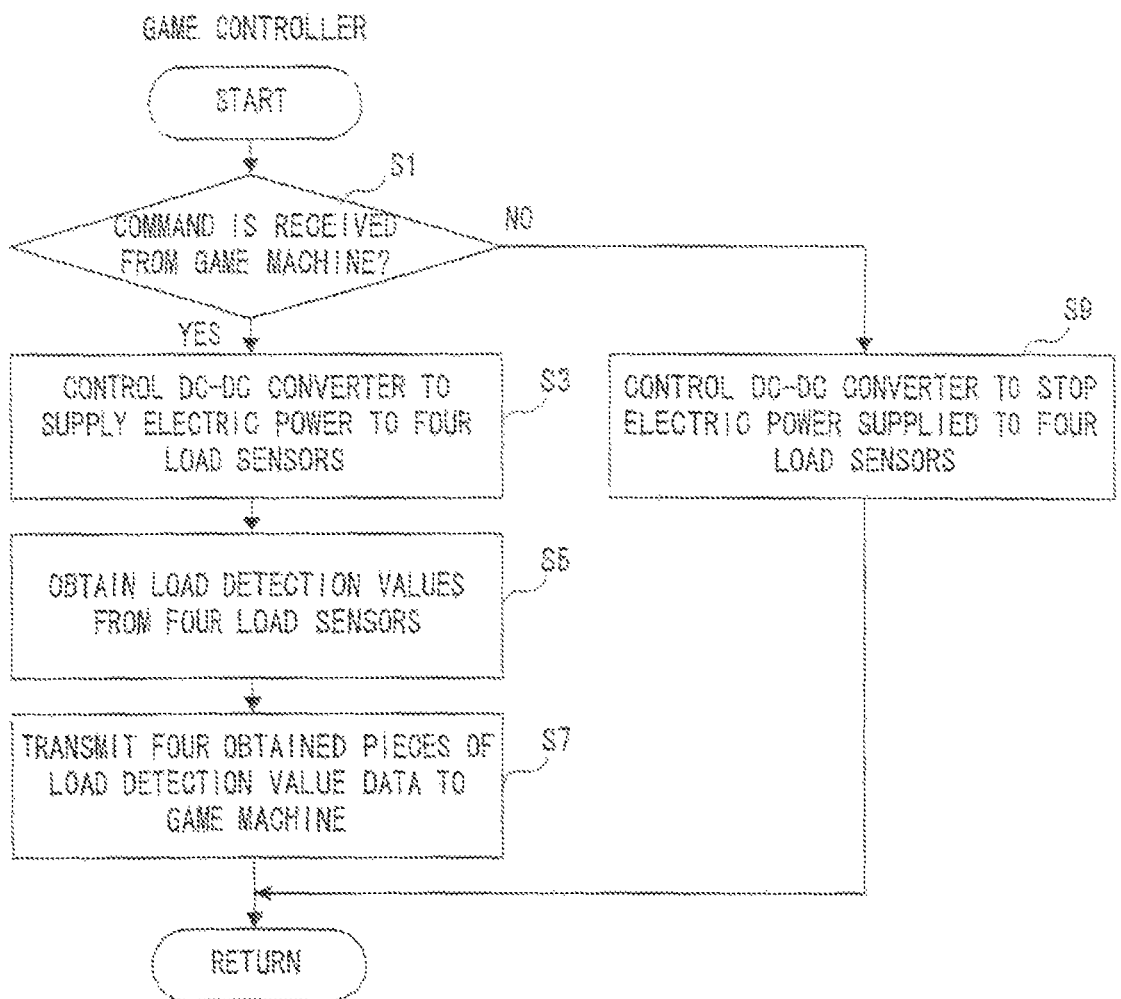
FIG. 16 is a flowchart showing an example of an operation of the game controller shown in FIG. 1.

FIG. 16 shows an example of the operation of the game controller 10. The microcomputer 20 of the game controller 10 performs the operation of FIG. 16 at regular time intervals. In a step S1, the microcomputer 20 determines whether or not the load obtaining command is received from the game machine 52. In the embodiment, because the game controller 10 is connected to the remote control 54, the microcomputer 20 determines whether or not the command of the game machine 52 is received from the remote control 54 through the connector 24.

If "YES" in the step S1, the microcomputer 20 controls the DC-DC converter 26 to supply the electric power to the four load sensors 14 in a step S3. At the same time, the electric power is also supplied to each amplifier 28 and the AD converter 22. Accordingly, each load sensor 14 imparts the signal to the AD converter 22 through each amplifier 28 according to the detected load, and the AD converter 22 produces the data indicating the load detection value of each load sensor 14 and imparts the data to the microcomputer 20.

In a step S5, the microcomputer 20 obtains the load detection values from the four load sensors 14. Specifically, the microcomputer 20 obtains the pieces of data indicating the four load detection values from the AD converter 22 and stored the pieces of data in an internal memory (not shown).

In a step S7, the microcomputer 20 transmits the obtained four pieces of load detection value data to the game machine 52. In the embodiment, the load detection value data is transmitted to the remote control 54 through the connector 24, and the load detection value data is transmitted from the remote control 54 to the game machine 52.

On the other hand, if "NO" in the step S1, that is when the load obtaining command is not received from the game machine 52, the microcomputer 20 controls the DC-DC converter 26 to stop the electric power supplied to the four load sensors 14 in a step S9. The electric power supplied to each amplifier 28 and the AD converter 22 is also stopped at the same time. When the step S7 or S9 is ended, the processing is ended. Thus, in the game controller 10, the electric power is supplied from the battery 30 to the load sensors 14 and the like only when the load detection is required, so that the power consumption can be suppressed at a lower level.

Figure 17:
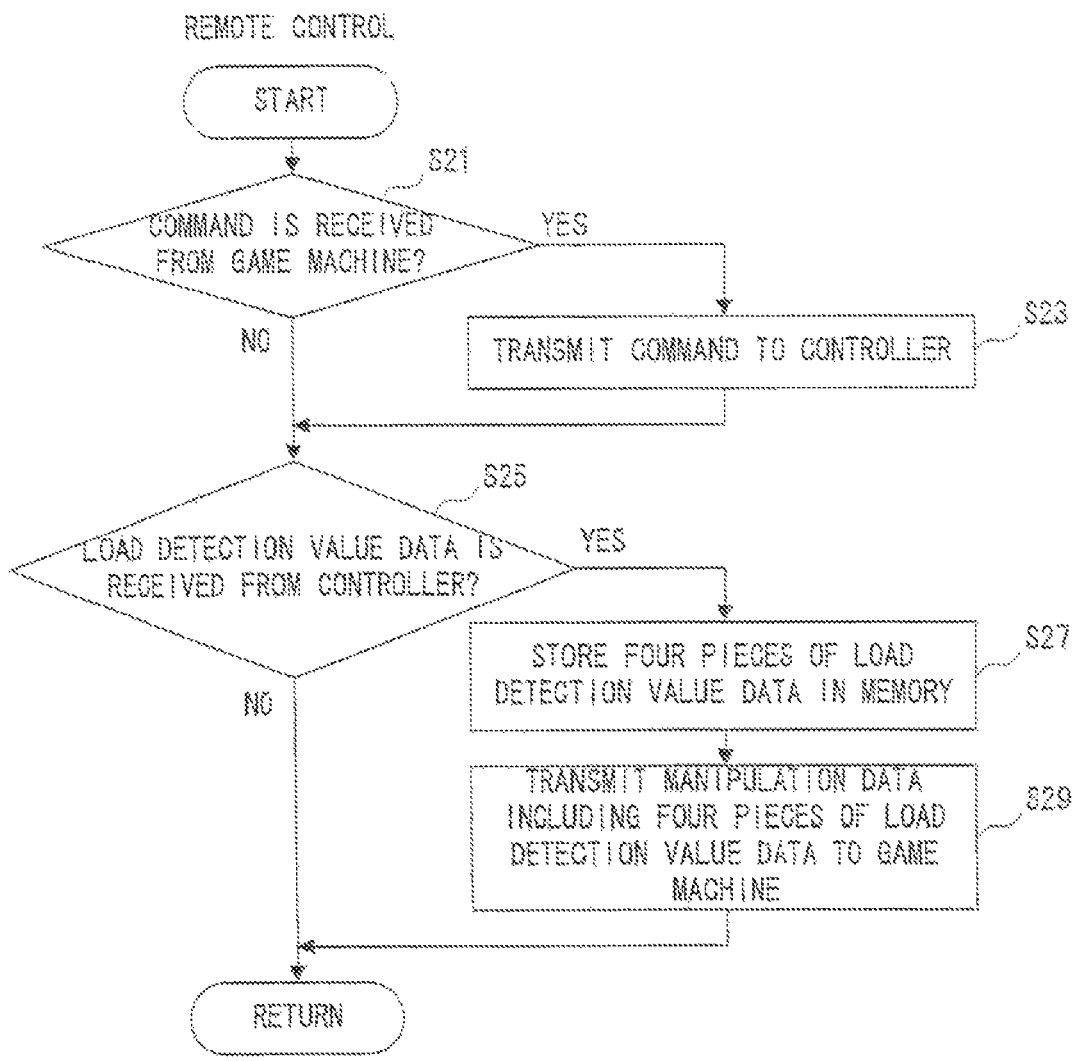
FIG. 17 is a flowchart showing an example of an operation of the controller shown in FIG. 4.

FIG. 17 shows an example of the operation of the remote control 54. FIG. 17 shows only the processing concerning the load detection of the game controller 10 in the operations of the processor 112, and the processing for obtaining manipulation data using the input means 80, acceleration sensor 116, and imaging information computation unit 104 is omitted.

In a step S21, the processor 112 determines whether or not the load obtaining command is received from the game machine 52 through the wireless module 118. If "YES" in the step S21, the processor 112 transmits the load obtaining command to the game controller 10 through the connector 100 in a step S23. Therefore, in the game controller 10, the load value is detected as described above and the load detection value data is transmitted to the remote control 54.

When the step S23 is ended, or If "NO" in the step S21, the processor 112 determines whether or not the load detection value data is received from the game controller 10 through the connector 100 in a step S25. If "YES" in the step S25, the processor 112 stores the received four pieces of load detection value data in the memory 114 in a step S27. In a step S29, the processor 112 produces the input data (manipulation data) including the four pieces of load detection value data and transmits the input data to the game machine 52 through the wireless module 118. This enables the four load detection values to be imparted from the game controller 10 to the game machine 52. The transmission is performed when the load detection value data is received from the game controller 10. Alternatively, the transmission may be performed at a predetermined time the remote control 54 transmits the input data including the manipulation data of the input means 80, the acceleration data detected by the acceleration sensor 116, and the marker coordinate data from the imaging information computation unit 104. When the step S29 is ended or If "NO" in the step S25, the processing is ended.

Figure 18:
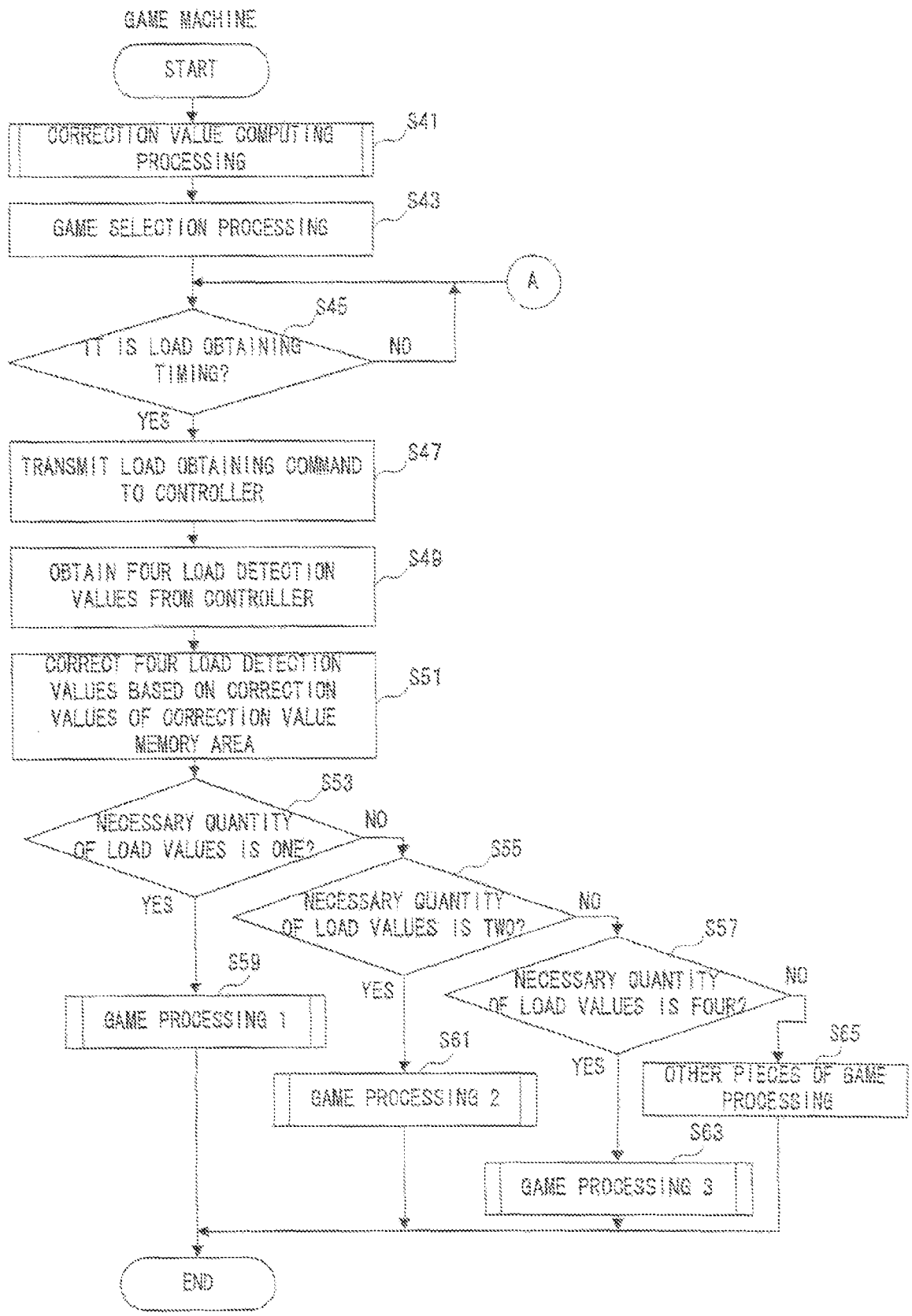
FIG. 18 is a flowchart showing an example of an operation of the game machine shown in FIG. 4.

FIG. 18 shows an example of the operation of the game machine 52. The flowchart of FIG. 18 shows only the processing concerning the load. Although the CPU 82 concurrently performs processing for the screen display (update) and processing for outputting the sound and the like at regular time intervals, these pieces of processing are omitted in the flowchart of FIG. 18.

In a step S41, the CPU 82 performs correction value computing processing. The correction value computing processing is performed according to the correction value computing program, and FIG. 19 shows an example of the detailed operation of the correction value computing processing.

Figure 19:
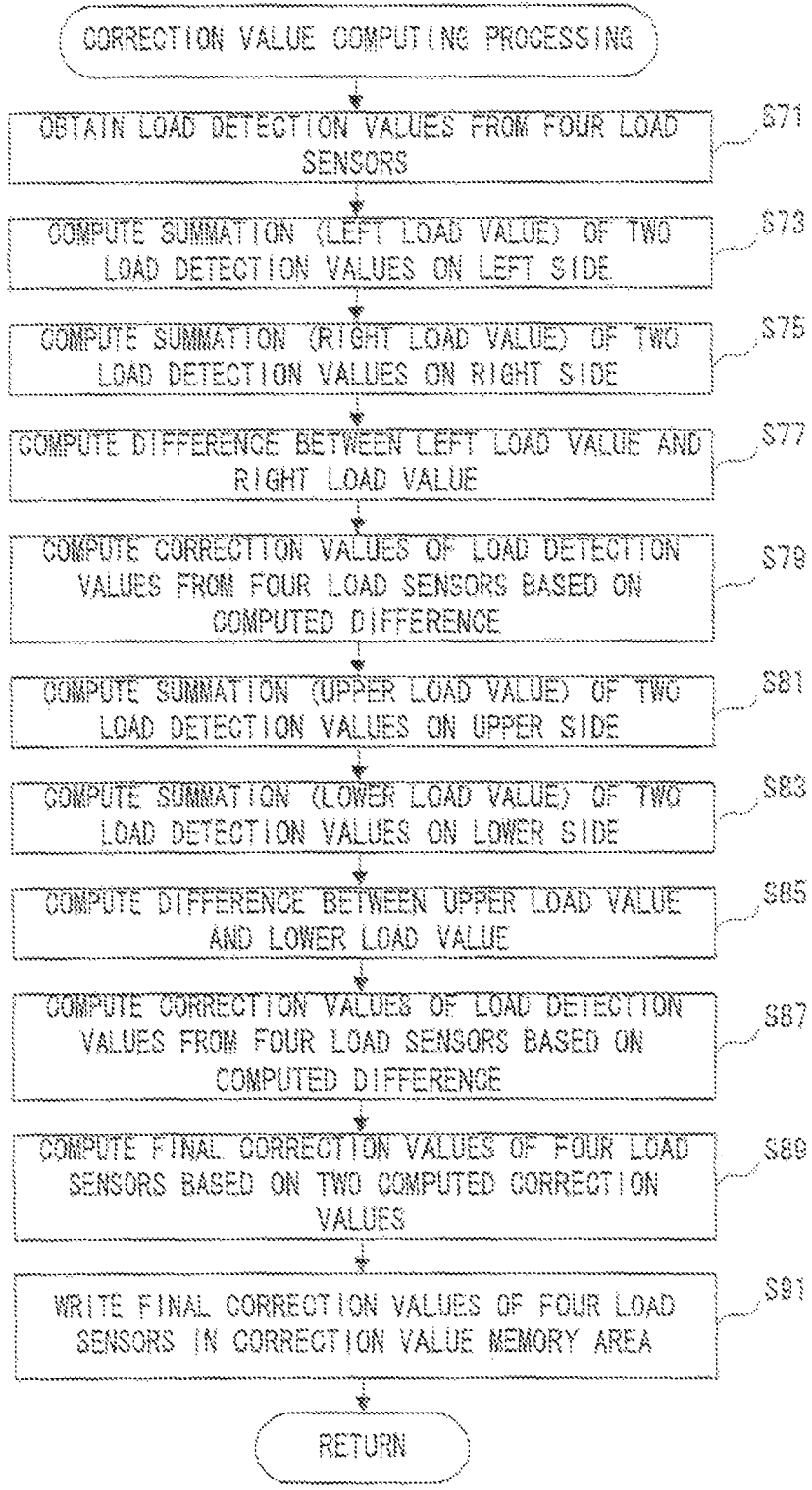
FIG. 19 is a flowchart showing an example of an operation of correction value computing processing shown in FIG. 18.

In a step S71 of FIG. 19, the CPU 82 obtains the load detection values from the four load sensors 14. For example, using the GPU 84b, the CPU 82 produces the screen in which the player is instructed to ride on the center of the board 12 of the game controller 10 and causes the monitor 76 to display the screen. Then, the CPU 82 transmits the load obtaining command to the game controller 10 through the wireless controller module 94. In response to the transmission of the load obtaining command, the load value is detected through the processing FIGS. 16 and 17, and the input data (manipulation data) including the load detection value data is transmitted to the game machine 52. Thus, the CPU 82 can obtain the four pieces of load detection value data from the input data buffer 220.

In a step S73, the CPU 82 computes the summation of the two load detection values on the left side, i.e., the left load value. In a step S75, the CPU 82 computes the summation of the two load detection values on the right side, i.e., the right load value. In a step S77, the CPU 82 computes the difference (first difference) between the left load value and the right load value. In a step S79, the CPU 82 computes the correction values of the load detection values from the four load sensors 14 based on the computed first difference. The correction value is the first correction value obtained by dividing the four load sensors 14 into the left and right, and the first correction value is computed by equally dividing the first difference into four and by allocating the equally-divided difference to each load sensor 14. Accordingly, absolute values of the first correction values for the load sensors 14 are equal to one another, and the left side differs from the right side in the sign.

In a step S81, the CPU 82 computes the summation of the two load detection values on the upper side, i.e., the upper load value. In a step S83, the CPU 82 computes the summation of the two load detection values on the lower side, i.e., the lower load value. In a step S85, the CPU 82 computes the difference (second difference) between the upper load value and the lower load value. In a step S87, the CPU 82 computes the correction values of the load detection values from the four load sensors 14 based on the computed second difference. The correction value is the second correction value obtained by vertically dividing the four load sensors 14 into the two sets, and the second correction value is computed by equally dividing the second difference into four and by allocating the equally-divided difference to each load sensor 14. Accordingly, absolute values of the second correction values for the load sensors 14 are equal to one another, and the upper side differs from the lower side in the sign.

In a step S89, the CPU 82 computes the final correction values of the four load sensors 14 based on the two computed correction values. Specifically, the first correction value and the second correction value are added to each other for each load sensor 14, thereby computing the finally-set correction values. In a step S91, the CPU 82 writes the final correction value of each of the four load sensors 14 in the correction value memory area 226. When the step S91 is ended, the correction value computing processing is ended and the processing returns to a step S43 of FIG. 18.

In the step S43 of FIG. 18, the CPU 82 performs game selection processing. In the embodiment, as described above, because the total load game, right and left balance game, and four-directional balance game having the different necessary quantities of load values are performed, the game to be performed is selected based on the player's input or a rule previously set to the program or the like. The identification information indicating the selected game is stored in the memory area 222.

Then, the CPU 82 starts the processing for the selected game. In a step S45, the CPU 82 determines whether or not it is load obtaining timing. The load obtaining timing is a time the load value is required in the game processing. In the case where the load is required at regular time intervals, the processing is configured to determine that it is the load obtaining timing at regular time intervals. Alternatively, the load obtaining timing may be a time at a predetermined event is generated or a time at a predetermined status is generated in the game. The processing in the step S45 is performed at regular time intervals until the CPU 82 determines that it is the load obtaining timing.

If "YES" in the step S45, the CPU 82 transmits the load obtaining command to the game controller 10 in a step S47. Specifically, the CPU 82 transmits the load obtaining command to the remote control 54 through the wireless controller module 94, etc. In response to the transmission of the load obtaining command, the manipulation data including the four pieces of load detection value data is transmitted from the game controller 10 (remote control 54) through the processing performed by the remote control 54 and the game controller 10. The four pieces of load detection value data are received through the wireless controller module 94, etc. and stored in the input data buffer 220. In a step S49, the CPU 82 obtains the four pieces of load detection value data from the game controller 10. Specifically, the CPU 82 reads the four pieces of load detection value data from the input data buffer 220 and stores the four pieces of load detection value data in the load detection value memory area 224.

In a step S51, the CPU 82 corrects the four load detection values based on the correction values stored in the correction value memory area 226. Specifically, the CPU 82 adds the final correction values for the four load sensors 14 to the four load detection values respectively, and the CPU 82 stores the computed values in the memory area 228 for the corrected load detection values.

In steps S53 to S57, the CPU 82 determines the quantity of load values necessary for the game processing. In the embodiment, the necessary quantity of load values is kept constant in each selection game, so that the necessary quantity of load values corresponding to the selection game stored in the memory area 222 can be specified by referring to the quantity table stored in the memory area 230.

In the step S53, the CPU 82 determines whether or not the necessary quantity of load values is one. If "YES" in the step S53, the CPU 82 performs the game processing 1 in a step S59. In the embodiment, the necessary quantity of load values is one in the total load game, and FIG. 20, which will be described later, shows the operation of the game processing 1 for the total load game.

On the other hand, if "NO" in the step S53, the CPU 82 determines whether or not the necessary quantity of load values is two in the step S55. If "YES" in the step S55, the CPU 82 performs the game processing 2 in a step S61. In the embodiment, the necessary quantity of load values is two in the right and left balance game, and FIG. 21, described later, shows the operation of the game processing 2 for the right and left balance game.

If "NO" in the step S55, the CPU 82 determines whether or not the necessary quantity of load values is four in the step S57. If "YES" in the step S57, the CPU 82 performs the game processing 3 in a step S63. In the embodiment, the necessary quantity of load values is four in the four-directional balance game, and FIG. 22, described later, shows the operation of the game processing 3 for the four-directional balance game.

If "NO" in the step S57, the CPU 82 performs another piece of game processing in a step S65.

A game end determination is made in each game processing. When the game is not ended, the processing returns to the step S45. Accordingly, the pieces of processing from the step S45 are repeated and the game advances until the CPU 82 determines that the game is ended. On the other hand, when the CPU 82 determines that the game is ended, the game processing in the step S59, S61, S63, or S65 is ended.

Figure 20:
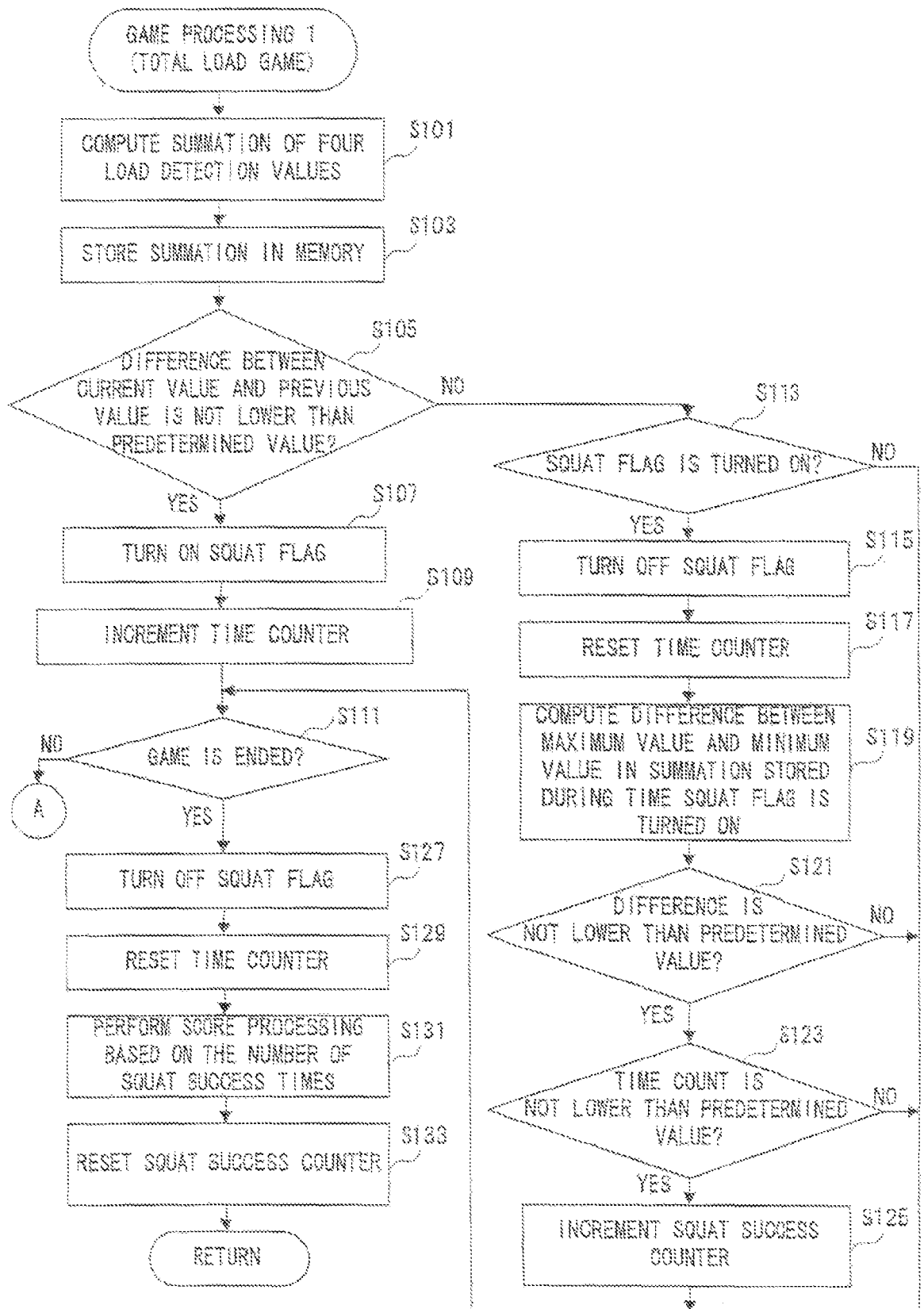
FIG. 20 is a flowchart showing an example of an operation of game processing 1 (total load game) shown in FIG. 18.

FIG. 20 shows an example of the operation of the game processing 1 for the total load game in which the necessary quantity of load values is one. When the game processing 1 is started, the CPU 82 computes the summation (total load value) of the four load detection values in a step S101. The computation is performed using the corrected load detection values of the memory area 228.

In a step S103, the CPU 82 stores the summation (total load value) in the memory. Specifically, the summation is written in the load computation value memory area 232. A history of the summation is stored in the memory area 232.

On the basis of the summation, it is determined whether or not the squat is performed. The change in summation is increased while the player does the squat, that is, the change from the previous load obtaining timing becomes a predetermined value or more. Accordingly, when the change in summation is not lower than the predetermined value, it can be determined that the squat is performed, and the summation at that time is recorded. When the squat is finished, the change from the previous load obtaining timing becomes lower than a predetermined value. Accordingly, when the change in summation becomes lower than the predetermined value, it is considered that the one-time squat is finished, and it is determined whether or not the squat is actually performed based on the recorded waveform of the temporal change in summation. The squat determination is made by a determination of a vertical length in the waveform and a determination of a horizontal length in the waveform. That is, the determination whether or not the squat is performed is made by such squat conditions that the difference between the maximum value and the minimum value of the summation in the squat is not lower than the predetermined value and the elapse time during the squat is not lower than the predetermined value.

Specifically, in a step S105, the CPU 82 determines whether or not the difference between the current summation and the previous summation is not lower than the predetermined value, namely, the player is in the squat or at rest. If "YES" in the step S105, namely, in the case where it can be considered that the squat is being performed, the CPU 82 turns on the squat flag of the memory area 234 in a step S107.

In a step S109, the CPU 82 increments the time counter of the memory area 238. This enables an elapsed time to be measured when the squat flag is turned on.

In a step S111, the CPU 82 determines whether or not the game is ended. Examples of the game end condition include that the squat is performed the predetermined times and that a predetermined time-limit elapses since the game is started. If "NO" in the step S111, the processing returns to the step S45 of FIG. 18. Accordingly, the game processing 1 is continued based on the summation.

On the other hand, if "NO" in the step S105, the CPU 82 determines whether or not the squat flag of the memory area 234 is turned on in a step S113. At this point, the CPU 82 determines whether or not the state in which the squat is performed is changed to the rest state, that is, whether or not the one-time squat is ended. If "YES" in the step S113, the CPU 82 turned off the squat flag of the memory area 234 in a step S115. In a step S117, the CPU 82 resets the time counter of the memory area 238. However, because the elapsed time until the squat flag is turned off since the squat flag is turned on, i.e., the time of the current squat is recorded in the time counter, the value indicated by the time counter is stored in another predetermined area of the data memory area 202 to use the elapsed time for the squat determination before the time counter is reset.

In a step S119, the CPU 82 detects the maximum value and the minimum value in the summation history stored in the memory area 232 when the squat flag is turned on, and computes the difference between the maximum value and the minimum value. In a step S121, the CPU 82 determines whether or not the difference between the maximum value and the minimum value is not lower than a predetermined value. That is, the CPU 82 determines whether or not the vertical length in the waveform of the summation is not lower than the predetermined value. If "YES" in the step S121, the CPU 82 determines whether or not the time count is not lower than the predetermined value in a step S123. Thus, the determination is made based on the time that elapsed when the squat flag is turned on. The elapsed time is stored in the predetermined area before the time counter is reset in the step S117. That is, the CPU 82 determines whether or not the horizontal length in the waveform of the summation is not lower than the predetermined value. If "YES" in the step S123, that is, when the CPU 82 recognizes that the squat is performed, the CPU 82 increments the squat success counter of the memory area 236, namely, the CPU 82 counts the number of squat success times in a step S125. When the step S125 is ended, the processing goes to a step S111. If "NO" in the step S121, or if "NO" in the step S123, because the CPU 82 cannot recognize that the squat is performed, the processing goes directly to the step S111. If "NO" in the step S113, that is, even if the CPU 82 recognizes that the player does not the squat but is at rest, the processing also goes to the step S111.

If "YES" in the step S111, that is, when the game end condition is satisfied, the CPU 82 turns off the squat flag of the memory area 234 in a step S127, and the CPU 82 resets the time counter of the memory area 238 in a step S129. In a step S131, the CPU 82 performs score processing based on the number of squat success times. The number of squat success times is recorded in a squat success counter of the memory area 236, and the score of the player is computed based on the number of squat success times. In a step S133, the CPU 82 resets the squat success counter of the memory area 236 to end the game processing 1.

Figure 21:
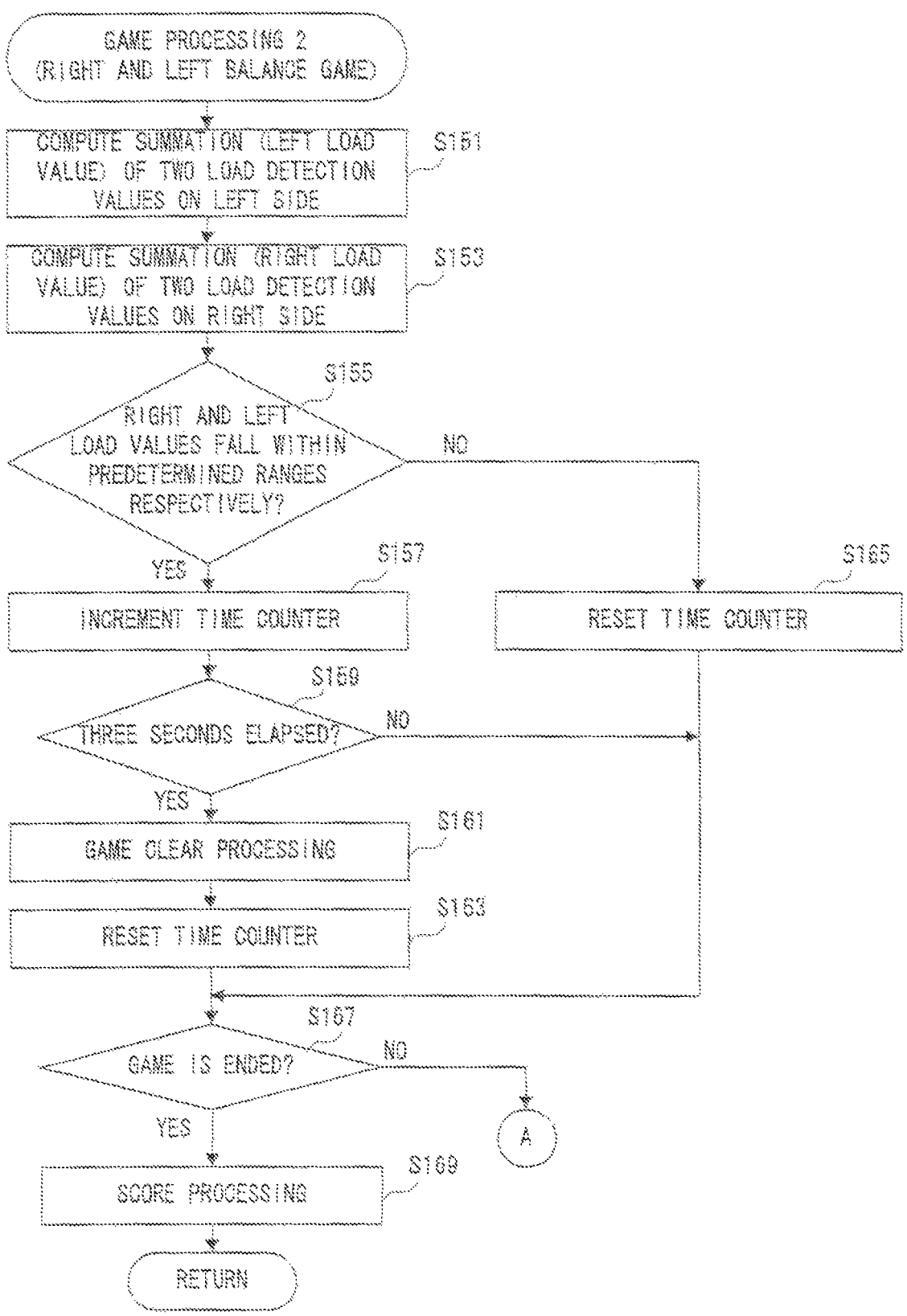
FIG. 21 is a flowchart showing an example of an operation of game processing 2 (right and left balance game) shown in FIG. 18.

FIG. 21 shows an example of the operation of the game processing 2 for the right and left balance game in which the necessary quantity of load values is two. When the game processing 2 is started, the CPU 82 computes the summation of the two load detection values on the left side, i.e., the left load value in a step S151. In a step S153, the CPU 82 computes the summation of the two load detection values on the right side, i.e., the right load value. The corrected load detection value of the memory area 228 is used to compute the load value. The computed right and left load values are stored in the memory area 232.

The method for computing the right and left load values is not limited to the embodiment. Alternatively, the right and left load values can be computed using the summation of the four load detection values. For example, the summation (total load value) of the four load detection values and the summation (right load value) of the two load detection values on the right side are computed, and the summation (left load value) of two load detection values on the left side may be computed from the difference (or ratio) between the load values.

In a step S155, the CPU 82 determines whether or not the right and left load values fall within respective predetermined ranges as targets. If "YES" in the step S155, the CPU 82 increments the time counter of the memory area 238 in a step S157. Therefore, the time during which the horizontal balance maintains the target state is measured.

In a step S159, the CPU 82 determines whether or not a predetermined time (for example, three seconds) elapses based on the time counter value of the memory area 238. That is, the CPU 82 determines whether or not the horizontal balance state in which the right and left load values fall within the predetermined ranges respectively is maintained for three seconds. If "YES" in the step S159, that is, when the target horizontal balance state is maintained for the predetermined time, the CPU 82 performs game clear processing in a step S161, and the CPU 82 resets the time counter of the memory area 238 in a step S163. If "NO" in the step S159, the processing goes directly to a step S167.

If "NO" in the step S155, that is, when the target horizontal balance is not achieved, the CPU 82 resets the time counter of the memory area 238 in a step S165. When the step S165 is ended, the processing goes to the step S167.

In the step S167, the CPU 82 determines whether or not the game is ended. Examples of the game end condition include that a predetermined time elapses since the game is started, that the maintenance of the target horizontal balance state is not achieved, and that the predetermined number of right and left balance games is cleared. If "NO" in the step S167, the processing returns to the step S45 of FIG. 18. Accordingly, the game processing 2 is continued based on the two load computation values. On the other hand, if "YES" in the step S167, the CPU 82 performs the score processing to compute the score of the player according to the result of the right and left balance game in a step S169. When the step S169 is ended, the game processing 2 is ended.

Figure 22:
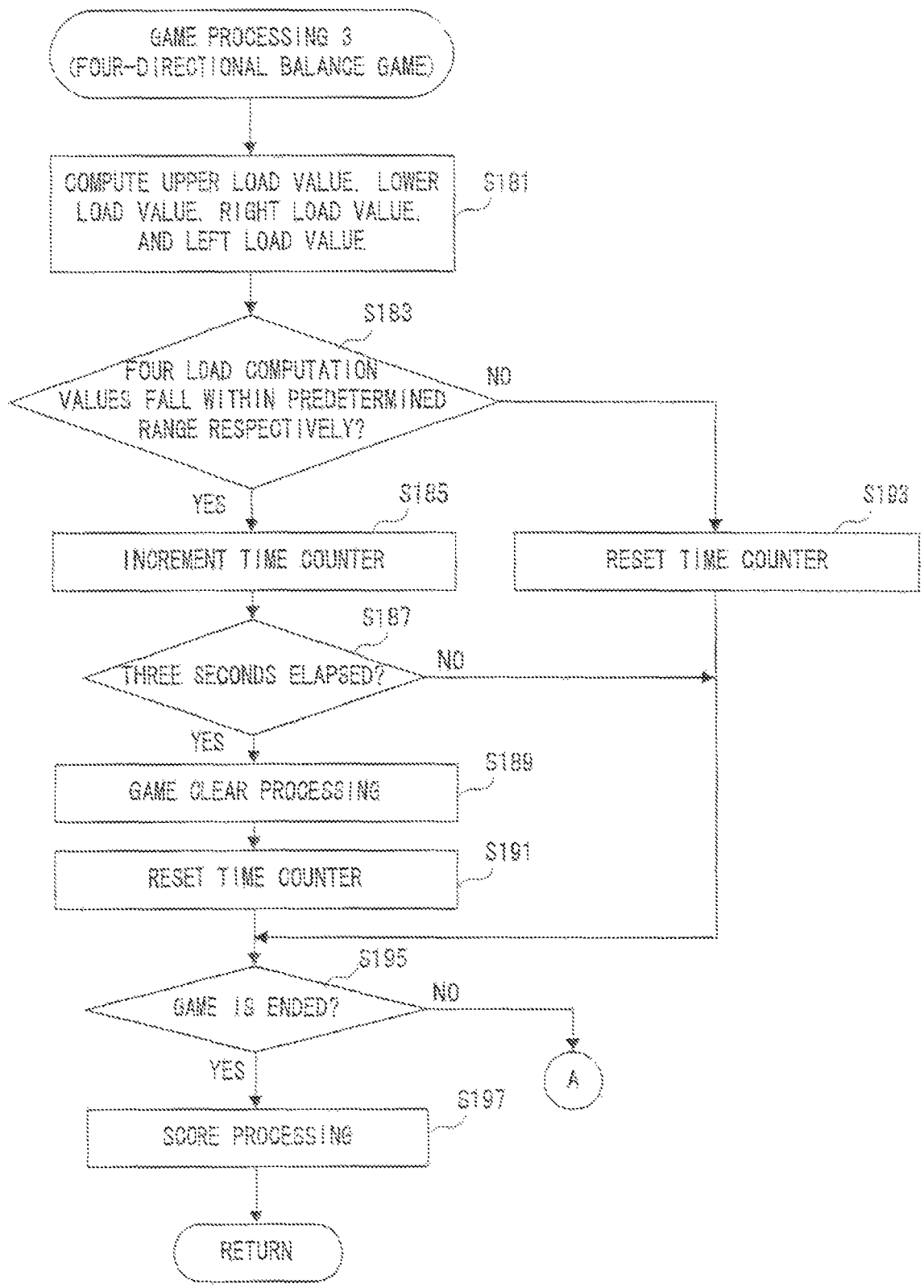
FIG. 22 is a flowchart showing an example of an operation of game processing 3 (four-directional balance game) shown in FIG. 18.

FIG. 22 shows an example of the operation of the game processing 3 for the four-directional balance game in which the necessary quantity of load values is four. When the game processing 3 is started, the CPU 82 computes the upper load value, the lower load value, the right load value, and the left load value in a step S181. The upper load value is the summation of the upper-left load value and the upper-right load value, the lower load value is the summation of the lower-left load value and the lower-right load value, the right load value is the summation of the upper-right load value and the lower-right load value, and the left load value is the summation of the upper-left load value and the lower-left load value. The corrected load detection value of the memory area 228 is used for the computation. The four computed load values are stored in the memory area 232.

In a step S183, the CPU 82 determines whether or not the four load computation values fall within respective predetermined ranges as targets. If "YES" in the step S183, the CPU 82 increments the time counter of the memory area 238 in a step S185. Therefore, the time during which the four-directional balance maintains the target state is measured.

In a step S187, the CPU 82 determines whether or not the predetermined time (for example, three seconds) elapses based on the time counter value of the memory area 238. That is, the CPU 82 determines whether or not the four-directional balance state in which the vertical and horizontal load values fall within the predetermined ranges respectively is maintained for three seconds. If "YES" in the step S187, that is, when the target four-directional balance state is maintained for the predetermined time, the CPU 82 performs the game clear processing in a step S189, and the CPU 82 resets the time counter of the memory area 238 in a step S191. If "NO" in the step S187, the processing goes directly to a step S195.

If "NO" in the step S183, that is, when the target four-directional balance state is not achieved, the CPU 82 resets the time counter of the memory area 238 in a step S193. When the step S193 is ended, the processing goes to the step S195.

In the step S195, the CPU 82 determines whether or not the game is ended. Examples of the game end condition include that a predetermined time elapses since the game is started, that the maintenance of the target four-directional balance state is not achieved, and that the predetermined number of four-directional balance games is cleared. If "NO" in the step S195, the processing returns to the step S45 of FIG. 18. Accordingly, the game processing 3 is continued based on the four load computation values. On the other hand, if "YES" in the step S195, the CPU 82 performs the score processing to compute the score of the player according to the result of the four-directional balance game in a step S197. When the step S197 is ended, the game processing 3 is ended.

According to the embodiment, the quantity of load values necessary for the game processing is determined, and the necessary quantity of load values is computed from the load detection values of the four load sensors 14, so that the game processing can be performed using the various quantities of load values according to the game. Therefore, the novel play can be proposed with the load applied by the player.

FIG. 23 shows an example of the screen of another game in which the four load values are required. The game is a hoop game, and a player character that plays the hoop according to the player's manipulation is displayed on the screen. When the player rotates a waist as if the player plays the hoop on the game controller 10, the player character also rotates the waist to rotate the hoop on the screen.

When the player rotates the waist on the game controller 10, the detected load value is changed according to the rotation. Accordingly, in the game processing, the waist rotation of the player is determined by the load value. The four load detection values are directly computed as the four load computation values to determine the waist rotation. The four load computation values are compared to one another, and the game processing is performed based on the load value having the determined maximum value. Specifically, the waist of the player character is moved toward the maximum load detection value. That is, the waist of the player character is moved toward the left front direction in the case where the upper-left load sensor 14a has the maximum load detection value, the waist of the player character is moved toward the left rear direction in the case where the lower-left load sensor 14b has the maximum load detection value, the waist of the player character is moved toward the right front direction in the case where the upper-right load sensor 14c has the maximum load detection value, and the waist of the player character is moved toward the right rear direction in the case where the lower-right load sensor 14d has the maximum load detection value. The history of the waist position is recorded. It is determined whether or not the waist movement indicates the rotation in a constant direction. When it is determined that the waist is rotated in the constant direction, the hoop can be rotated.

FIG. 24 partially shows the memory map when the hoop game is performed. The current waist position is stored in a memory area 240 of the data memory area 202. Four positions (the position in the left front direction, the position in the right front direction, the position in the right rear direction, and the position in the left rear direction) are previously determined as the waist position that can be taken by the player character, and the four positions are determined by the maximum load value as described above. The player character is controlled such that the waist of the player character is moved to the position stored in the memory area 240.

A flag N for recording the histories of the waist positions of the player and player character is stored in a memory area 242. It is determined whether or not the change in waist position recorded in the flag N indicates the rotation in the constant direction. The variable N of the flag N has an initial value of 1, and the variable N is incremented every load obtaining timing. In the embodiment, the variable N is up to 4, namely, it is determined whether or not the waist is rotated in the constant direction during the four-time load obtaining timing. For example, the numerical values of 1 to 4 are allocated to the load sensors 14 in the arrangement order of the four load sensors 14 respectively, and the allocated value are recorded in the flag N. In the embodiment, the numerical values called movement numbers of 1 to 4 are allocated in the clockwise direction of the upper left, upper right, lower right, and lower left. When the movement numbers recorded in the flags 1 to 4 in sequence are changed in the ascending (or descending) order, it is determined that the waist is rotated in the constant direction, namely, the hoop is successfully rotated. A rotating number counter is stored in a memory area 244. Therefore the number of successful rotations of the hoop is counted.

Figure 25:
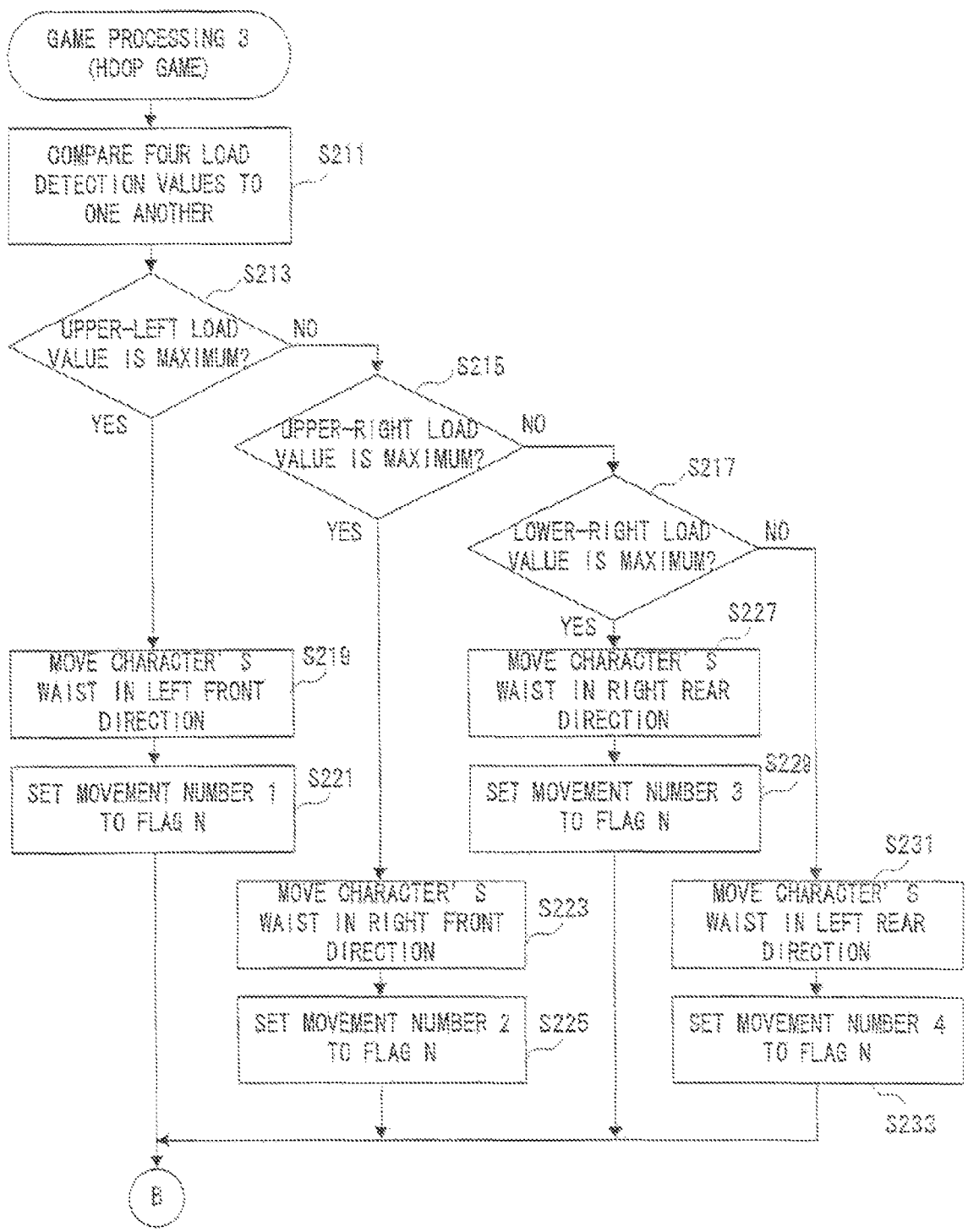
FIG. 25 is a flowchart partially showing the operation of the game processing 3 (hoop game) shown in FIG. 18.
Figure 26:
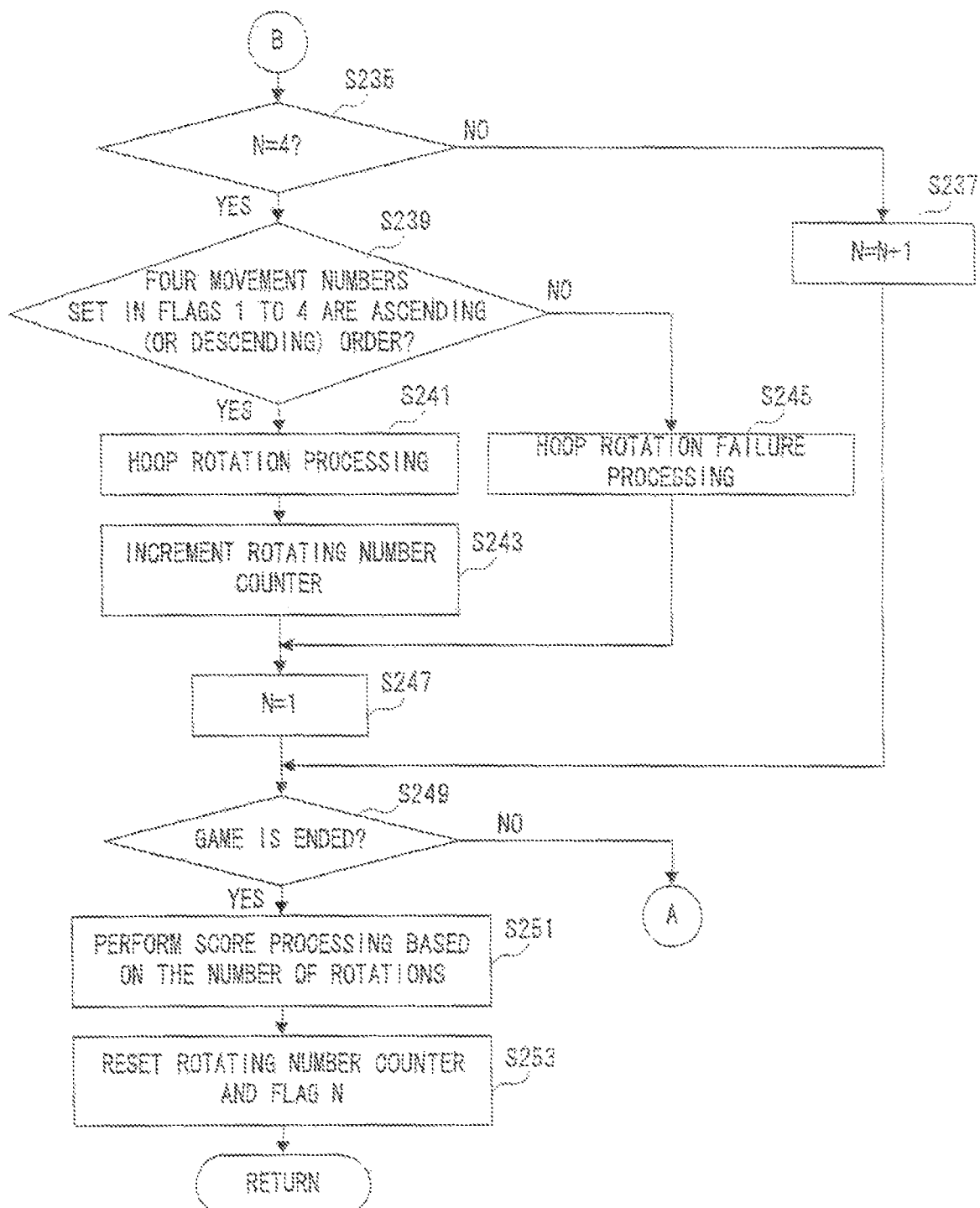
FIG. 26 is a flowchart succeeding FIG. 25.

Because the four load values are required in the game processing of the hoop game, the game processing is performed as the game processing 3 in the step S63 of FIG. 18. FIGS. 25 and 26 show an example of the operation of the game processing 3 for the hoop game. When the game processing 3 is started, the CPU 82 compares the four load values to one another to detect the maximum value in a step S211. As described above, in the embodiment, because the four load detection values are directly computed as the four load computation values, the four load detection values are stored in the load computation value memory area 232 although not shown in FIG. 25. In the case where the correction is performed using the correction program, obviously the corrected load detection value of the memory area 228 is stored in the load computation value memory area 232. The comparison in the step S211 is performed by the load computation values of the memory area 232.

In steps S213 to S217, it is determined which load value indicates the maximum value, and the waist position is determined based on the load value having the determined maximum value.

Specifically, in a step S213, the CPU 82 determines whether or not the upper-left load value is the maximum. If "YES" in the step S213, the CPU 82 moves the waist of the player character toward the left front direction in a step S219. The position in the left front direction is stored in the waist position memory area 240. In a step S221, the CPU 82 sets (stores) the movement number 1 indicating the left front direction to the flag N of the memory area 242.

On the other hand, if "NO" in the step S213, the CPU 82 determines whether or not the upper-right load value is the maximum in a step S215. If "YES" in the step S215, the CPU 82 moves the waist of the player character toward the right front direction in a step S223. The position in the right front direction is stored in the waist position memory area 240. In a step S225, the CPU 82 sets (stores) the movement number 2 indicating the right front direction to the flag N of the memory area 242.

If "NO" in the step S215, the CPU 82 determines whether or not the lower-right load value is the maximum in a step S217. If "YES" in the step S217, the CPU 82 moves the waist of the player character toward the right rear direction in a step S227. The position in the right rear direction is stored in the waist position memory area 240. In a step S229, the CPU 82 sets (stores) the movement number 3 indicating the right rear direction to the flag N of the memory area 242.

If "NO" in the step S217, namely, when the lower-left load value is the maximum, the CPU 82 moves the waist of the player character toward the left rear direction in a step S231. The position in the left rear direction is stored in the waist position memory area 240. In a step S233, the CPU 82 sets (stores) the movement number 4 indicating the left rear direction to the flag N of the memory area 242.

When the step S221, S225, S229, or S233 is ended, the processing goes to a step S235 of FIG. 26. In the step S235, the CPU 82 determines whether or not the variable N is 4. That is, the CPU 82 determines whether or not the history of the four-time waist positions is recorded to determine the waist rotation.

If "NO" in the step S235, the CPU 82 increments the variable N in a step S237, and the processing goes to a step S249. In the step S249, the CPU 82 determines whether or not the game is ended. Examples of the game end condition include that a predetermined time elapses since the game is started and that the hoop is not successfully rotated. If "NO" in the step S249, the processing returns to the step S45 of FIG. 18. Accordingly, the hoop game is continued.

On the other hand, if "YES" in the step S235, the CPU 82 determines whether or not the four movement numbers set in the flags 1 to 4 of the memory area 242 are in the ascending (or descending) order in a step S239. That is, the CPU 82 determines whether or not the waist is rotated in the constant direction. If "YES" in the step S239, the CPU 82 performs hoop rotation processing in a step S241. Therefore, the hoop is controlled so as to be rotated around a torso of the player character. Because the rotation is required to rotate in the constant direction, it is determined "NO" in the step S239, when the orientation (ascending or descending order) of the change in the movement number is changed from the previous rotation. In a step S243, the CPU 82 increments the rotating number counter of the memory area 244.

If "NO" in the step S239, the CPU 82 performs hoop rotation failure processing in a step S245. Therefore, the hoop is controlled so as to be stopped the rotation thereof.

When the step S243 or S245 is ended, the CPU 82 sets the variable N to the initial value of 1 for the purpose of the next rotation in a step S247. Then, the processing goes to the step S249.

If "YES" in the step S249, the CPU 82 performs the score processing based on the number of rotations stored in the memory area 244 in a step S251. The score is computed according to the number of successful rotations. In a step S253, the CPU 82 resets the rotating number counter of the memory area 244 and the flag N of the memory area 242 to end the game processing 3.

FIG. 27 shows an example of the screen of another game in which the four load values are required. The game is a quiz game, and a question and four choices of an answer are displayed on the screen. The four choices are correlated with the four load sensors 14 respectively, and the four choices are arranged according to the arrangement of the four load sensors 14. The example of FIG. 27 is a question for searching a wrong combination from four combinations of salutation and complimentary close. An answer 1 of "Dear Sir or Madam-Yours truly", an answer 2 of "Dear Sir or Madam-Best wishes", an answer 3 of "In reply to your letter-Yours truly", and an answer 4 of "Dear—Best wishes" are cited on the screen. The answers 1 to 4 are correlated with the upper-left, upper-right, lower-left, and lower-right load sensors 14 respectively.

In the quiz game, similarly to the hoop game, the four load detection values are directly computed as the four load computation values. The four load computation values are compared to one another, and the game processing is performed based on the load value having the determined maximum value. Specifically, the answer corresponding to the maximum load detection value is selected, and it is determined whether or not the selected answer is correct. On the game controller 10, the player put a player's weight on the direction corresponding to the answer that the player considers to be correct, or the player's leg rides on the portion corresponding to the answer. Therefore, the load value of the load sensor 14 corresponding to the answer is caused to become the maximum to reply the question. Thus, the game controller 10 is used to perform the game manipulation using the load, which allows the game to be played by selecting the answer from the plurality of choices like the general-purpose game controller including the conventional cross key, stick, and manipulation button, etc.

FIG. 28 partially shows the memory map when the quiz game is performed. Correct answer data indicating the correct answer for the question is stored in a memory area 250 of the data memory area 202. The answer selected by the player is stored in a memory area 252.

Figure 29:
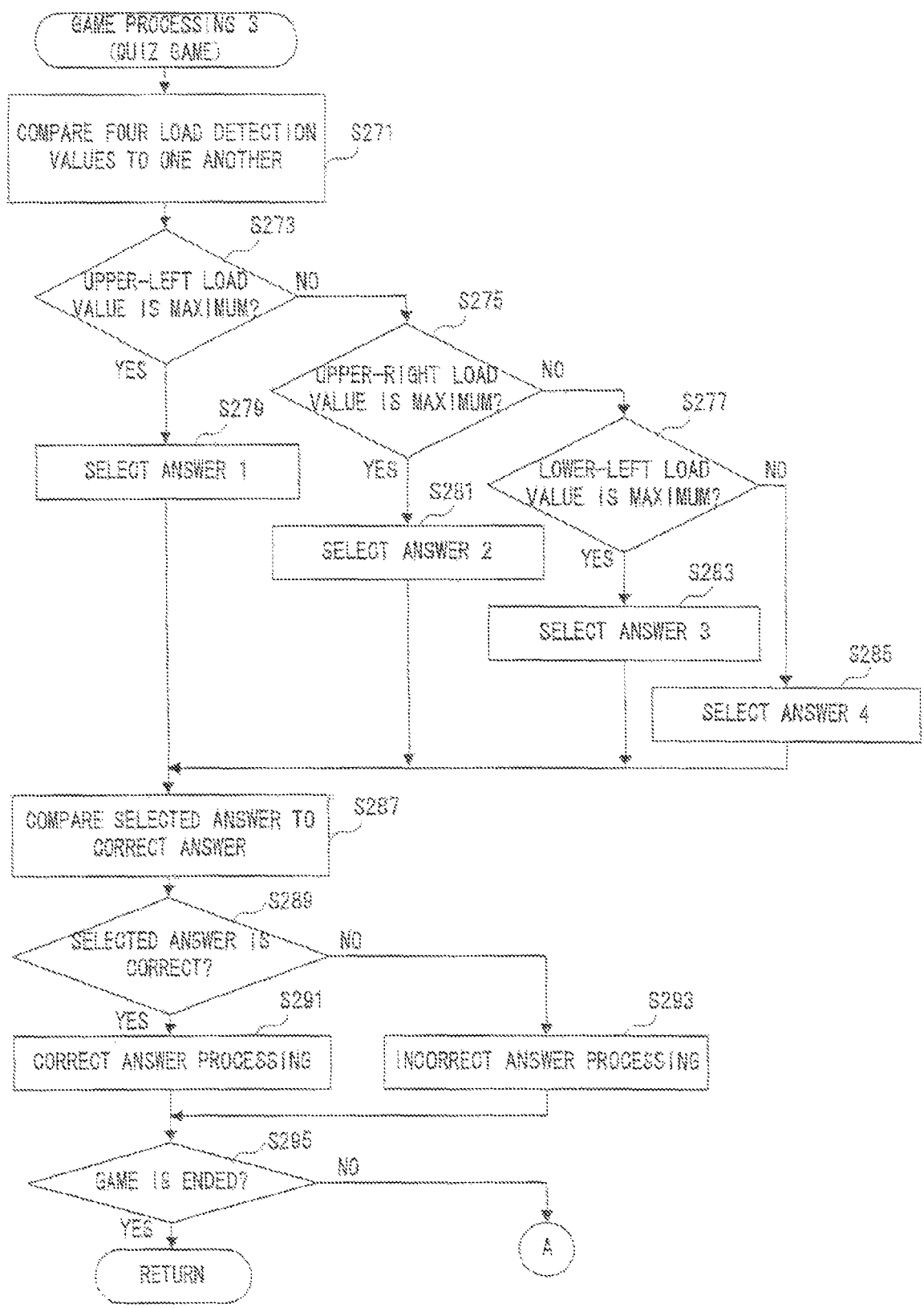
FIG. 29 is a flowchart showing an example of the operation of the game processing 3 (quiz game) shown in FIG. 18.

Because the four load values are required in the game processing of the quiz game, the game processing is performed as the game processing 3 in the step S63 of FIG. 18. FIG. 29 shows an example of the operation of the game processing 3 for the quiz game. When the game processing 3 is started, the CPU 82 compares the four load values to one another to detect the maximum value in a step S271. Similarly to the step S211 (FIG. 25) of the hoop game, the compared load values are the four load detection values (corrected load detection values) stored in the load computation value memory area 232.

In steps S273 to S277, it is determined which load value indicates the maximum value, and the answer by the player is selected based on the load value having the determined maximum value.

Specifically, in a step S273, the CPU 82 determines whether or not the upper-left load value is the maximum. If "YES" in the step S273, the CPU 82 selects the answer 1 corresponding to the upper-left load sensor 14*a* in a step S279. The identification information indicating the answer 1 is stored in the answer memory area 252.

On the other hand, if "NO" in the step S273, the CPU 82 determines whether or not the upper-right load value is the maximum in a step S275. If "YES" in the step S275, the CPU 82 selects the answer 2 corresponding to the upper-right load sensor 14*c* in a step S281. The identification information indicating the answer 2 is stored in the answer memory area 252.

If "NO" in the step S275, the CPU 82 determines whether or not the lower-left load value is the maximum in a step S277. If "YES" in the step S277, the CPU 82 selects the answer 3 corresponding to the lower-left load sensor 14*b* in a step S283. The identification information indicating the answer 3 is stored in the answer memory area 252.

If "NO" in the step S277, that is, when the lower-right load value is the maximum, the CPU 82 selects the answer 4 corresponding to the lower-right load sensor 14*d* in a step S285. The identification information indicating the answer 4 is stored in the answer memory area 252.

When the steps S279, S281, S283, or S285 is ended, the CPU 82 compares the selected answer to the correct answer based on the answer stored in the memory area 252 and the correct answer data stored in the memory area 250 in a step S287. In a step S289, the CPU 82 determines whether or not the selected answer is correct. If "YES" in the step S289, the CPU 82 performs correct answer processing in a step S291. For example, the player's score is computed by adding the point according to the question. On the other hand, if "NO" in the step 289, the CPU 82 performs incorrect answer processing in a step S293. For example, the player's score is computed by subtracting the point according to the question.

When the step S291 or S293 is ended, the CPU 82 determines whether or not the game is ended in a step S295. Examples of the game end condition include that the predetermined number of questions are taken, that the predetermined number of correct answer or incorrect answer is obtained, and that the time-limit elapses. If "NO" in the step S295, the processing returns to the step S45 of FIG. 18. Accordingly, the game processing 3 is continued based on the four load values. On the other hand, if "YES" in the step S295, the game processing 3 is ended.

FIG. 30 shows an example of the screen of another game in which the four load values are required. The game is a ski game, and the player character that skis according to the player's manipulation is displayed on the screen. In the ski game, similarly to the four-directional balance game, the four load values of the upper load value, lower load value, right load value, and left load value are computed from the four load detection values. The upper load value and the lower load value are used to compute the acceleration and deceleration of the player character, and a movement speed of the player character is controlled based on the acceleration and deceleration. The right load value and the left load value are used to control the turning movement in the right and left directions of the player character. Accordingly, on the game controller 10, the player can apply the load in the forward or backward (upward or downward) direction to increase or decrease the movement speed of the player character, and the player can apply the load in the left or right direction to turn the player character in the left or right direction.

FIG. 31 partially shows the memory map when the ski game is performed. The acceleration and deceleration of the player character is stored in a memory area 260 of the data memory area 202. The movement speed of the player character is stored in a memory area 262. The movement speed of the player character is computed based on the acceleration and deceleration of the memory area 260 and the previous movement speed. The position (coordinate) of the player character is stored in a memory area 264.

Figure 32:
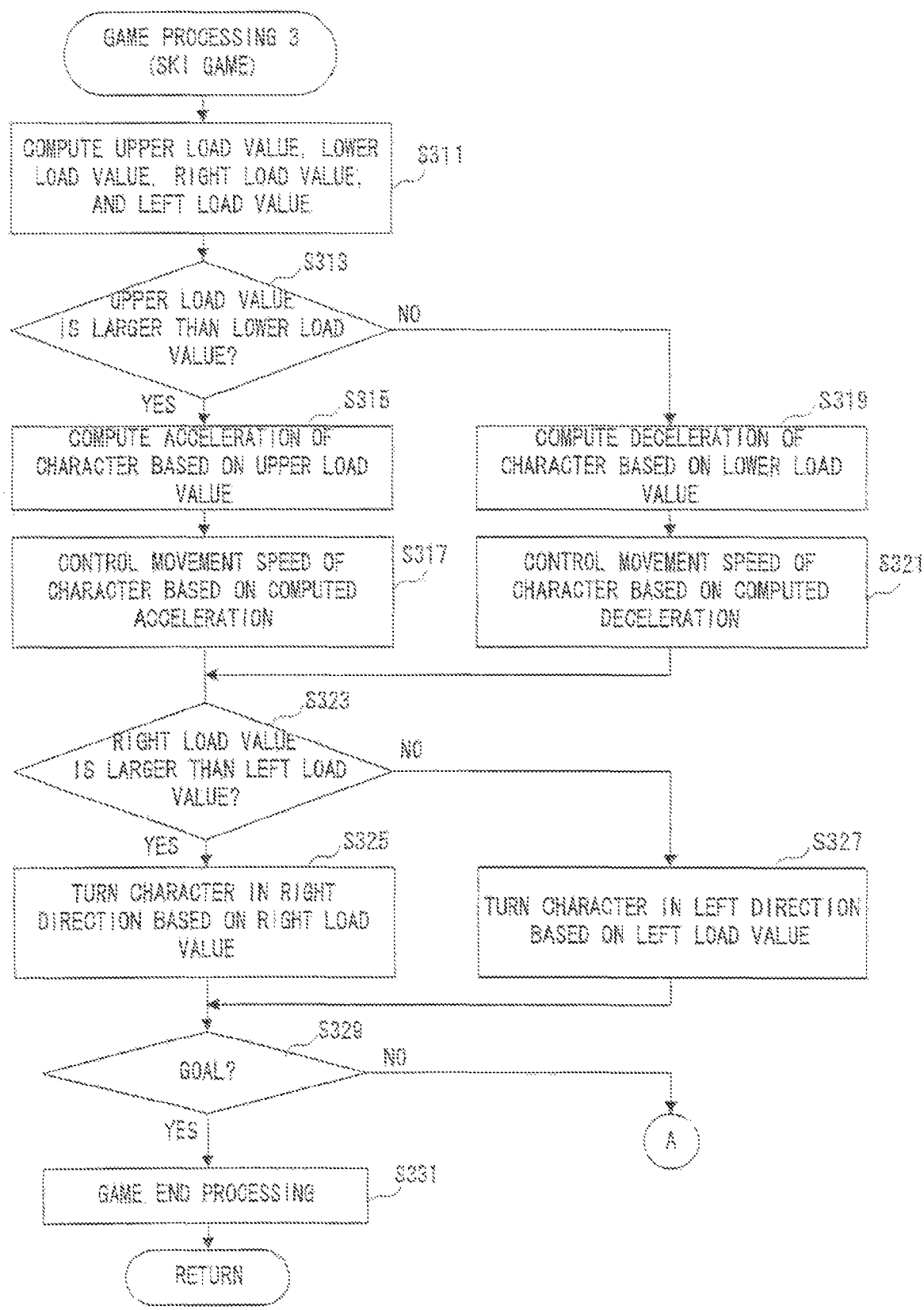
FIG. 32 is a flowchart showing an example of the operation of the game processing 3 (ski game) shown in FIG. 18.

Because the four load values are required in the game processing of the ski game, the game processing is performed as the game processing 3 in the step S63 of FIG. 18. FIG. 32 shows an example of the operation of the game processing 3 for the ski game. When the game processing 3 is started, the CPU 82 computes the upper load value, the lower load value, the right load value, and the left load value in a step S311. In the case where the correction is performed, the corrected load detection value of the memory area 228 is used. The four computed load values are stored in the load computation value memory area 232.

In a step S313, the CPU 82 determines whether or not the upper load value is larger than lower load value based on the load computation value of the memory area 232. If "YES" in the step S313, the CPU 82 computes the acceleration of the player character based on the upper load value in a step S315. The computed acceleration is stored in the memory area 260. In a step S317, the CPU 82 controls the movement speed of the player character based on the computed acceleration of the memory area 206. The current movement speed is computed based on the previous movement speed stored in the memory area 262 and the acceleration, and the current movement speed is stored in the memory area 262.

On the other hand, if "NO" in the step S313, the CPU 82 computes the deceleration of the player character based on the lower load value in a step S319. The computed deceleration is stored in the memory area 260. In a step S321, the CPU 82 controls the movement speed of the player character based on the computed deceleration of the memory area 260. The current movement speed is computed based on the previous movement speed stored in the memory area 262 and the deceleration, and the current movement speed is stored in the memory area 262.

When the step S317 or S321 is ended, in a step S323, the CPU 82 determines whether or not the right load value is larger than the left load value based on the load computation value of the memory area 232. If "YES" in the step S323, the CPU 82 turns the player character in the right direction based on the right load value in a step S325. The turning movement is controlled based on the movement speed of the memory area 262. A turning radius may be computed based on the right load value. The current position of the player character is computed based on the previous position stored in the character position memory area 264, the movement speed, and the turning radius in the right direction, etc.

On the other hand, if "NO" in the step S323, the CPU 82 turns the player character in the left direction based on the left load value in a step S327. The turning movement is controlled based on the movement speed of the memory area 262. The turning radius may be computed based on the left load value. The current position of the player character is computed based on the previous position stored in the character position memory area 264, the movement speed, and the turning radius in the left direction, etc.

When the step S325 or S327 is ended, in a step S329, the CPU 82 determines whether or not the player character reaches a goal. Specifically, the CPU 82 determines whether or not the position of the player character moved in the step S325 or S327 becomes a position within a region indicating a predetermined goal point previously stored. If "NO" in the step S329, the processing returns to the step S45 of FIG. 18. Accordingly, the game processing 3 is continued based on the four load values. On the other hand, if "YES" in the step S329, the CPU 82 performs game end processing in a step S331. For example, ranking is performed according to a sliding time or the score is computed. When the step S331 is ended, the game processing 3 is ended.

FIG. 33 shows an example of another game in which the four load values are required. The game of FIG. 33 is a game in which the player character is moved according to the manipulation like a role-playing game, and the player character that is moved according to the player's manipulation is displayed on the screen. For the convenience sake, the game is called a moving game. In the moving game, similarly to the four-directional balance game and the ski game, the four load values of the upper load value, lower load value, right load value, and left load value are computed from the four load detection values. The player character is moved in the direction corresponding to the maximum value in the four load computation values by a movement amount based on the maximum value. Accordingly, on the game controller 10, the player can apply the load to the desired direction in the four directions to move the player character to the desired direction. Thus, the directional instruction can be provided by the load applied on to the game controller 10, and the player character can be moved like the general-purpose game controller including the conventional cross key or joystick or the like.

FIG. 34 partially shows the memory map when the moving game is performed. The movement amount of the player character is stored in a memory area 270 of the data memory area 202. In the embodiment, the movement amount of the player character is computed based on the maximum value in the four load computation values. The position (coordinate) of the player character is stored in a memory area 272.

Figure 35:
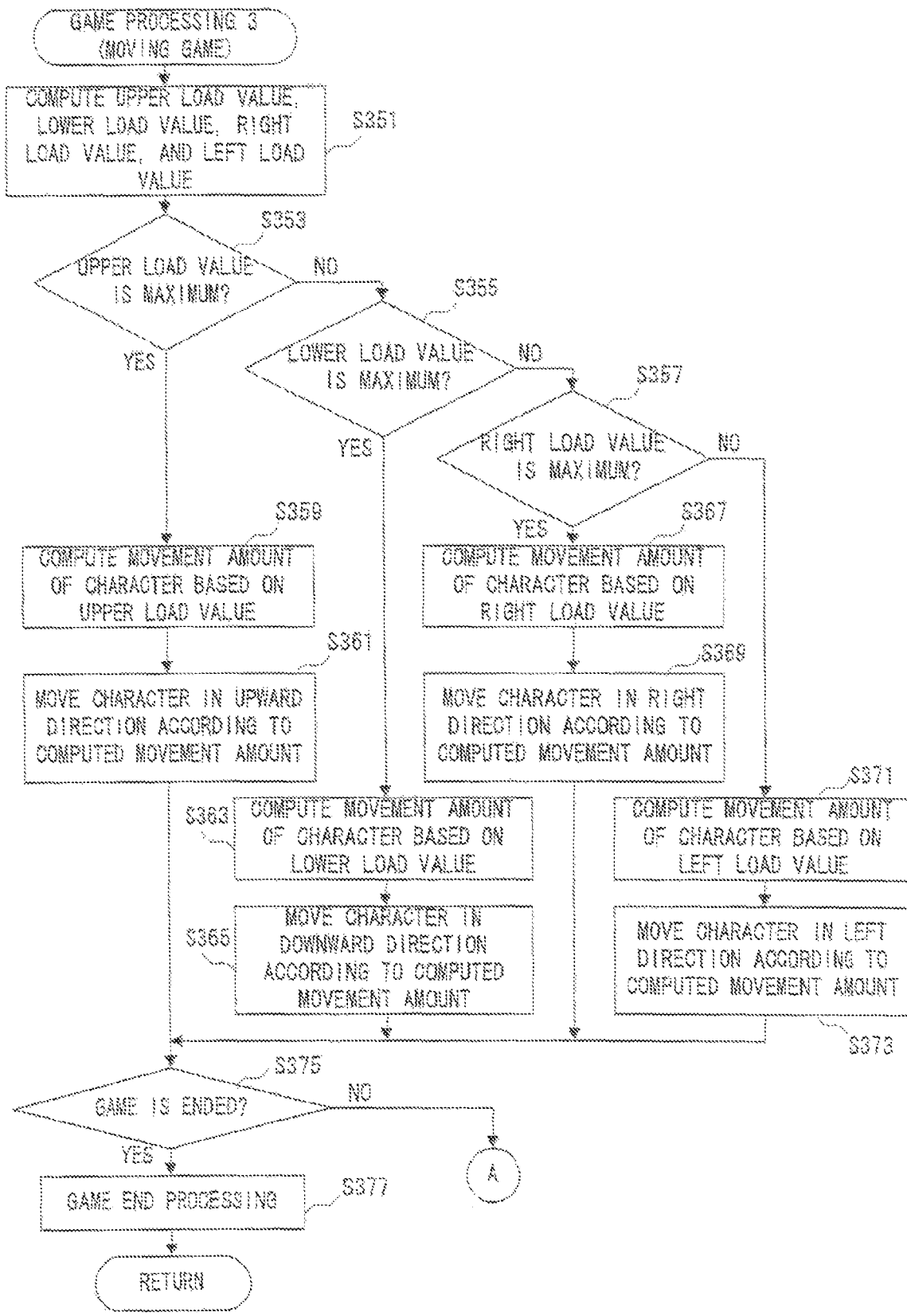
FIG. 35 is a flowchart showing an example of the operation of the game processing 3 (moving game) shown in FIG. 18.

Because the four load values are required in the game processing of the moving game, the game processing is performed as the game processing 3 in the step S63 of FIG. 18. FIG. 35 shows an example of the operation of the game processing 3 for the moving game. When the game processing 3 is started, the CPU 82 computes the upper load value, the lower load value, the right load value, and the left load value in a step S351. In the case where the correction is performed, the corrected load detection value of the memory area 228 is used. The four computed load values are stored in the load computation value memory area 232.

In steps S353 to S357, it is determined which load computation value is the maximum, and the moving direction and movement amount of the player character are controlled based on the load value having the determined maximum value.

Specifically, in a step S353, the CPU 82 determines whether or not the upper load value is the maximum. If "YES" in the step S353, the CPU 82 computes the movement amount of the player character based on the upper load value in a step S359. For example, the movement amount of the player character is increased with increasing load value. The movement amount computed based on the load computation value is stored in the memory area 270. In a step S361, the CPU 82 moves the player character in the upward direction according to the computed movement amount. The current position of the player character is computed based on the previous position stored in the character position memory area 272 and the upward movement amount stored in the memory area 270.

On the other hand, if "NO" in the step S353, the CPU 82 determines whether or not the lower load value is the maximum in a step S355. If "YES" in the step S355, the CPU 82 computes the movement amount of the player character based on the lower load value in a step S363. In a step S365, the CPU 82 moves the player character in the downward direction according to the computed movement amount of the memory area 270. The current position of the player character is computed based on the previous position stored in the character position memory area 272 and the downward movement amount stored in the memory area 270.

If "NO" in the step S355, the CPU 82 determines whether or not the right load value is the maximum in a step S357. If "YES" in the step S357, the CPU 82 computes the movement amount of the player character based on the right load value in a step S367. In a step S369, the CPU 82 moves the player character in the right direction according to the computed movement amount of the memory area 270. The current position of the player character is computed based on the previous position stored in the character position memory area 272 and the rightward movement amount stored in the memory area 270.

If "NO" in the step S357, that is, when the left load value is the maximum, the CPU 82 computes the movement amount of the player character based on the left load value in a step S371. In a step S373, the CPU 82 moves the player character in the left direction according to the computed movement amount of the memory area 270. The current position of the player character is computed based on the previous position stored in the character position memory area 272 and the leftward movement amount stored in the memory area 270.

When the step S361, S365, S369, or S373 is ended, the CPU 82 determines whether or not the game is ended in a step S375. Examples of the game end condition include that the character position enters a predetermined region and that a predetermined time-limit elapses. If "NO" in the step S375, the processing returns to the step S45 of FIG. 18. Accordingly, the game processing 3 is continued based on the four load values. On the other hand, if "YES" in the step S375, the CPU 82 performs game end processing to end the game processing 3 in a step S377.

In the moving game, the movement target is the player character (player object). Alternatively, the moving processing in the moving game can also be applied to the movement of a cursor or a pointer and the movement of a viewpoint or a point of gaze of a virtual camera or the like.

In each of the above-described embodiments, the necessary quantity of load values is kept constant in each game. However, in another embodiment, the necessary quantity of load values may be changed in the one game according to the status or scene or the like. In the embodiment, the necessary quantity of load values is determined according to the status or scene of the game, and the game processing is performed based on the necessary quantity of load values. Various quantities of load values can be computed according to the status or scene of the game to perform various game manipulations.

FIG. 36 shows an example of a screen of an action game in which the necessary quantity of load values is changed in each status or scene in the game. In the action game, as shown in FIG. 36(A), it is determined that the four load values are required in a scene in which the player character is moved on a field, and the moving processing is performed based on the four load values. For example, similarly to the moving game of FIG. 33, the player character is moved in the four directions based on the upper load value, the lower load value, the left load value, and the right load value. Specifically, the player character is moved in the direction corresponding to the maximum load value in the four load computation values by the movement amount based on the maximum value. Thus, in the moving scene, the moving direction of the player character can be manipulated by the game manipulation using the load applied onto the game controller 10 like the general-purpose game controller having the conventional cross key or joystick or the like.

As shown in FIG. 36(B), it is determined that the two load values are required in a battle scene in which the player character fights against an enemy character, and battle processing is performed based on the two load values. Specifically, the right load value and the left load value are computed, and predetermined attack or defense is performed based on the larger load computation value. In the embodiment, as shown in FIG. 36(B), because the player character faces the enemy character while having a sword in a right hand and a shield in a left hand, the attack is performed with the sword when the right load value becomes larger, and the defense is performed with the shield when the left load value becomes larger. The action or motion such as the attack and the defense of the player character can be manipulated by the game manipulation using the load applied onto the game controller 10 like the general-purpose game controller having the conventional manipulation button or the like.

Figure 37:
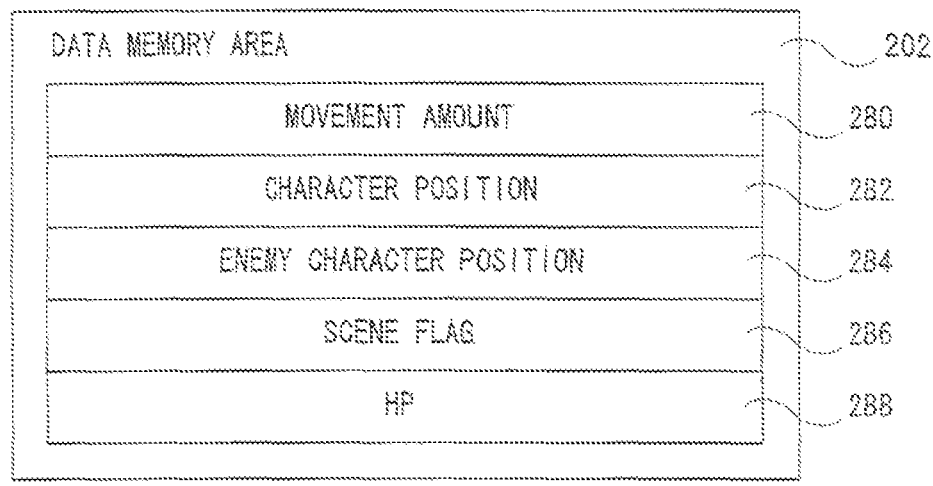
FIG. 37 is an illustrative view partially showing the memory map when the action game is performed.

FIG. 37 partially shows the memory map when the action game is performed. The moving amount of the player character is stored in a memory area 280 of the data memory area 202. The position (coordinate) of the player character is stored in a memory area 282. The position (coordinate) of the enemy character is stored in a memory area 284. A scene flag indicating the current scene is stored in a memory area 286. The field scene in which the player character is moved on the field, the battle scene in which the player character fights against the enemy character, and other scenes are provided in the action game. When the player character encounters the enemy character while being moved on the field, for example, when the positions of the player character and enemy character are brought close to each other within a predetermined range, the scene flag is switched from the field scene to the battle scene. When the battle is finished, the scene flag is switched from the battle scene to the field scene. Although only the settings of the battle scene and field scene are shown in the later-mentioned flowchart for the purpose of simple explanation, other scenes can also be set. HPs (Hit Point) indicating physical strengths or lifetimes of the player character and enemy character are stored in a memory area 288.

Figure 38:
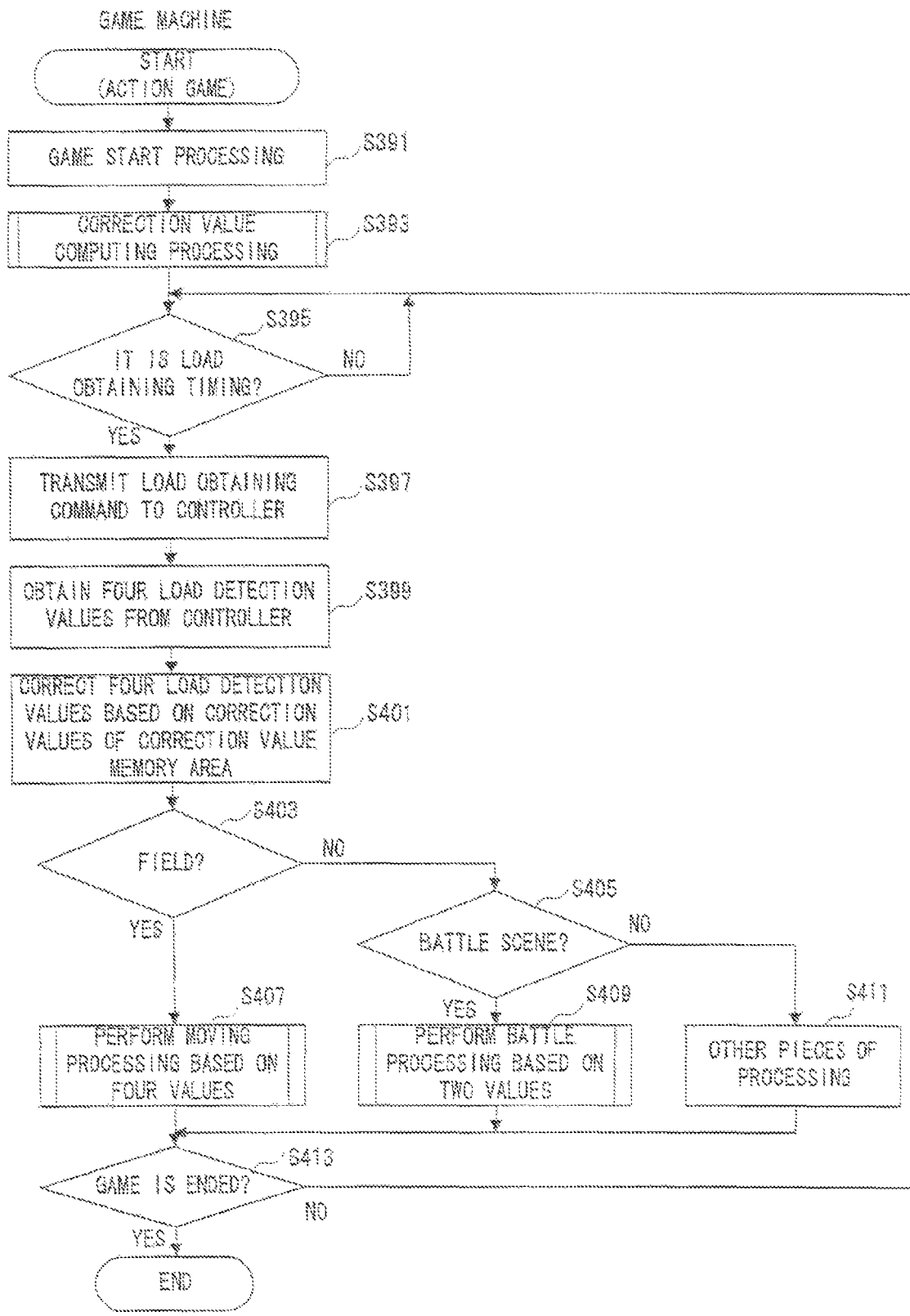
FIG. 38 is a flowchart showing an example of the operation of the game machine when the action game is performed.

FIG. 38 shows an example of the operation of the game machine 52 when the action game is performed. When the processing is started, the CPU 82 performs game start processing in a step S391. In the game start processing, the initial setting is performed to start the action game, and various variables, the flag, and the like are set to the initial values. The scene flag of the memory area 286 is set to a value indicating the field.

In a step S393, the CPU 82 performs correction value computing processing. The correction value computing processing is similar to the step S41 of FIG. 18, i.e., the correction value computing processing of FIG. 19, so that the detailed descriptions are omitted. Therefore, the correction value for correcting the load detection value is stored in the correction value memory area 226.

The pieces of processing of steps S395, S397, S399, and S401 are similar to those of steps S45, S47, S49, and S51 of FIG. 18, so that the detailed descriptions are omitted.

In steps S403 and S405, the necessary quantity of load values is determined according to the scene and status of the game. The determination is made based on the scene flag of the memory area 286.

Figure 39:
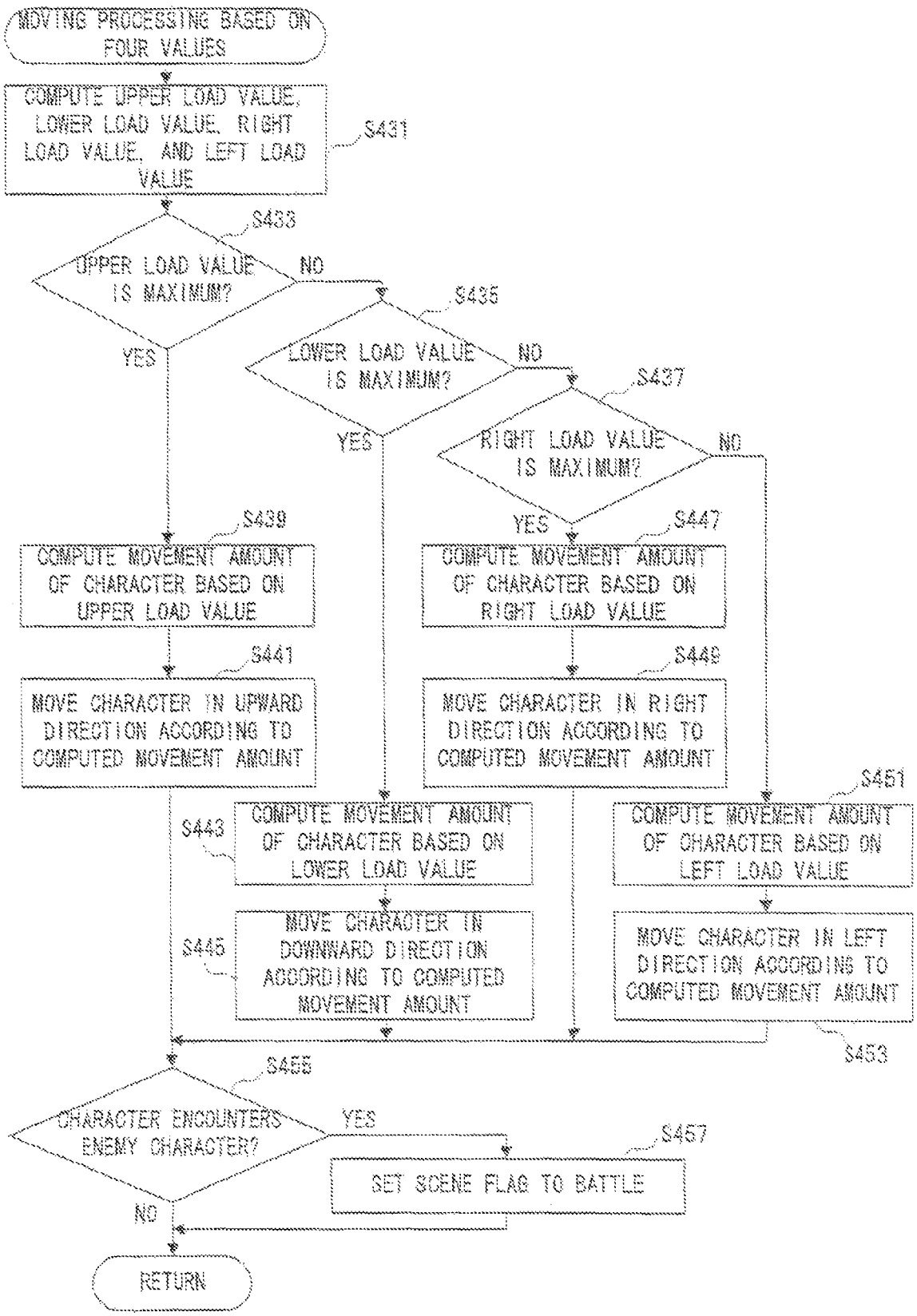
FIG. 39 is a flowchart showing an example of an operation of moving processing based on four values shown in FIG. 38.

Specifically, in the step S403, the CPU 82 determines whether or not the scene is the field based on the scene flag. If "YES" in the step S403, namely, when it is determined that the four load values are required, the CPU 82 performs the moving processing based on the four values in a step S407. The four values mean the four load computation values. FIG. 39 shows the detailed operation of the moving processing later.

Figure 40:
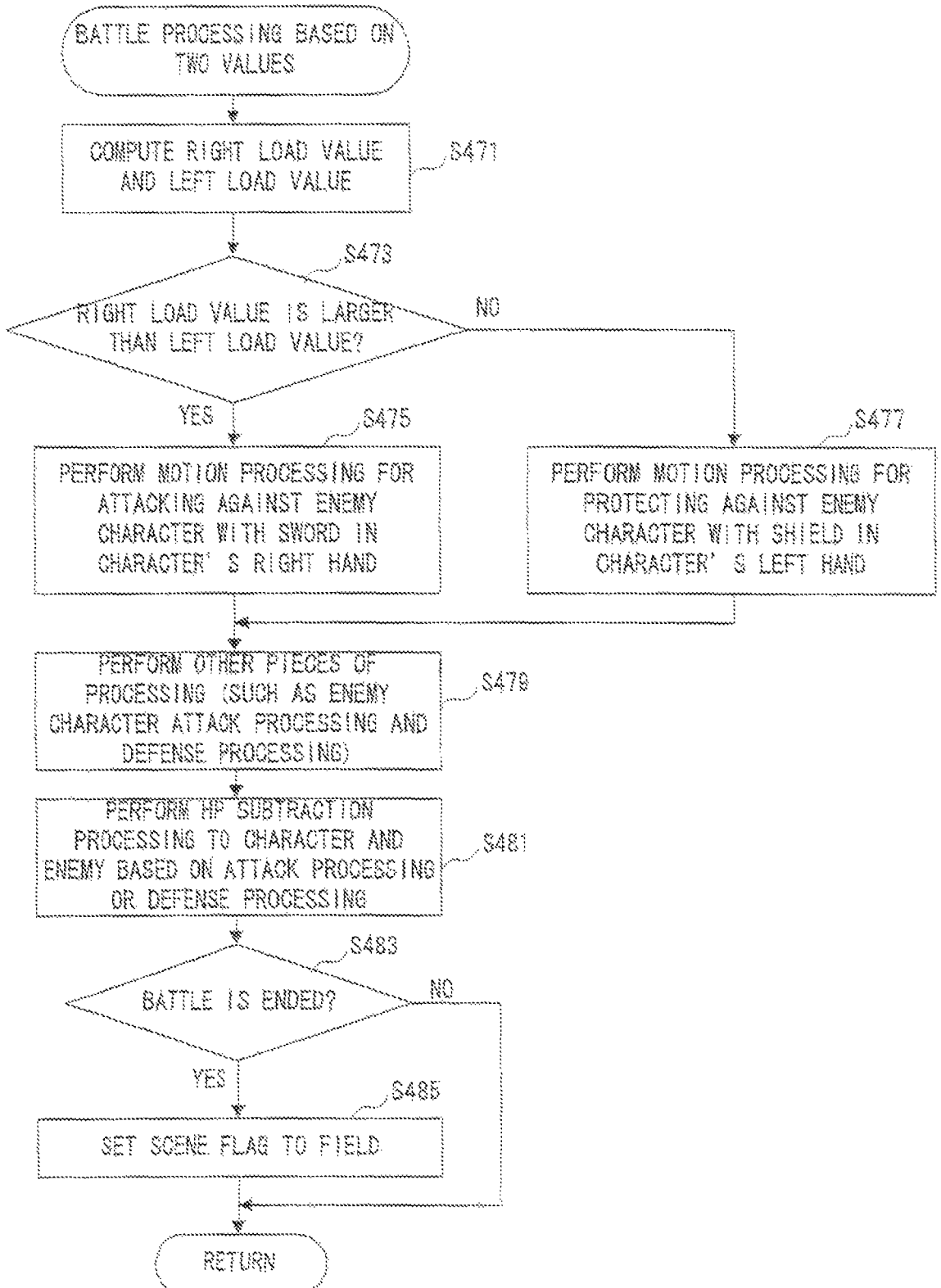
FIG. 40 is a flowchart showing an example of the operation of the battle processing based on two values shown in FIG. 38.

On the other hand, if "NO" in the step S403, the CPU 82 determines whether or not scene is the battle scene based on the scene flag in a step S405. If "YES" in the step S405, namely, when it is determined that the two load values are required, the CPU 82 performs the battle processing based on the two values in a step S409. The two values mean the two load computation values. FIG. 40 shows the detailed operation of the battle processing later.

If "NO" in the step S405, namely, in the case of other scenes except for the filed and battle, the CPU 82 performs other pieces of processing in a step S411.

When the step S407, S409, or S411 is ended, the CPU 82 determines whether or not the game is ended in a step S413. Examples of the game end condition include that the player character loses battle in the battle processing and the predetermined number of enemy characters are struck down. If "NO" in the step S413, the processing returns to the step S395. Accordingly, the action game in which the necessary number of load values is changed according to the scene and status is continued. On the other hand, if "YES" in the step S413, the game processing is ended.

FIG. 39 shows an example of the operation of moving processing based on the four values in the step S407 of FIG. 38. As described above, the moving processing is performed based on the maximum value in the upper load value, the lower load value, the right load value, and the left load value. The pieces of processing of steps S431 to S453 of FIG. 39 are similar to those of steps S351 to S373 of FIG. 35, so that the detailed descriptions are omitted. The movement amount computed in steps S439, S443, S447, and S451 is stored in the memory area 280, and the player character position computed in steps S441, S445, S449, and S453 is stored in the memory area 282.

When the step S441, S445, S449, or S453 is ended, the CPU 82 determines whether or not the player character encounters the enemy character in a step S455. Specifically, the CPU 82 determines whether or not the position of the player character of the memory area 282 and the position of the enemy character of the memory area 284 are brought close to each other within the predetermined range. The movement of the enemy character is controlled by the program, and the computed position of the enemy character is stored in the memory area 284.

If "YES" in the step S455, the CPU 82 sets the scene flag to the battle by storing the value indicating the battle in the scene flag memory area 286 in a step S457. On the other hand, if "NO" in the step S455, the moving processing based on the four values is ended, and the processing goes to the step S413 of FIG. 38.

FIG. 40 shows an example of the operation of the battle processing based on the two values in the step S409 of FIG. 38. When the battle processing is started, in a step S471, the CPU 82 computes the right load value and the left load value based on the corrected load detection value of the memory area 228, and the CPU 82 stores the right load value and the left load value in the load computation value memory area 232.

In a step S473, the CPU 82 determines whether or not the right load value is larger than the left load value. If "YES" in the step S473, the CPU 82 performs motion processing in a step S475 in order that the player character attacks against the enemy character with the sword in the player character's right hand. For example, the motion processing is performed based on previously-stored motion data with which the player character wields the sword in the right hand. On the other hand, if "NO" in the step S473, the CPU 82 performs motion processing in a step S477 in order that the player character protects against the enemy character with the shield in the left hand. The motion processing is also performed based on previously-stored motion data with which the player character puts the shield in the left hand forward.

When step S475 or S477 is ended, the CPU 82 performs other pieces of processing in a step S479. Examples of other pieces of processing include enemy character attack processing and defense processing, and other pieces of processing are performed according to the program.

In a step S481, the CPU 82 performs HP subtraction processing to the player character and enemy character based on the attack processing or the defense processing. For example, when it is determined that one character hits the other character, the HP of the other character is subtracted by a predetermined value in the case where the other character does not protect against the one character, and the HP of the other character is not subtracted in the case where the other character protects against the one character. The computed HPs of the player character and enemy character are stored in the memory area 288.

In a step S483, the CPU 82 determines whether or not the battle is ended. For example, the CPU 82 determines that the battle is ended when one of the HPs becomes zero. When the HP of the player character becomes zero, it is determined that the player character loses the battle. When the HP of the enemy character becomes zero, it is determined that the player character wins the battle. If "YES" in the step S483, the CPU 82 sets the scene flag to the field by storing the value indicating the field in the scene flag memory area 286 in a step S485. On the other hand, if "NO" in the step S483, the battle processing based on the two values is directly ended (battle scene is continued), and the processing returns to the step S413 of FIG. 38.

In the embodiment of the action game, the necessary quantity of load values is determined according to the scene of the game, and the moving processing and battle processing of the player character are performed based on the necessary quantity of load values. However, in another embodiment, the game processing may be performed while the barycentric position and the necessary quantity of load values are used according to the game scene. In the following embodiment of the role-playing game, the movement of the player character is controlled based on the barycentric position, and the battle of the player character is controlled based on the necessary quantity of load values.

FIG. 41 is an illustrative view for explaining the movement control based on the barycentric position. In the embodiment, the movement speed of the player character is controlled based on the barycentric position. Specifically, assuming that a is the load detection value of the upper-left load sensor 14*a*, b is the load detection value of the lower-left load sensor 14*b*, c is the load detection value of the upper-right load sensor 14*c*, and d is the load detection value of the lower-right load sensor 14*d*, an X coordinate (XG) and a Y coordinate (YG) of the barycenter in the coordinate system on the screen are computed by the following equations:

$$XG = ((c+d)-(a+b)) \times m \quad \text{[Formula 1]}$$

$$YG = ((a+c)-(b+d)) \times n \quad \text{[Formula 2]}$$

Where m and n are a constant. An XY is the coordinate system on the screen, an origin (0, 0) is set in the center of the screen, and $-1 \leq X \leq 1$ and $-1 \leq Y \leq 1$.

Thus, the XG is computed based on the difference between the right load value and the left load value, and the YG is computed based on the difference between the upper load value and the lower load value.

The moving direction and movement speed of the player character are controlled based on the coordinate of the barycenter. Assuming that the origin of the screen coordinate system is the position of the player character and the center of the board 12 of the game controller 10, the distance with the barycentric position and the orientation from the origin toward the barycentric position are used in the movement control. Specifically, a vector V connecting the center (0, 0) of the screen and the barycenter (XG, YG) is computed, and the movement speed of the player character is computed based on a size of the vector V. The player character is moved at the computed movement speed in the orientation of the vector V. In the case of the two-dimensional virtual game space, the player character may be moved at the computed movement speed in the orientation of the vector V computed using the screen coordinate system. On the other hand, in the case of the three-dimensional virtual game space, for example, the screen coordinate system is considered to be a plane coordinate system in a three-dimensional coordinate system of the game space, and the player character may be moved on the plane at the computed movement speed in the orientation of the vector V. From the view point of display, as shown in FIG. 41, the background may be scrolled while the position of the player character is fixed to the center of the screen.

FIG. 42 shows an example of the game screen in battle scene. In the embodiment, the four load values are required in the battle scene, and the upper load value, the lower load value, the right load value, and the left load value are computed. Various commands for the battle are allocated to the four load computation values respectively. The command corresponding to the maximum load computation value is selected in the four load detection values, and the battle processing corresponding to the command is performed. For example, a command of "fight" for the attack is allocated to the upper load value, a command of "protect" for the defense is allocated to the lower load value, a command of "magic" for working magic is allocated to the right load value, and a command of "escape" for escape from the battle is allocated to the left load value. The screen shown in FIG. 42 is used in both the screen indicating the battle scene and the command selection screen, and the icons indicating the command are displayed at the upper, lower, right, and left positions on the screen such that the player clearly recognizes the correlation in which the commands are allocated to the upper, lower, right, and left directions respectively. In another embodiment, a command selection screen in which the screen is divided into the upper, lower, right, and left regions corresponding to the commands may be displayed independently of the battle scene. The manipulations such as the command selection can be performed by providing the direction instruction using the load applied onto the game controller 10 like the general-purpose game controller having the conventional cross key or joystick or the like.

FIG. 43 partially shows the memory map when the role-playing game is performed. The barycentric position is stored in a memory area 300 of the data memory area 202. The X coordinate and Y coordinate of the barycenter are computed according to the above-mentioned Formula 1 and Formula 2. A moving vector is stored in a memory area 302. The moving vector is a vector connecting the origin (0, 0) and the barycenter (XG, YG). The movement speed is stored in a memory area 304. The movement speed is computed by magnitude of the moving vector. Similarly to the action game, the position of the player character is stored in the memory area 282, the position of the enemy character is stored in the memory area 284, the scene flag is stored in the memory area 286, and the HP is stored in the memory area 288.

Figure 44:
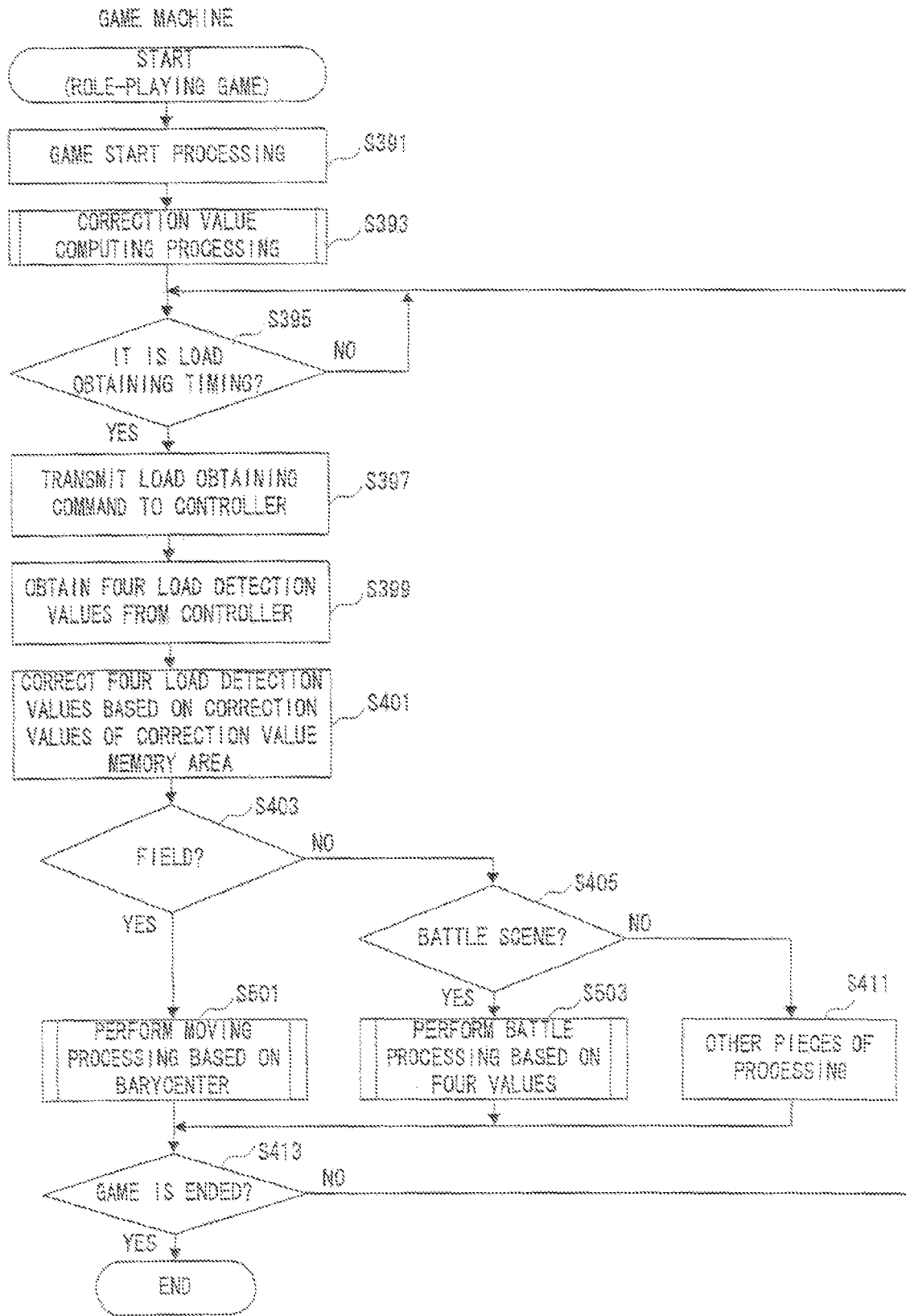
FIG. 44 is a flowchart showing an example of the operation of the game machine when the role-playing game is performed.

FIG. 44 shows an example of the operation of the game machine 52 when the role-playing game is performed. The pieces of processing of steps S391 to S405, S411, and S413 are similar to those of the same reference numerals of FIG. 38, so that the detailed descriptions are omitted.

Figure 45:
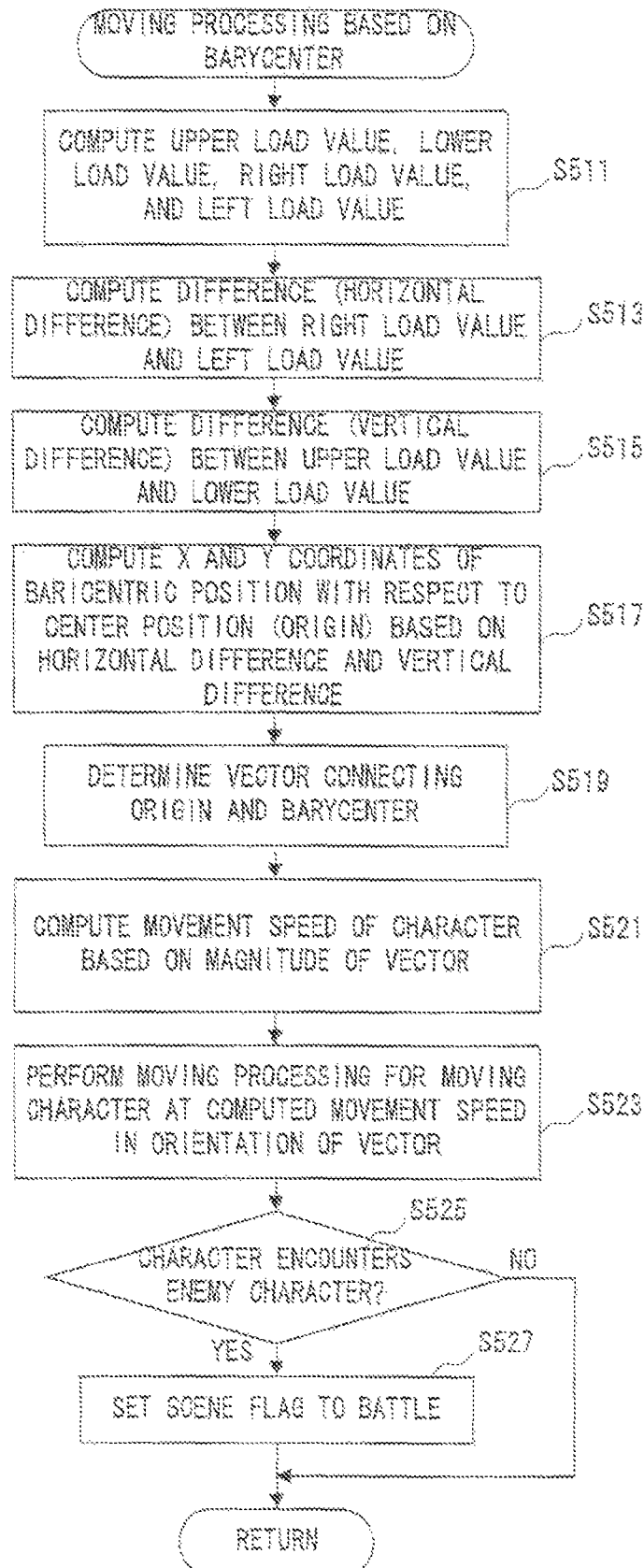
FIG. 45 is a flowchart showing an example of the operation of the moving processing based on a barycenter shown in FIG. 44.
Figure 46:
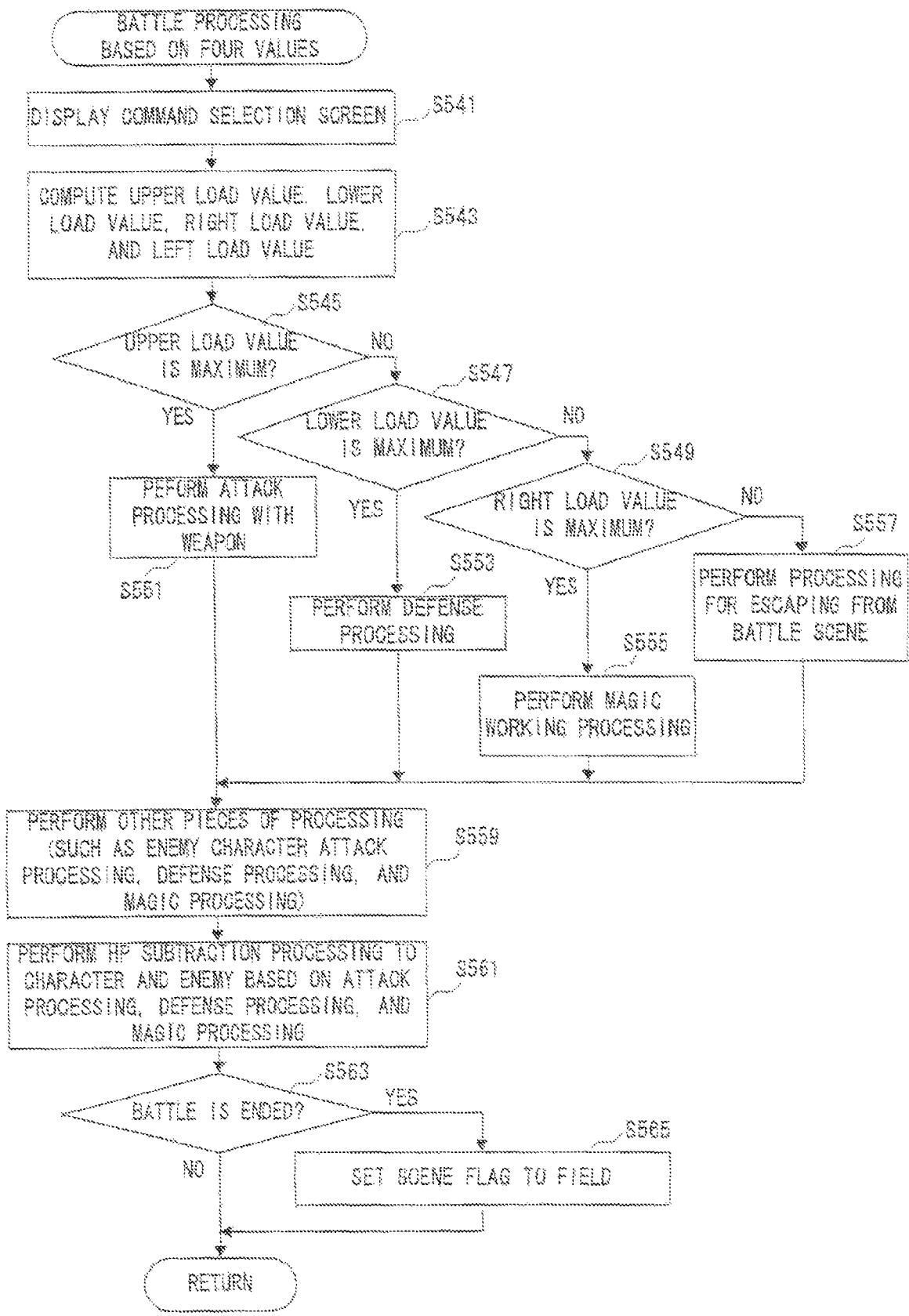
FIG. 46 is a flowchart showing an example of the operation of the battle processing based on the four values shown in FIG. 44.

If "YES" in the step S403, namely, in the case of the field scene, the CPU 82 performs the moving processing based on the barycenter in a step S501. FIG. 45 shows the detailed operation of the moving processing. If "YES" in the step S405, namely, in the case of the battle scene, the CPU 82 performs the battle processing based on the four values in a step S503. FIG. 46 shows the detailed operation of the battle processing. When the step S501 or S503 is ended, the processing goes to the step S413.

FIG. 45 shows an example of the operation of the moving processing based on a barycenter. In a step S511, the CPU 82 computes the upper load value, the lower load value, the right load value, and the left load value. Because the correction is performed in the embodiment, each load value is computed based on the corrected load detection value of the memory area 228.

In a step S513, the CPU 82 computes difference (referred to as horizontal difference) between the right load value and the left load value. In a step S515, the CPU 82 computes difference (referred to as vertical difference) between the upper load value and the lower load value. In a step S517, the CPU 82 computes the X and Y coordinates at the barycentric position with respect to the center position (origin) based on the horizontal difference and vertical difference. The computation is performed according to the above-mentioned Formula 1 and Formula 2. The computed barycentric coordinate is stored in the memory area 300.

In a step S519, the CPU 82 computes the vector connecting the origin and the barycenter, and the CPU 82 stores the vector in the memory area 302. In a step S521, the CPU 82 computes the movement speed of the player character based on the magnitude (length) of the vector and stores the movement speed in the memory area 304. In a step S523, the CPU 82 performs the moving processing for moving the player character at the computed movement speed toward the orientation of the vector. The position of the player character is computed based on the orientation of the vector, the movement speed, and the previous position and is stored in the memory area 282.

In a step S525, the CPU 82 determines whether or not the player character encounters the enemy character. The movement of the enemy character is controlled by the program, and the computed position of the enemy character is stored in the memory area 284. Accordingly, it is determined whether the positions of the player character stored in the memory area 282 and enemy character stored in the memory area 284 are brought close to each other within the predetermined range. If "YES" in the step S525, the CPU 82 sets the scene flag to the battle by storing the value indicating the battle in the scene flag memory area 286 in a step S527. When the step S527 is ended, or if "NO" in the step S525, the moving processing based on the barycenter is ended, and the processing returns to the step S413 of FIG. 44.

FIG. 46 shows an example of the operation of the battle processing based on the four values. In a step S541, the CPU 82 displays the command selection screen using the GPU 84*b*. In the command selection screen of the embodiment, as shown in FIG. 42, the icons indicating the commands are displayed at predetermined upper, lower, right, and left positions on the screen.

In a step S543, the CPU 82 computes the upper load value, the lower load value, the right load value, and the left load value based on the corrected load detection value of the memory area 228 and stores the load values in the load computation value memory area 232.

In steps S545 to S549, it is determined which load computation value indicates the maximum value. In a step S545, the CPU 82 determines whether or not the upper load value is the maximum. If "YES" in the step S545, namely, when the CPU 82 determines that the command of "fight" corresponding to the upward direction is selected, the CPU 82 performs the attack processing with the weapon in a step S551. Therefore, the player character attacks against the enemy character.

On the other hand, if "NO" in the step S545, the CPU 82 determines whether or not the lower load value is the maximum in a step S547. If "YES" in the step S547, namely, when the CPU 82 determines that the command of "protect" corresponding to the downward direction is selected, the CPU 82 performs the defense processing in a step S553. Therefore, the player character takes a defensive pose to protect against the attack of the enemy character.

If "NO" in the step S547, the CPU 82 determines whether or not the right load value is the maximum in a step S549. If "YES" in the step S549, namely, when the CPU 82 determines that the command of "magic" corresponding to the right direction is selected, the CPU 82 performs the magic working processing in a step S555. Therefore, the player character damages the enemy character with the magic.

If "NO" in the step S549, namely, when the CPU 82 determines that the command of "escape" corresponding to the left direction is selected while the left load value is the maximum, the CPU 82 performs the processing for escaping from the battle scene in a step S557. For example, the player character tries to escape from the battle. The battle is ended in the case where the player character escapes successfully from the battle, and the battle is continued in the case where the player character fails to escape from the battle. The successful and failure of the escape may be determined by the difference between the HPs or a random number or the like.

When the step S551, S553, S555, or S557 is ended, the CPU 82 performs other pieces of processing in a step S559.

Specifically, examples of other pieces of processing include enemy character attack processing, defense processing, and magic processing.

In a step S561, the CPU 82 performs the HP subtraction processing to the player character and enemy character based on the attack processing, the defense processing and the magic processing. The HP is subtracted by the predetermined value according to the attack and magic of the opponent. In the case where the opponent protects against the attack, the HP of the opponent is subtracted by the predetermined value which is lower than that of the case in which the opponent does not protect against the attack. The computed HPs of the player character and enemy character are stored in the memory area 288.

In a step S563, the CPU 82 determines whether or not the battle is ended. Examples of the battle end condition include that the HP of the player character or enemy character becomes zero and that the player character escapes successfully from the battle. In the case where the player character loses the battle, it is determined that the game is ended in the step S413 of FIG. 44. If "YES" in the step S563, the CPU 82 set the scene flag to the field by storing the value indicating the field in the scene flag memory area 286 in a step S565. When the step S565 is ended, or if "NO" in the step S563, the battle processing based on the four load values is ended, and the processing returns to the step S413 of FIG. 44.

In the role-playing game, the movement target is the player character. Alternatively, the moving processing can also be applied to the movement of the cursor or pointer and the movement of the viewpoint or point of gaze of the virtual camera and the like.

In each of the above-described embodiments, the game machine 52 obtains the four load detection values from the game controller 10 and computes the necessary quantity of load computation values. However, in another embodiment, the game machine 52 informs the game controller 10 of the necessary quantity of load computation values, and the game controller 10 may compute the necessary quantity of load computation values in response to the notification and transmit the necessary quantity of load computation values to the game machine 52.

Specifically, the game machine 52 determines the necessary quantity of load values at the load obtaining timing, and the game machine 52 transmits the load obtaining command for obtaining the necessary quantity of load values to the game controller 10. The game controller 10 that receives the command determines the type of the command to compute the necessary quantity of load values according to the command, and the game controller 10 transmits the computed load values to the game machine 52. In the game machine 52, the game processing is performed based on the received necessary quantity of load values.

Figure 47:
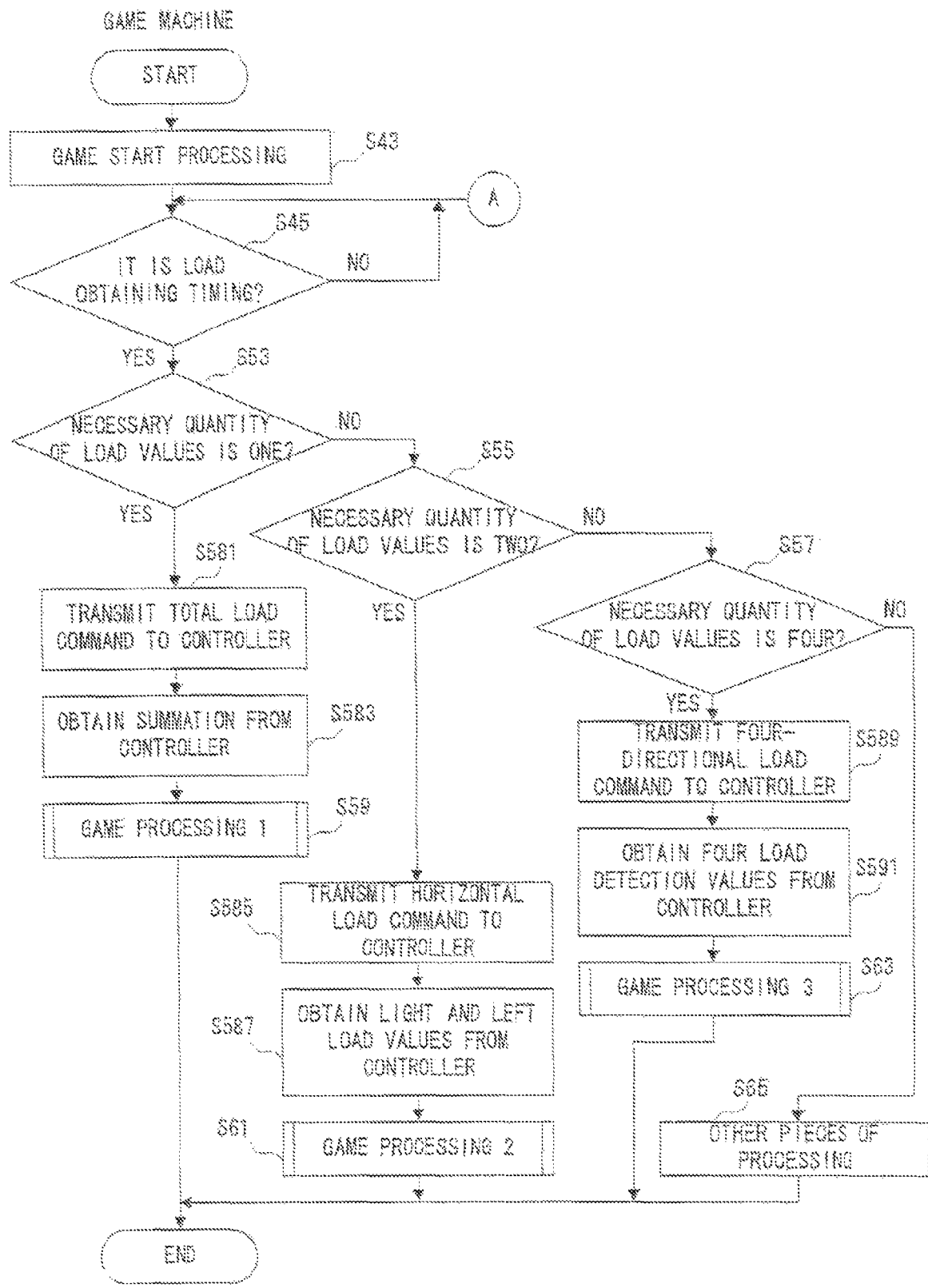
FIG. 47 is a flowchart showing an example of the operation of the game machine transmitting a load command according to the game.

FIG. 47 shows an example of the operation of the game machine 52 of the embodiment. FIG. 47 shows a modification of the operation of FIG. 18, and the necessary quantity of load values is determined in each game in the modification of FIG. 47. In FIG. 47, the processing similar to that of FIG. 18 is designated by the same reference numeral, and the detailed description is omitted. Because the game controller 10 performs the load computation, the correction value computing processing in the step S41 of FIG. 18 is not performed in the game machine 52 of the modification.

In the case where it is the load obtaining timing in the step S45, the necessary quantity of load values is determined in the steps S53 to S57. Specifically, in the step S53, the CPU 82 determines whether or not the necessary quantity of load values is one. If "YES" in the step S53, namely, in the case of the total load game, the CPU 82 transmits a total load command to the game controller 10 in a step S581. The total load command is used to obtain the summation (total load value) of the four load detection values. The transmission to the game controller 10 is performed to the remote control 54, and the total load command is transmitted from the remote control 54 to the game controller 10. In response to the total load command, the game controller 10 detects the four load values and computes the summation of the four load detection values. The summation is transmitted as the input data through the remote control 54 and received by the wireless controller module 94 of the game machine 52. Accordingly, in a step S583, the CPU 82 obtains the summation from the game controller 10 through the input data buffer 220. In the step S59, the CPU 82 performs the game processing 1 based on the summation. Because the summation is received from the game controller 10, the load computing processing (step S101 of FIG. 20) is not performed in the game processing 1.

On the other hand, if "NO" in the step S53, the CPU 82 determines whether or not the necessary quantity of load values is two in the step S55. If "YES" in the step S53, namely, in the case of the right and left balance game, the CPU 82 transmits a horizontal load command to the game controller 10 in a step S585. The horizontal load command is used to obtain the right and left load values. In response to the horizontal load command, the game controller 10 detects the four load values and computes the right and left load values. The right and left load values are transmitted to the game machine 52. Accordingly, in a step S587, the CPU 82 obtains the right and left load values from the game controller 10 through the input data buffer 220. In the step S61, the CPU 82 performs the game processing 2 based on the right and left load values. The load computing processing (steps S151 and S153 of FIG. 21) is also not performed in the game processing 2.

If "NO" in the step S55, the CPU 82 determines whether or not the necessary quantity of load values is four in the step S57. If "YES" in the step S57, namely, in the cases of the four-directional balance game, the hoop game, and the like, the CPU 82 transmits a four-directional load command to the game controller 10 in a step S589. The four-directional load command is used to obtain the four load detection values. In response to the four-directional load command, the game controller 10 detects the four load values and transmits the four load detection values to the game machine 52. Accordingly, in a step S591, the CPU 82 obtains the four load detection values from the game controller 10 through the input data buffer 220. In the step S63, the CPU 82 performs the game processing 3 based on the four load detection values. In the embodiment, in the case where the four load values are required, because the four load detection values is obtained from the game controller 10, the load computing processing (step S181 of FIG. 22) is performed in the game processing 3 when the upper load value, the lower load value, the right load value, and the left load value are required. However, as shown in the game processing 3 of FIG. 25 or 29, in the case where the four load detection values are directly required, the received four load detection values are directly used as the four load computation values. In the case of the game in which the four load detection values are not required in the game machine 52, the upper load value, the lower load value, the right load value, and the left load value may be obtained from the game controller 10. In such cases, the load computing processing is not performed in the game processing 3.

Figure 48:
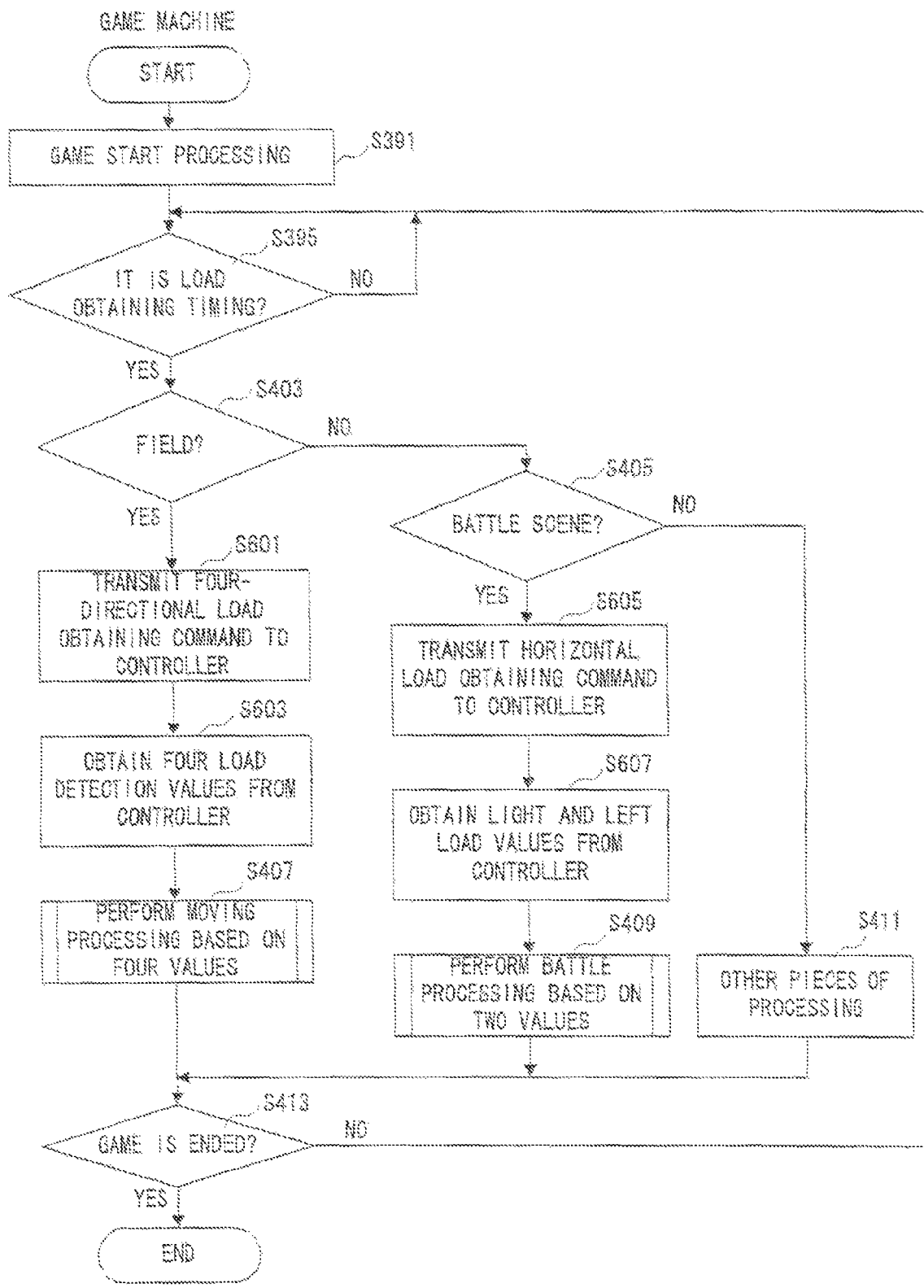
FIG. 48 is a flowchart showing an example of the operation of the game machine transmitting the load command according to the scene.

FIG. 48 shows another example of the operation of the game machine 52 of the embodiment. FIG. 48 shows a modification of the operation of FIG. 38, and the necessary quantity of load values is changed according to the scene and status of the game in the modification of FIG. 48. In FIG. 48, the processing similar to that of FIG. 38 is designated by the same reference numeral, and the detailed description is omitted.

In the case where it is the load obtaining timing in the step S395, the necessary quantity of load values is determined by determining the scene in the steps S403 to S405. Specifically, in the step S403, the CPU 82 determines whether or not the field is set in the scene flag of the memory area 286. If "YES" in the step S403, namely, in the case where the four load values are required, the CPU 82 transmits a four-directional load obtaining command to the game controller 10 in a step S601. In response to the four-directional load obtaining command, the game controller 10 transmits the four load detection values to the game machine 52, and the four load detection values are received by the wireless controller module 94. Accordingly, in a step S603, the CPU 82 obtains the four load detection values from the game controller 10 through the input data buffer 220. In the step S407, the CPU 82 performs the moving processing based on the four values. In the embodiment, because the four load detection values are obtained from the game controller 10 in the case where the four load values are required, the load computing processing (step S431 of FIG. 39) is performed in the case where the upper load value, the lower load value, the right load value, and the left load value are required in the moving processing based on the four values. However, in the case where the four load detection values are directly required, the received four load detection values are directly used as the four load computation values. In the case of the game in which the four load detection values are not required in the game machine 52, the upper load value, the lower load value, the right load value, and the left load value may be obtained from the game controller 10. In such cases, the load computing processing is not performed in the moving processing based on the four values.

On the other hand, if "NO" in the step S403, the CPU 82 determines whether or not the battle is set in the scene flag of the memory area 286 in the step S405. If "YES" in the step S405, namely, in the case where the two load values are required, the CPU 82 transmits a horizontal load obtaining command to the game controller 10 in a step S605. In response to the horizontal load obtaining command, the game controller 10 transmits the right and left load values. Accordingly, in a step S607, the CPU 82 obtains the right and left load values from the game controller 10 through the input data buffer 220. In the step S409, the CPU 82 performs the battle processing based on the two values. Because the right and left load values are received, the load computing processing (step S471 of FIG. 40) is not performed in the battle processing based on the two values.

Figure 49:
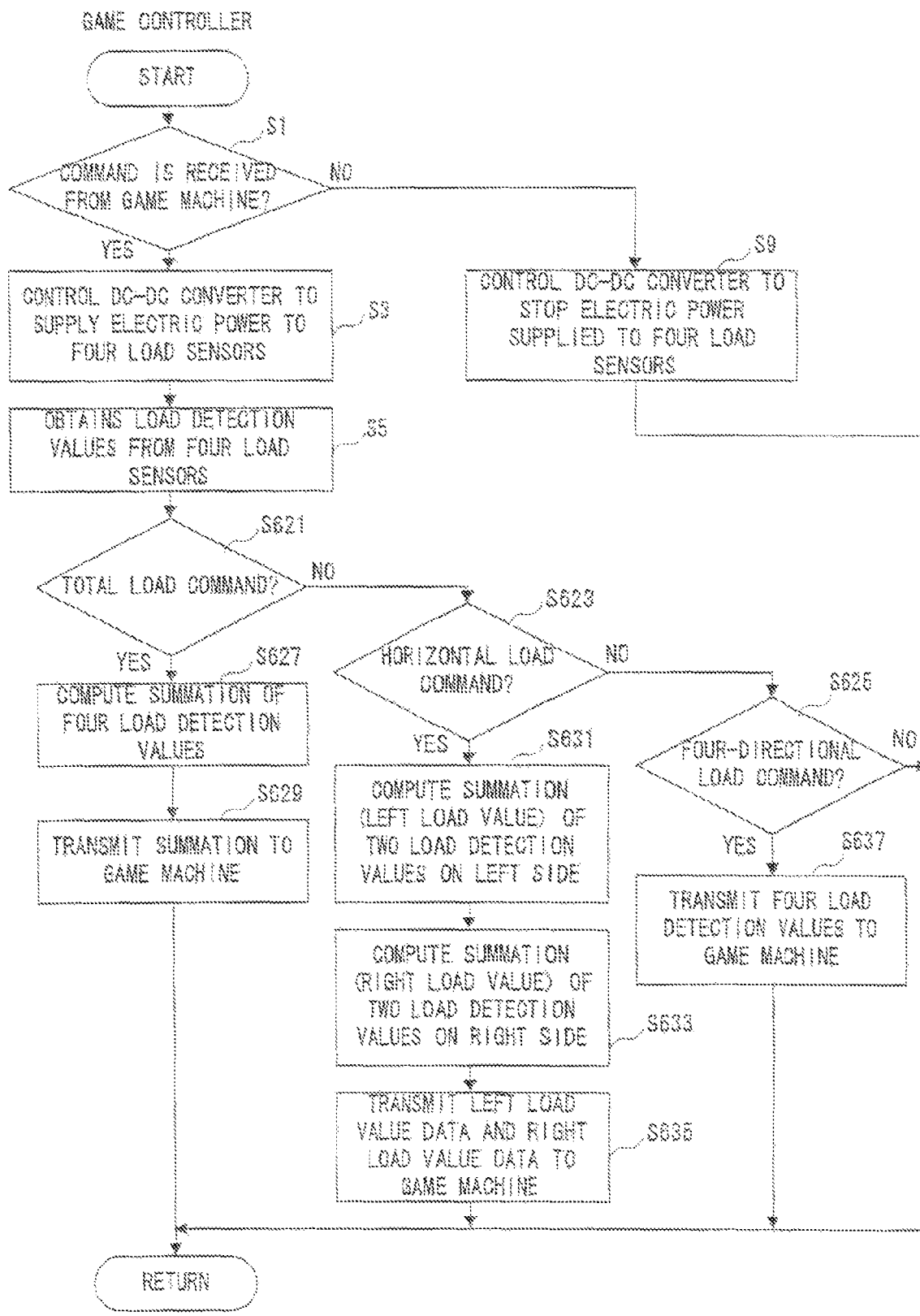
FIG. 49 is a flowchart showing an example of the operation of the game controller computing a load according to a type of command.

FIG. 49 shows an example of the operation of the game controller 10 when the game controller 10 computes the predetermined necessary quantity of load values according to the command. In FIG. 49, the processing similar to that of FIG. 16 is designated by the same reference numeral, and the detailed description is omitted.

After the load detection values are obtained from the four load sensors 14 in the step S5, the CPU 82 determines whether or not the command from the game machine 52 is the total load command in a step S621. If "YES" in the step S621, namely, in the case where one load value is required, the microcomputer 20 computes the summation of the four load detection values in a step S627. In a step S629, the microcomputer 20 transmits the computed summation to the game machine 52. The transmission to the game machine 52 is performed to the remote control 54 through the connector 24, and the load computation values are transmitted as the input data from the remote control 54 to the game machine 52.

On the other hand, if "NO" in the step S621, the microcomputer 20 determines whether or not the command is the horizontal load command in a step S623. If "YES" in the step S623, namely, in the case where the two load values are required, the microcomputer 20 computes the left load value, i.e., the summation of the two load detection values on the left sides in a step S631. In a step S633, the microcomputer 20 computes the right load value, i.e., the summation of the two load detection values on the right sides. In a step S635, the microcomputer 20 transmits the right load value data and the left load value data to the game machine 52 through the remote control 54.

If "NO" in the step S623, the microcomputer 20 determines whether or not the command is the four-directional load command in a step S625. If "YES" in the step S625, the microcomputer 20 transmits the four load detection values to the game machine 52 through the remote control 54 in a step S637. In another embodiment, the microcomputer 20 may compute such the four load computation values as the upper load value, the lower load value, the left load value, and the right load value from the four pieces of load detection values and transmit the four load computation value data to the game machine 52.

Although not shown in FIG. 49, in the case where the necessary quantity of load computation values is computed according to the command on the side of the game controller 10, the microcomputer 20 may perform the correction value computing processing (FIG. 19) according to correction value computing program and the correction processing (step S51 of FIG. 18) of the load detection value according to the correction program. In such cases, the load values are computed based on the corrected load detection values.

The processor 112 of the remote control 54 obtains the four load detection values from the game controller 10, and the processor 112 may compute the quantity of load computation values according to the command. The processor 112 of the remote control 54 may also perform the correction value computing processing and the load detection value correction processing.

In each of the above-described embodiments, when the necessary quantity of the load values is two, the four load sensors 14 are equally and horizontally divided into two sets to compute the summation of the two load detection values adjacent to each other on the left side and the summation of the two load detection values adjacent to each other on the right side. However, the patterns of the combinations of the plurality of load detection values may appropriately be changed when the load computation values are computed. For example, the two load computation values of the summation (upper load value) of the two load detection values adjacent to each other on the upper side and the summation (lower load value) of the two load detection values adjacent to each other on the lower side may be computed. The plurality of load detection values may unequally be combined. For example, the two load computation values of the one load detection value and the summation of the three load detection values may be computed, or the three load computation values of the summation of the two load detection values and each of the two remaining load detection values may be computed.

Figure 50:
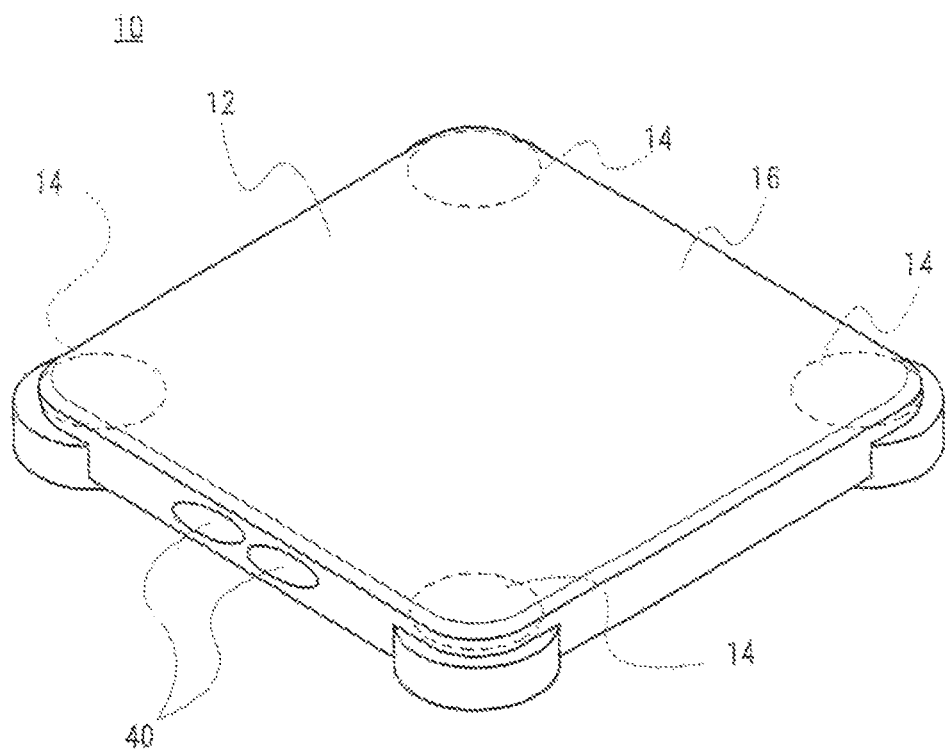
FIG. 50 is a perspective view showing an appearance of a game controller having a manipulation button.

In each of the above-described embodiments, only the load sensor 14 that is of the manipulation means or input means manipulated by the player is provided in the game controller 10. However, in another embodiment, as shown in FIG. 50, one or a plurality of manipulation buttons 40 may further be provided in the game controller 10. The manipulation button 40 is one that is manipulated by the player's leg, and the manipulation buttons 40 has a predetermined size so as to be pressed down by the leg. The foot manipulation button 40 is provided in a surface different from the upper surface of the board 12 on which the player rides. In FIG. 50, the two foot manipulation buttons 40 are provided in one side face of the board 12. Possibly the foot manipulation button 40 is provided in the upper surface of the board 12. The cable 32 is not shown in FIG. 50.

When the foot manipulation button 40 is pressed down by the player's leg, a manipulation signal corresponding to the foot manipulation button 40 is inputted to the microcomputer 20, and the manipulation data is transmitted to the game machine 52. Accordingly, the game processing is performed based on the foot manipulation data.

The functions allocated to the foot manipulation buttons 40 are appropriately set. For example, the two foot manipulation buttons 40 may be the start button for starting the game and the select button for selecting the game. Alternatively, the two foot manipulation buttons 40 may be the A button for providing the instructions such as the predetermined motion and determination and the B button for providing the instructions such as the predetermined motion and cancellation. According to the game controller 10, the player can perform the game manipulation by the way the load is applied, and the player can also press down the foot manipulation button 40 to manipulate the game using the function allocated to the foot manipulation button 40.

Figure 51:
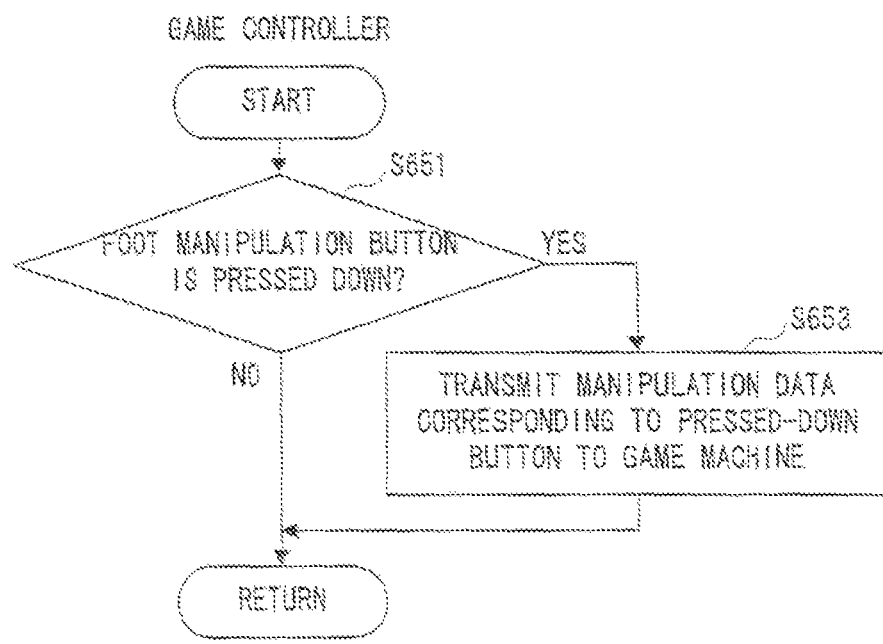
FIG. 51 is a flowchart showing an example of an operation concerning the manipulation button of the game controller shown in FIG. 50.

FIG. 51 shows an example of the operation of the microcomputer 20 concerning the foot manipulation button 40. In a step S651, the microcomputer 20 determines whether or not the foot manipulation button 40 is pressed down. If "YES" in the step S651, namely, when the manipulation signal is inputted from the foot manipulation button 40, the microcomputer 20 transmits the manipulation data corresponding to the pressed-down foot manipulation button 40 to the game machine 52 in a step S653. As with the load sensor 14, the transmission is performed to the remote control 54. The remote control 54 transmits the input data including the manipulation data of the foot manipulation button 40 to the game machine 52. Accordingly, the CPU 82 of the game machine 52 can perform the game processing based on the manipulation data of the foot manipulation button 40.

In each of the above-described embodiments, the game controller 10 conducts communication with the game machine 52 through the remote control 54. The remote control 54 is different type of game controller, and the remote control 54 can wirelessly conduct communication with the game machine 52. However, in another embodiment, the game controller 10 may directly conduct communication with the game machine 52.

Figure 52:
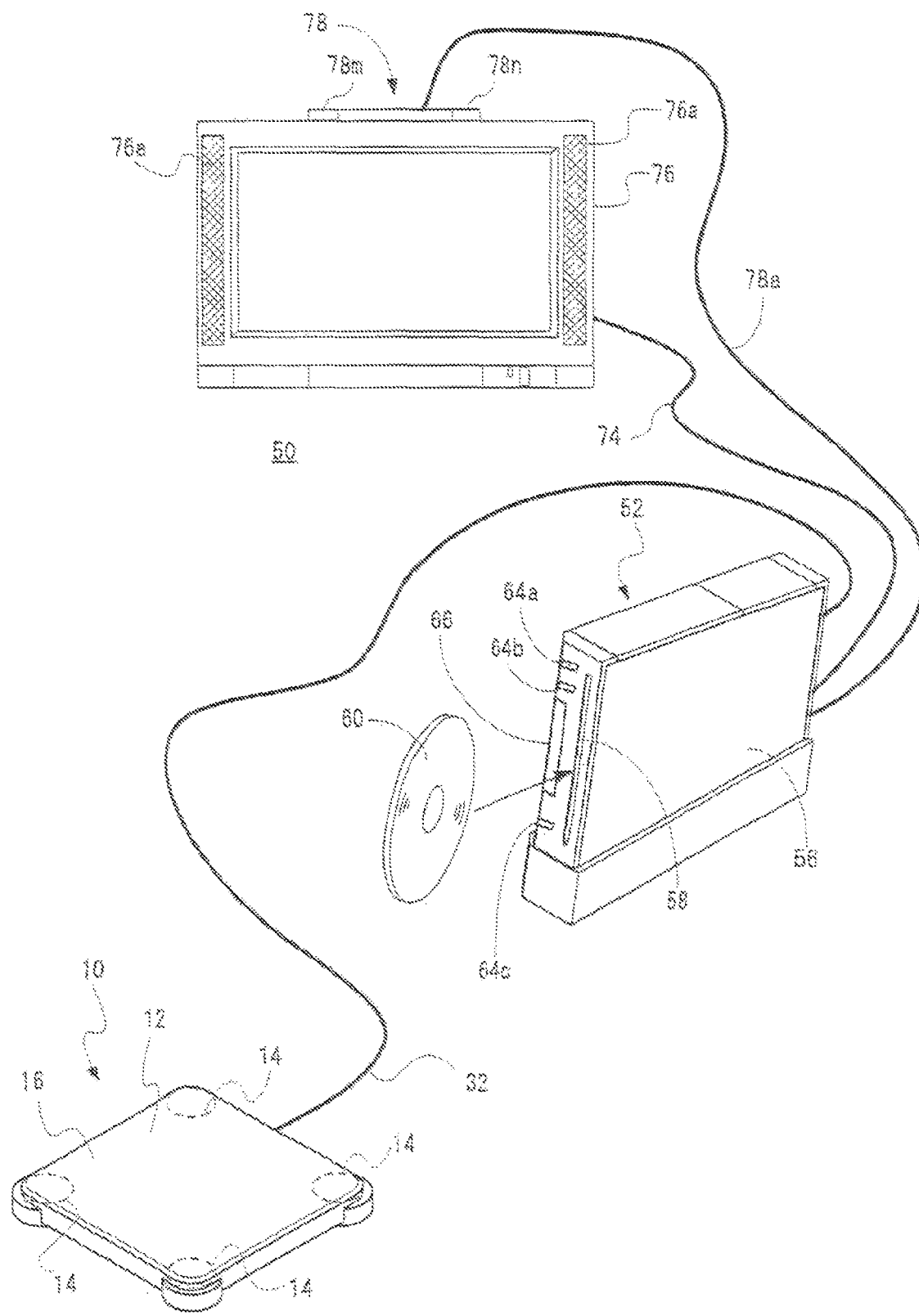
FIG. 52 is an illustrative view showing an appearance of a game system in which a game controller and a game machine are connected in a wired manner.

In the embodiment shown in FIG. 52, the game controller 10 is connected to the game machine 52 in the wired way. Specifically, the connector 24 located at the front end of the cable 32 of the game controller 10 is connected to the extended connector 96 located in the backside of the housing 56 of the game machine 52. Accordingly, the CPU 82 of the game machine 52 can transmit the load obtaining command to the game controller 10 through the extended connector 96. The microcomputer 20 of the game controller 10 can transmit the input data including the load detection value (or load computation value) of each load sensor 14 to the game machine 52 through the connector 24.

Figure 53:
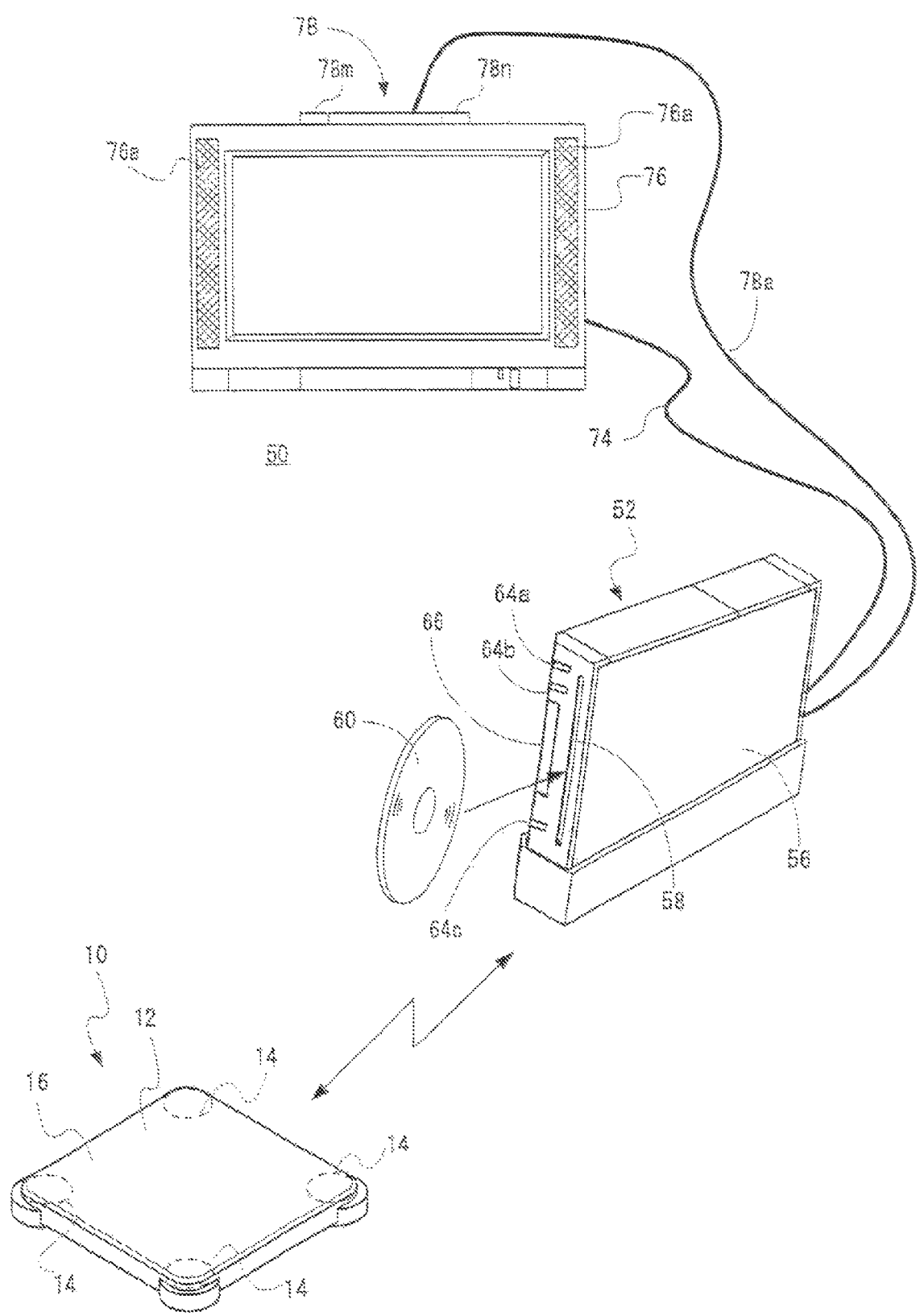
FIG. 53 is an illustrative view showing an appearance of a game system in which a game controller and a game machine conduct wireless communication with each other.
Figure 54:
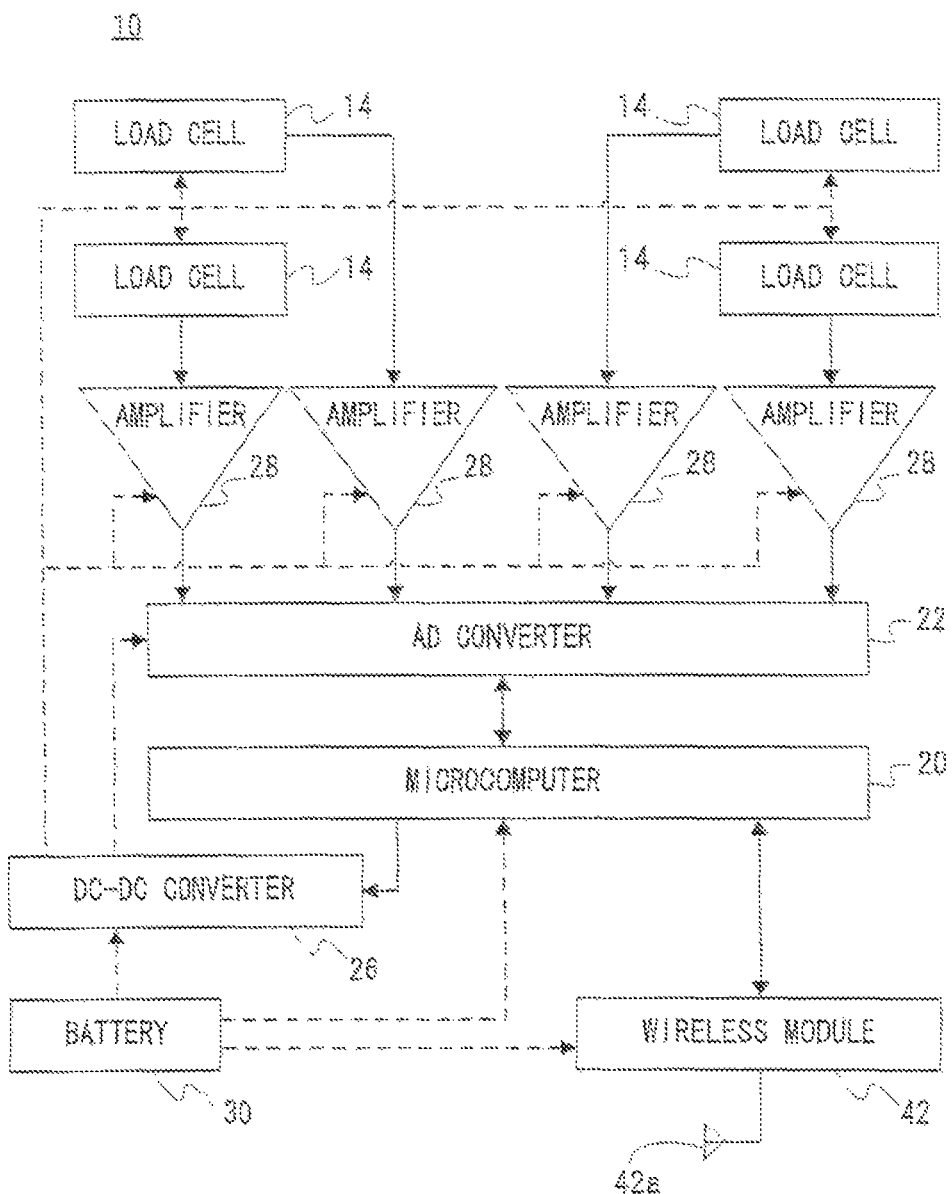
FIG. 54 is a block diagram showing an example of an electric configuration of the game controller shown in FIG. 53.

In the embodiment shown in FIG. 53, the game controller 10 is wirelessly connected to the game machine 52. As shown in FIG. 54, the game controller 10 includes a wireless module 42 connected to the microcomputer 20. In this case, the electric power is supplied from the battery 30 to the microcomputer 20 and the wireless module 42. An antenna 42a is connected to the wireless module 42. The wireless module 42 can conduct communication pursuant to the same wireless communication standard (such as Bluetooth and wireless LAN) as the wireless controller module 94 of the game machine 52. Accordingly, the CPU 82 of the game machine 52 can transmit the load obtaining command to the game controller 10 through the wireless controller module 94. The microcomputer 20 of the game controller 10 can receive the command from the game machine 52 through the wireless module 42 and antenna 42a, and the microcomputer 20 can transmit the input data including the load detection value (or load computation value) of each load sensor 14 to the game machine 52.

Figure 55:
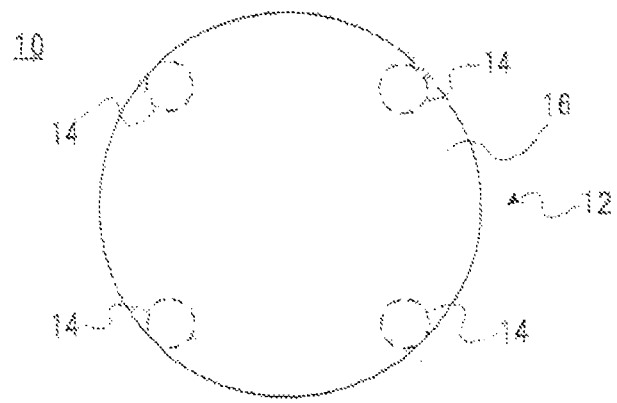
FIG. 55 is an illustrative view showing a modification of a board shape of the game controller.
Figure 56:
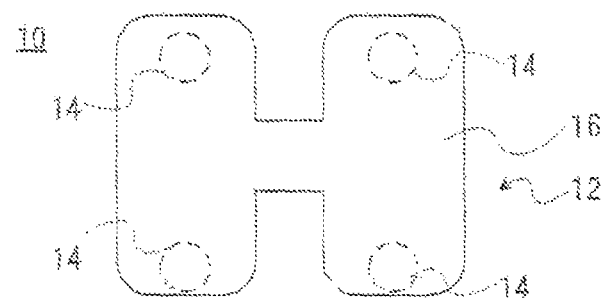
FIG. 56 is an illustrative view showing a modification of the board shape of the game controller.

In each of the above-described embodiments, the board 12 (support plate 16) of the game controller 10 is formed in the square or rectangular shape when viewed from above. However, the shape of the board 12 (support plate 16) can appropriately be changed. For example, as shown in FIG. 55, the board 12 (support plate 16) may be formed in a round shape when viewed from above. Alternatively, as shown in FIG. 56, the board 12 may be formed in a leg shape, namely, the board 12 may be formed so as to have two portions on which the legs ride.

Figure 57:
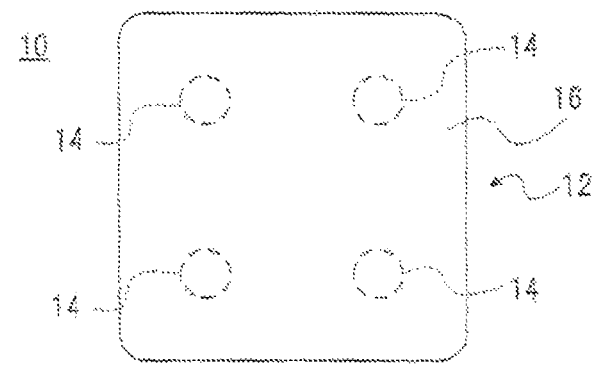
FIG. 57 is an illustrative view showing a modification of an arrangement of the four load sensors of the game controller.

In each of the above-described embodiments, the four load sensors 14 are arranged in the peripheral portion of the board 12 (support plate 16). In another embodiment, the four load sensors 14 may be arranged inside the peripheral portion as shown in FIG. 57. However, the four load sensors 14 are arranged at predetermined intervals so as to ensure the accuracy of load detection.

Figure 58:
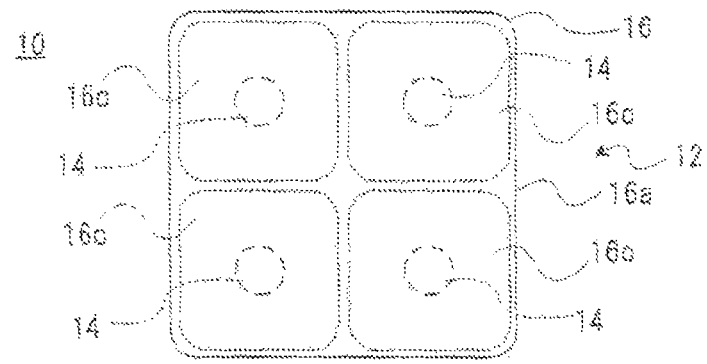
FIG. 58 is an illustrative view showing a modification of an intermediate-layer plate in support plates of the game controller.

In each of the above-described embodiments, the intermediate-layer plate 16c included in the support plate 16 is supported by the four load sensors 14. However, in another embodiment, the intermediate-layer plate 16c may be divided into four as shown in FIG. 58. That is, and each load sensor 14 may support each intermediate-layer plate 16c while the four intermediate-layer plates 16c support the one upper-layer plate 16a. In this case, the load applied to each intermediate-layer plate 16c is detected more directly by each load sensor 14, so that the detection accuracy can be enhanced.

In each of the above-described embodiments, the one game controller 10 is connected to the game machine 52. However, in another embodiment, the game system 50 may be configured such that the plurality of game controllers 10 are directly connected to the game machine 52 or such that the plurality of game controllers 10 are connected to the game machine 52 through the plurality of remote controls 54, a junction device, or the network. In such cases, the game for the plurality of players can be performed.

In each of the above-described embodiments, the four load sensors 14 are provided in the game controller 10. However, in another embodiment, four or more load sensors 14 may be provided in the game controller 10. In such cases, further various quantities of load computation values can be computed to perform the game processing.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An input device used in communication with an information processing apparatus, comprising:
   a support portion configured to support at least legs of a player;
   at least one load sensor disposed below said support portion; and a wireless communication device configured to wirelessly transmit a load value as manipulation data detected from the at least one load sensor to said information processing apparatus.

2. The input device according to claim 1, further comprising:
processing circuitry for imparting the load value as the manipulation data detected from the at least one load sensor to said wireless communication device when said wireless communication device receives a load obtaining command from said information processing apparatus,
wherein said wireless communication device wirelessly transmits said manipulation data received from said processing circuitry to said information processing apparatus.

3. The input device according to claim 1, wherein said input device is configured to be detachable from a second different type of input device using a connector and, said input device is configured to transmit said load value to said information processing apparatus through said second different type of input device attached to said connector.

4. The input device according to claim 1, further comprising:
a button provided on a surface of said input device configured to be operated by the player.

5. The input device according to claim 1, further comprising:
a button provided on a side surface of said support portion and configured to be manipulated by the player to control an operation of the input device.

6. The input device according to claim 1, further comprising:
a button provided on a side surface of said input device and configured to switch on/off power to the input device.

7. The input device according to claim 1, further comprising:
a button provided on a side surface of said input device and configured to activate and/or deactivate transmission of data from said input device to said information processing apparatus.

8. The input device according to claim 1, wherein at least four load sensors are disposed below said support portion.

9. The input device according to claim 8, wherein respective load values from the at least four load sensors are transmitted to said information processing apparatus.

10. The input device according to claim 8, wherein respective load values from the at least four load sensors and identification information are transmitted together to said information processing apparatus.

11. An information processing system, comprising:
an information processing apparatus having one or more processors; and
an input device configured to communicate with the information processing apparatus, the input device comprising:
a support portion configured to support at least legs of a player,
at least one load sensor disposed below said support portion, and
a wireless communication device configured to wirelessly transmit a load value as manipulation data detected from the at least one load sensor to said information processing apparatus.

12. The information processing system according to claim 11, wherein the input device further comprises:
processing circuitry for imparting the load value as the manipulation data detected from the at least one load sensor to said wireless communication device when said wireless communication device receives a load obtaining command from said information processing apparatus,
wherein said wireless communication device wirelessly transmits said manipulation data received from said processing circuitry to said information processing apparatus.

13. The information processing system according to claim 11, wherein said input device is configured to be detachable from a second different type of input device using a connector and, said input device is configured to transmit said load value to said information processing apparatus through said second different type of input device attached to said connector.

14. The information processing system according to claim 11, wherein the input device further comprises:
a button provided on a surface of said input device configured to be operated by the player.

15. The information processing system according to claim 11, wherein the input device further comprises:
a button provided on a side surface of said support portion and configured to be manipulated by the player to control an operation of the input device.

16. The information processing system according to claim 11, wherein the input device further comprises:
a button provided on a side surface of said input device and configured to switch on/off power to the input device.

17. The information processing system according to claim 11, wherein the input device further comprises:
a button provided on a side surface of said input device and configured to activate and/or deactivate transmission of data from said input device to said information processing apparatus.

18. The information processing system according to claim 11, wherein at least four load sensors are disposed below said support portion.

19. The information processing system according to claim 18, wherein respective load values from the at least four load sensors are transmitted to said information processing apparatus.

20. The information processing system according to claim 18, wherein respective load values from the at least four load sensors and identification information are transmitted together to said information processing apparatus.

21. An information processing system, comprising:
an information processing apparatus;
a first controller configured to communicate directly with the information processing apparatus; and
a second controller configured to communicate directly with the information processing apparatus, the second controller including:
a support portion configured to support at least one leg of a player,
at least one load sensor disposed below said support portion, and
a wireless communication device configured to wirelessly transmit a load value as manipulation data detected from the at least one load sensor to said information processing apparatus.

22. The information processing system of claim 21, wherein the information processing apparatus includes a wireless communication device configured to wirelessly communicate with the first controller independently from the second controller and configured to wirelessly communicate with the second controller independently from the first controller.

23. The information processing system of claim 21, wherein the second controller includes a button provided on a surface of said second controller configured to be operated by the player to control an operation of the second controller.

24. The information processing system of claim 21, wherein the second controller includes a button provided on a surface of said second controller configured to power the second controller.

25. The information processing system of claim 21, wherein the second controller includes a button provided on a surface of said second controller configured to activate and/or deactivate transmission of data from said second controller to said information processing apparatus.

26. The information processing system of claim 21, wherein at least four load sensors are disposed below said support portion.

27. The information processing system of claim 26, wherein respective load values from the at least four load sensors are transmitted to said information processing apparatus.

28. The information processing system of claim 26, wherein respective load values from the at least four load sensors and identification information are transmitted together to said information processing apparatus.

* * * * *